(12) United States Patent
Sasai et al.

(10) Patent No.: US 6,559,977 B2
(45) Date of Patent: May 6, 2003

(54) READING/PRINTING APPARATUS AND READING APPARATUS

(75) Inventors: Keizo Sasai, Yokohama (JP); Atsushi Saito, Yokohama (JP); Hiroshi Ogushi, Chiba-ken (JP); Kazuyuki Morinaga, Yokohama (JP); Fumihiko Nakamura, Tokyo (JP); Shigeyuki Sugiyama, Hiratsuka (JP); Noriyuki Aoki, Tokyo (JP); Takayuki Nishinohara, Yokohama (JP); Yoshiaki Suzuki, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/038,610

(22) Filed: Jan. 8, 2002

(65) Prior Publication Data

US 2002/0067513 A1 Jun. 6, 2002

Related U.S. Application Data

(62) Division of application No. 09/047,328, filed on Mar. 25, 1998, now Pat. No. 6,426,803.

(30) Foreign Application Priority Data

| Mar. 27, 1997 | (JP) | ............................................. 9-075879 |
| Mar. 27, 1997 | (JP) | ............................................. 9-075880 |
| Jul. 14, 1997 | (JP) | ............................................. 9-188613 |

(51) Int. Cl.[7] ............................. H04N 1/00; H04N 1/04

(52) U.S. Cl. ........................ 358/400; 358/471; 358/474

(58) Field of Search ................................ 358/400, 401, 358/471, 474, 496, 498, 500, 472, 296; 399/211; 382/313

(56) References Cited

U.S. PATENT DOCUMENTS

| 4,313,124 A | 1/1982 | Hara ............................ 347/57 |
| 4,459,600 A | 7/1984 | Sato et al. ..................... 347/47 |
| 4,463,359 A | 7/1984 | Ayata et al. ................... 347/56 |

(List continued on next page.)

FOREIGN PATENT DOCUMENTS

| EP | 217161 | 4/1987 |
| EP | 516056 | 12/1992 |
| EP | 529615 | 3/1993 |

(List continued on next page.)

OTHER PUBLICATIONS

Patent Abstracts of Japan, vol. 097, No. 03, of JP 8293937 (Nov. 5, 1996).

*Primary Examiner*—Cheukfan Lee
(74) *Attorney, Agent, or Firm*—Fitzpatrick, Cella, Harper & Scinto

(57) ABSTRACT

To provide a reading/printing apparatus and a reading apparatus by which the facility with which each unit is assembled and maintained can be significantly improved because steps of fixing and connecting individual units need not be performed in order, a printing apparatus, a control board, and a power supply are disposed inside a housing obtained by integrally forming a base portion serving as a bottom surface, side walls serving as outer side surfaces, and an opening surrounded by the side walls. The reading apparatus, the printing apparatus, the control board, and the power supply are discretely constituted. The housing includes a first housing integrally formed with enough strength to separately fix the base portion, lower portions of the side walls, the reading apparatus, the printing apparatus, the control board, and the power supply, and a second housing covering the opening and integrally forming upper portions of the side walls. The second housing is fixed to the first housing by elastic deformation so as to cover the opening of the first housing.

23 Claims, 38 Drawing Sheets

U.S. PATENT DOCUMENTS

| | | | |
|---|---|---|---|
| 4,558,333 A | 12/1985 | Sugitani et al. | 347/65 |
| 4,723,129 A | 2/1988 | Endo et al. | 347/56 |
| 4,740,796 A | 4/1988 | Endo et al. | 347/56 |
| 4,849,824 A | 7/1989 | Sakuragi et al. | 358/296 |
| 5,251,890 A | 10/1993 | Sasai | 271/176 |
| 5,359,435 A | 10/1994 | Hayashi et al. | 358/498 |
| 5,452,098 A | 9/1995 | Sato et al. | 358/400 |
| 5,452,110 A * | 9/1995 | Hatano et al. | 358/494 |
| 5,552,902 A * | 9/1996 | Kohno | 358/498 |
| 5,568,277 A * | 10/1996 | Hatano et al. | 358/400 |
| 5,610,797 A | 3/1997 | Nakamura | 361/681 |
| 5,822,081 A * | 10/1998 | Hatano et al. | 358/400 |
| 6,113,207 A | 9/2000 | Nakano et al. | 347/3 |
| 6,040,919 A1 | 3/2001 | Iwata et al. | 358/400 |
| 6,342,955 B1 * | 1/2002 | Matsumoto | 358/471 |

FOREIGN PATENT DOCUMENTS

| | | |
|---|---|---|
| EP | 606628 | 7/1994 |
| EP | 763432 | 3/1997 |
| JP | 54-56847 | 5/1979 |
| JP | 59-123670 | 7/1984 |
| JP | 59-138461 | 8/1984 |
| JP | 60-71260 | 4/1985 |
| JP | 6-115217 | 4/1994 |
| JP | 7-129061 | 5/1995 |
| JP | 8-51520 | 2/1996 |

* cited by examiner

FIG. 4
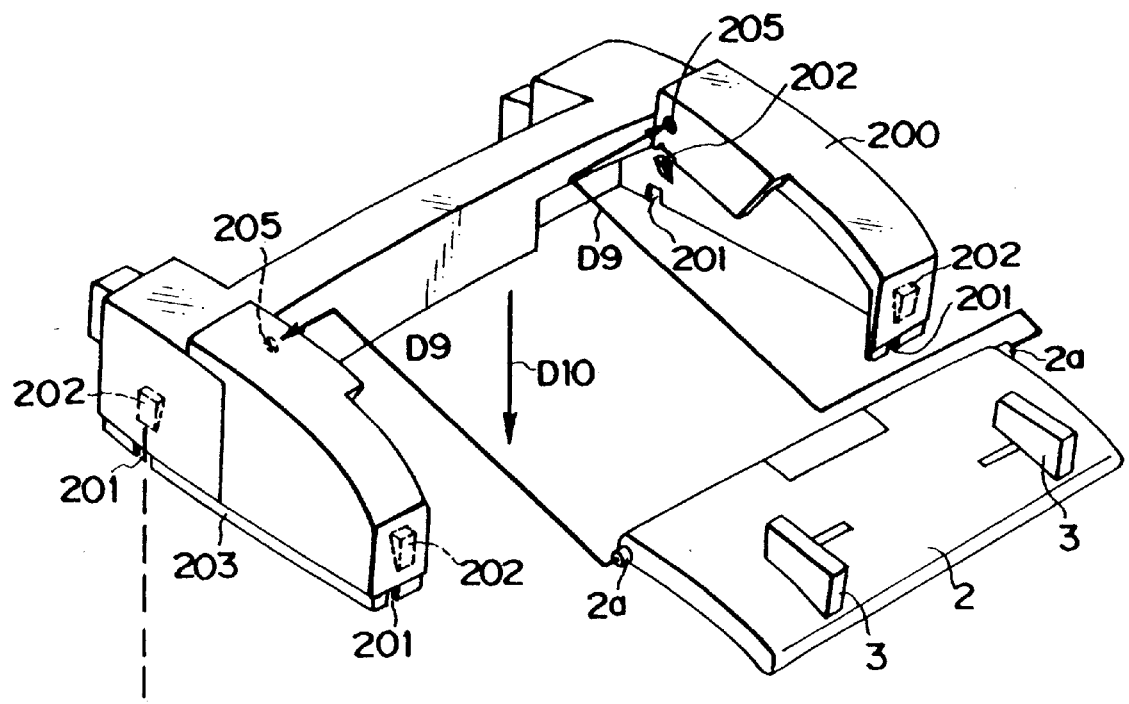
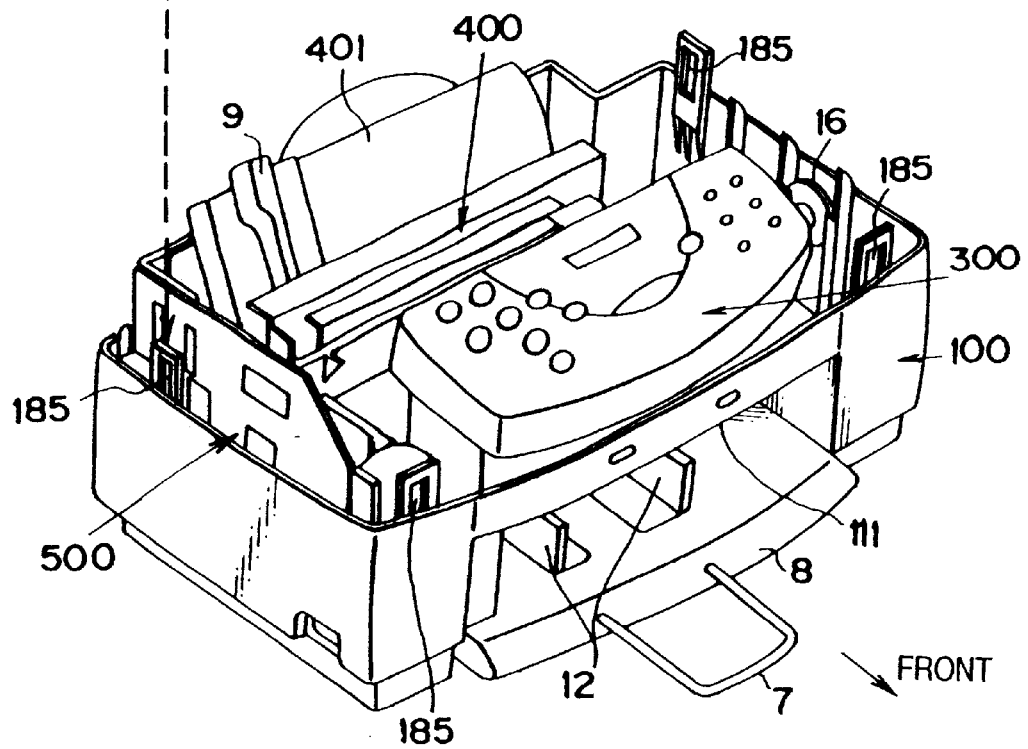

READING/PRINTING APPARATUS AND READING APPARATUS

This application is a division of application Ser. No. 09/047,328, filed on Mar. 25, 1998, U.S. Pat. No. 6,426,803, issued Jul. 30, 2002.

BACKGROUND OF THE INVENTION

1. Field of the Invention

The present invention relates to a technique suitably applicable to a reading/printing apparatus and a reading apparatus accommodated in a housing having a predetermined outer shape.

2. Description of the Related Art

A conventional facsimile apparatus 5000 often uses a hierarchical structure as shown in a cross-sectional view of FIG. 38. That is, a control board 1500 is disposed on the inner bottom surface of a housing 1100 constituting the outer surfaces. A power supply 1600 is disposed behind the control board 1500. A printing sheet table on which a printing sheet S is set is arranged above the control board 1500. A printer unit 1400 having a platen roller 1401 for changing the direction of the printing sheet toward the front of the apparatus is arranged on the control board 1500. An original reading unit 1300 having an operation panel is disposed on the front side of the upper surface of the housing. An original G is moved toward the front side of the apparatus and read. Many facsimile apparatuses having this arrangement are put into practical use. This hierarchical structure eliminates unnecessary spaces.

To disassemble a finished conventional apparatus to perform repair or the like, an upper cover 1200 is removed from a lower cover of the housing 1100, and each unit inside the housing is removed. The upper and lower covers and the individual units are removed by loosening a large number of machine screws fixing these components.

SUMMARY OF THE INVENTION

In the above conventional arrangement, however, the individual units are so assembled as to form a hierarchical structure. This significantly deteriorates the facility with which each unit is assembled and maintained. Additionally, since wires from the control board are connected by using connectors, the individual units must be fixed to the housing in order.

Also, it is preferable to shorten the wires from the control board because long wires cause easy entrance of noise. However, the wires are extended in the above conventional arrangement because the control board is positioned on the bottom surface.

More specifically, the units are fixed in order from the control board 1500, and the steps of fixing and connecting the units to the power supply 1600 are performed in order. This significantly deteriorates the facility with which each unit is assembled and maintained.

Also, the use of a large number of machine screws and the like complicates the assembly steps. Consequently, it is impossible to simplify the product manufacturing steps and increase the number of products. The resulting problems pointed out are the difficulty of cost reduction and the necessity of an extra repair time. That is, the hierarchical structure is surely effective in eliminating unnecessary spaces, but this structure is not suited to perform so-called mass-production for cost reduction.

On the other hand, to manufacture a derivative type of apparatus by slightly modifying some units and directly using other units constituting the above apparatus, the housing of the conventional arrangement must be redesigned. Accordingly, it is necessary to prepare an enormous designing time and a manufacturing installation including metal molds for manufacturing the housing.

The present invention, therefore, has been made in consideration of the aforementioned problems, and has as its object to provide a reading/printing apparatus and a reading apparatus by which the facility with which each unit is assembled and maintained can be significantly improved because steps of fixing and connecting individual units need not be performed in order.

It is another object of the present invention to provide a reading/printing apparatus by which the manufacturing cost can be decreased by simplifying the product manufacturing process by using no machine screws and the repair time can be shortened.

It is still another object of the present invention to provide a reading/printing apparatus in which individual units can be fixed to a housing in no special order to connect wires from a control board by using connectors and the steps of connecting the wires from the control board need not be performed in order, and which is made unaffected by noise by shortening the wires from the control board because long wires cause easy entrance of noise.

It is still another object of the present invention to provide a reading/printing apparatus which obviates the need to prepare an enormous designing time and a manufacturing installation including metal molds for manufacturing a housing in manufacturing a derivative type of apparatus by slightly modifying some units and directly using other units constituting the apparatus.

To solve the above problems and achieve the objects, according to one aspect of the present invention, there is provided a reading/printing apparatus characterized in that a housing comprises a first housing having a base portion serving as a bottom surface, side walls serving as outer surfaces, and an opening surrounded by the side walls, and a second housing covering the opening and having side walls, and the second housing is fixed to the first housing by elastic deformation so as to cover the opening.

According to another aspect, there is provided a reading/printing apparatus comprising an original convey type reading apparatus for reading an original while conveying the original and a serial printing type printing apparatus for performing printing by scanning a printing unit in a main scan direction while scanning a printing sheet in a sub-scan direction, characterized in that a housing comprises a first housing having a base portion serving as a bottom surface, side walls serving as outer surfaces, and an opening surrounded by the side walls, the original convey type reading apparatus and the serial printing type printing apparatus being separately fixed to the first housing, and a second housing covering the opening and having side walls, and the second housing is fixed to the first housing by elastic deformation so as to cover the opening.

According to still another aspect, there is provided a reading/printing apparatus in which a reading apparatus, a printing apparatus, and a control board are disposed in a housing, characterized in that the reading apparatus, the printing apparatus, and the control board are discretely constituted, the reading apparatus is so disposed that one side surface of the reading apparatus is substantially parallel with one opposing side surface of the housing, the printing apparatus is so disposed that one side surface of the printing apparatus is substantially parallel with another opposing side surface of the housing, and the control board is disposed in an upright position on a side surface connecting the one side surface and another side surface of the housing.

According to still another aspect, there is provided a reading/printing apparatus in which a reading apparatus, a printing apparatus, and a control board are disposed in a housing, characterized in that the reading apparatus, the printing apparatus, and the control board are discretely constituted, the reading apparatus is so disposed that a longitudinal direction of the reading apparatus is substantially parallel with a front surface of the housing, the printing apparatus is so disposed that a longitudinal direction of the printing apparatus is substantially parallel with a rear surface of the housing, and the control board is disposed in an upright position so as to be substantially parallel with a right or left side surface of the housing.

According to still another aspect, there is provided a reading/printing apparatus in which an original convey type reading apparatus for reading an original while conveying the original, a serial printing type printing apparatus for performing printing by scanning a printing head in a main scan direction while scanning a printing sheet in a sub-scan direction, and a control board are disposed in a housing, characterized in that the original convey type reading apparatus, the serial printing type printing apparatus, and the control board are discretely constituted, the original convey type reading apparatus is so disposed that one side surface of the original convey type reading apparatus is substantially parallel with one opposing side surface of the housing, the serial printing type printing apparatus is so disposed that one side surface of the serial printing type printing apparatus is substantially parallel with another opposing side surface of the housing, and the control board is disposed in an upright position on a side surface connecting the one side surface and another side surface of the housing.

According to still another aspect, there is provided a reading/printing apparatus in which an original convey type reading apparatus for reading an original while conveying the original, a serial printing type printing apparatus for performing printing by scanning a printing head in a main scan direction while scanning a printing sheet in a sub-scan direction, and a control board are disposed in a housing, characterized in that the original convey type reading apparatus, the serial printing type printing apparatus, and the control board are discretely constituted, the original convey type reading apparatus is so disposed that a longitudinal direction of the original convey type reading apparatus is substantially parallel with a front surface of the housing, the serial printing type printing apparatus is so disposed that a longitudinal direction of the serial printing type printing apparatus is substantially parallel with a rear surface of the housing, and the control board is disposed in an upright position so as to be substantially parallel with a right or left side surface of the housing.

According to still another aspect, there is provided a reading/printing apparatus in which a reading apparatus, a printing apparatus, a control board, and a power supply are disposed inside a housing obtained by integrally forming a base portion serving as a bottom surface, side walls serving as outer side surfaces, and an opening surrounded by the side walls, characterized in that the reading apparatus, the printing apparatus, the control board, and the power supply are discretely constituted, the housing comprises a first housing integrally formed with enough strength to separately fix the base portion, lower portions of the side walls, the reading apparatus, the printing apparatus, the control board, and the power supply, and a second housing covering the opening and integrally forming upper portions of the side walls, and the second housing is fixed to the first housing by elastic deformation so as to cover the opening of the first housing.

According to still another aspect, there is provided a reading/printing apparatus in which an original convey type reading apparatus for reading an original while conveying the original, a serial printing type printing apparatus for performing printing by scanning a printing unit in a main scan direction while scanning a printing sheet in a sub-scan direction, a control board, and a power supply are disposed inside a housing obtained by integrally forming a base portion serving as a bottom surface, side walls serving as outer side surfaces, and an opening surrounded by the side walls, characterized in that the original convey type reading apparatus, the serial printing type printing apparatus, the control board, and the power supply are discretely constituted, the housing comprises a first housing integrally formed with enough strength to separately fix the base portion, lower portions of the side walls, the original convey type reading apparatus, the serial printing type printing apparatus, the control board, and the power supply, and a second housing covering the opening and integrally forming upper portions of the side walls, and the second housing is fixed to the first housing by elastic deformation so as to cover the opening of the first housing.

According to still another aspect, there is provided a reading apparatus in which a reading unit, a control board, and a power supply are disposed inside a housing obtained by integrally forming a base portion serving as a bottom surface, side walls serving as outer side surfaces, and an opening surrounded by the side walls, characterized in that the reading unit, the control board, and the power supply are discretely constituted, the housing comprises a first housing integrally formed with enough strength to separately fix the base portion, lower portions of the side walls, the reading unit, the control board, and the power supply, and a second housing covering the opening and integrally forming upper portions of the side walls, and a different type of the reading unit can be attached to and replaced with respect to the housing.

According to still another aspect, there is provided a reading apparatus in which a reading unit, a control board, and a power supply are disposed inside a housing obtained by integrally forming a base portion serving as a bottom surface, side walls serving as outer side surfaces, and an opening surrounded by the side walls, characterized in that the reading unit, the control board, and the power supply are discretely constituted, the housing comprises a first housing integrally formed with enough strength to separately fix the base portion, lower portions of the side walls, the reading unit, the control board, and the power supply, and a second housing covering the opening and integrally forming upper portions of the side walls, and the control board can be replaced with respect to the housing.

According to still another aspect, there is provided a reading/printing apparatus in which a reading unit, a printing unit, a control board, and a power supply are disposed inside a housing obtained by integrally forming a base portion serving as a bottom surface, side walls serving as outer side surfaces, and an opening surrounded by the side walls, characterized in that the reading unit, the printing unit, the control board, and the power supply are discretely constituted, the housing comprises a first housing integrally formed with enough strength to separately fix the base portion, lower portions of the side walls, the reading unit, the printing unit, the control board, and the power supply, and a second housing covering the opening and integrally forming upper portions of the side walls, and a different type of the reading unit can be attached to and replaced with respect to the housing.

According to still another aspect, there is provided a reading/printing apparatus in which a reading unit, a printing unit, a control board, and a power supply are disposed inside a housing obtained by integrally forming a base portion serving as a bottom surface, side walls serving as outer side surfaces, and an opening surrounded by the side walls, characterized in that the reading unit, the printing unit, the control board, and the power supply are discretely constituted, the housing comprises a first housing integrally formed with enough strength to separately fix the base portion, lower portions of the side walls, the reading unit, the printing unit, the control board, and the power supply, and a second housing covering the opening and integrally forming upper portions of the side walls, and the control board can be replaced with respect to the housing.

According to still another aspect, there is provided a reading/printing apparatus in which a reading unit, a printing unit, a control board, and a power supply are disposed inside a housing obtained by integrally forming a base portion serving as a bottom surface, side walls serving as outer side surfaces, and an opening surrounded by the side walls, characterized in that the reading unit, the printing unit, the control board, and the power supply are discretely constituted, the housing comprises a first housing integrally formed with enough strength to separately fix the base portion, lower portions of the side walls, the reading unit, the printing unit, the control board, and the power supply, and a second housing covering the opening and integrally forming upper portions of the side walls, and the control unit can be replaced with respect to the housing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a perspective exploded view showing the way an upper cover 200 is fixed to a lower cover 100;

DETAILED DESCRIPTION OF THE PREFERRED EMBODIMENTS

Preferred embodiments of the present invention will be described in detail below with reference to the accompanying drawings.

Figure 1:
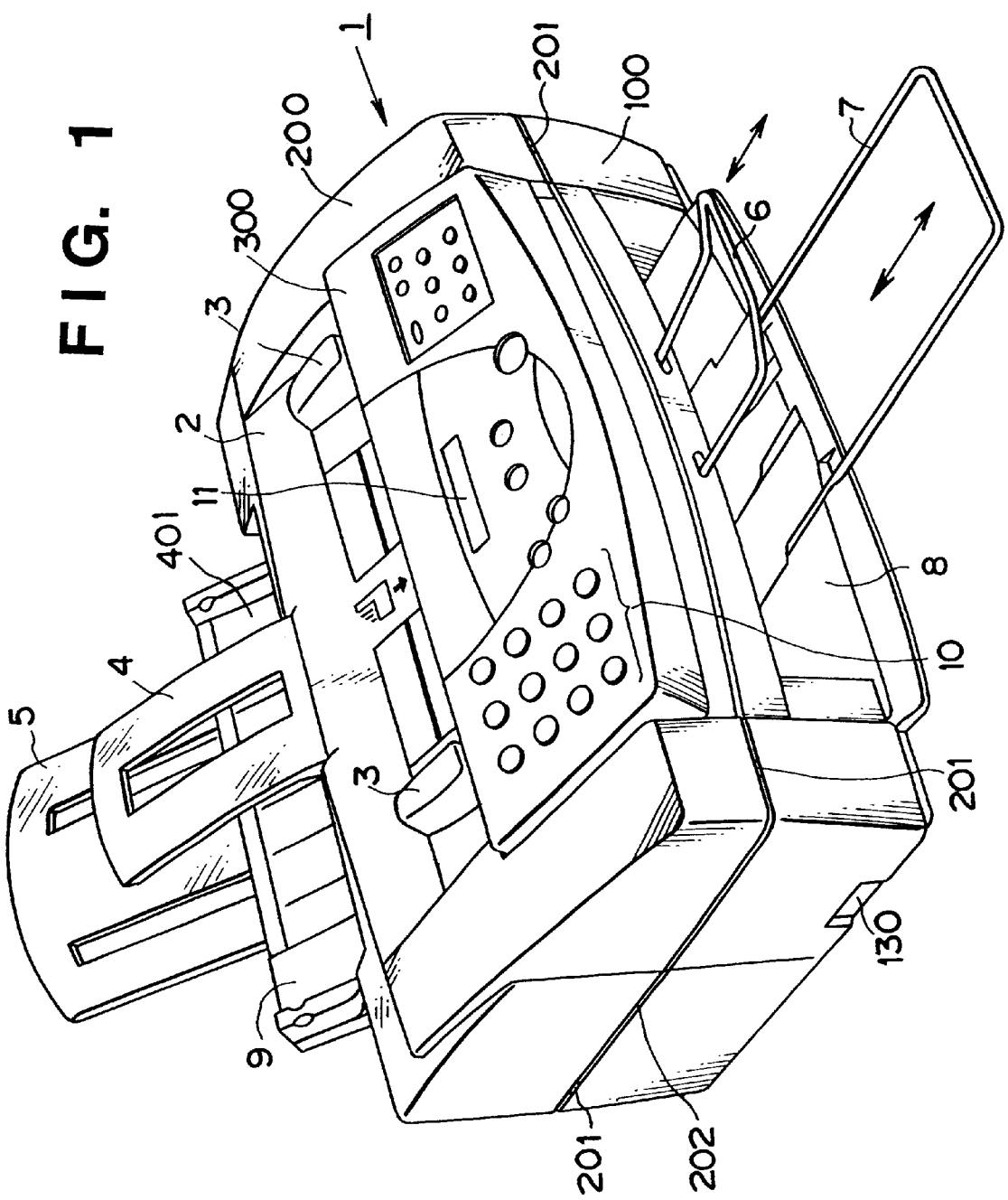
FIG. 1 is an external perspective view of an apparatus of the present invention constituted as a facsimile apparatus.

FIG. 1 is a perspective view showing the outer appearance of a reading/printing apparatus constituted as a facsimile apparatus. In addition to such a facsimile apparatus, this reading/printing apparatus is so designed as to be connected to, e.g., a personal computer to constitute a reading/printing apparatus as a so-called peripheral equipment obtained by simply uniting a document reading apparatus and a printing apparatus for separately or simultaneously performing an operation of reading an image of a sheet original and an operation of printing the image on a printing sheet.

Therefore, as will be described later, individual components such as a printing apparatus, a reading apparatus, a control circuit board unit, and a power supply unit are separately arranged so as to be easily replaced and attached or detached.

Also, particularly a housing is so designed as to be integrally formed by an injection resin mold by using a predetermined resin material such as a high-impact polystyrene resin or an ABS resin. Since an enormous initial investment is necessary when a die set which is set in a molding apparatuses is included, the final shape of the housing is determined after the shape and the use state of the housing are well considered. Furthermore, minimizing fixation using machine screws often used in the manufacturing process of the apparatus greatly contributes to a reduction of the manufacturing cost. Therefore, no machine screws are used except for an electrical ground in principle.

An outline of the apparatus will be described below with reference to FIG. 1.

Referring to FIG. 1, a facsimile apparatus 1 as a reading/printing apparatus has a housing which forms the front, rear, right, and left walls. This housing incorporates a scanner unit 300 as an original convey type reading apparatus, a serial printing type printing apparatus as a printing apparatus, a control board unit, and a power supply unit.

The housing is basically constituted by a lower cover 100 as a first housing on the lower side, an upper cover 200 as a second housing on the upper side, and a rear cover which is a third housing (to be described later) for guiding a printing sheet and covering the power supply unit.

An original table 2 having original width adjusting plates 3, whose width can be adjusted to guide an original in the widthwise direction, is pivotally supported by the upper cover 200. The original width adjusting plates 3 can be symmetrically moved with respect to their central position by moving only one of them. This pivotal original table 2 allows access to a printing head.

A detachable original support table 4 is provided behind the original table 2. When an A4-size original, for example, is conveyed forward in the direction of the scanner unit 300, the original support table 4 prevents the trailing edge from hanging down.

Also, an original conveyed forward with its original surface faced downward is conveyed from below the scanner unit 300 to the front of the apparatus 1 and placed on an original support bar 6. This original support bar 6 can be moved back and forth with respect to the apparatus 1 as indicated by an arrow.

On the other hand, a printing sheet which is fed toward the printing apparatus is regulated in the widthwise direction by a width adjusting plate 9 provided on a printing sheet table 401 disposed on the back side of the apparatus 1. This printing sheet is subjected to serial printing in a printer unit (to be described later) and delivered to a printing sheet table 8 below the scanner unit 300. When this printing sheet is fed along its longitudinal direction from the rear to the front of the apparatus, a printing sheet support table 5 on the rear side and a printing sheet support bar 7 on the front side prevent the edges of the sheet from handing down. The support table 5 is incorporated in the printing sheet table 401 and suitably pulled out to the position shown in FIG. 1. The printing sheet support bar 7 on the front side can be pulled forward and pushed backward like the original support bar described above.

As shown in FIG. 1, the upper cover 200 surrounds the scanner unit 300. This upper cover 200 can be removed from the lower cover 100 along an edge 202 as will be described later. Consequently, the scanner unit 300 can be left behind on the lower cover 100.

An operation unit including a liquid crystal display 11, dial keys 10, and the like is arranged on the scanner unit 300 as shown in FIG. 1. When the apparatus 1 is used as an apparatus other than a facsimile apparatus, this operation unit is properly changed.

Similarly, monochrome and color CCD line image scanners can be easily interchanged in the scanner unit 300 because the scanner unit 300 is readily detachable from the lower cover 100 as will be described later.

Figure 2:
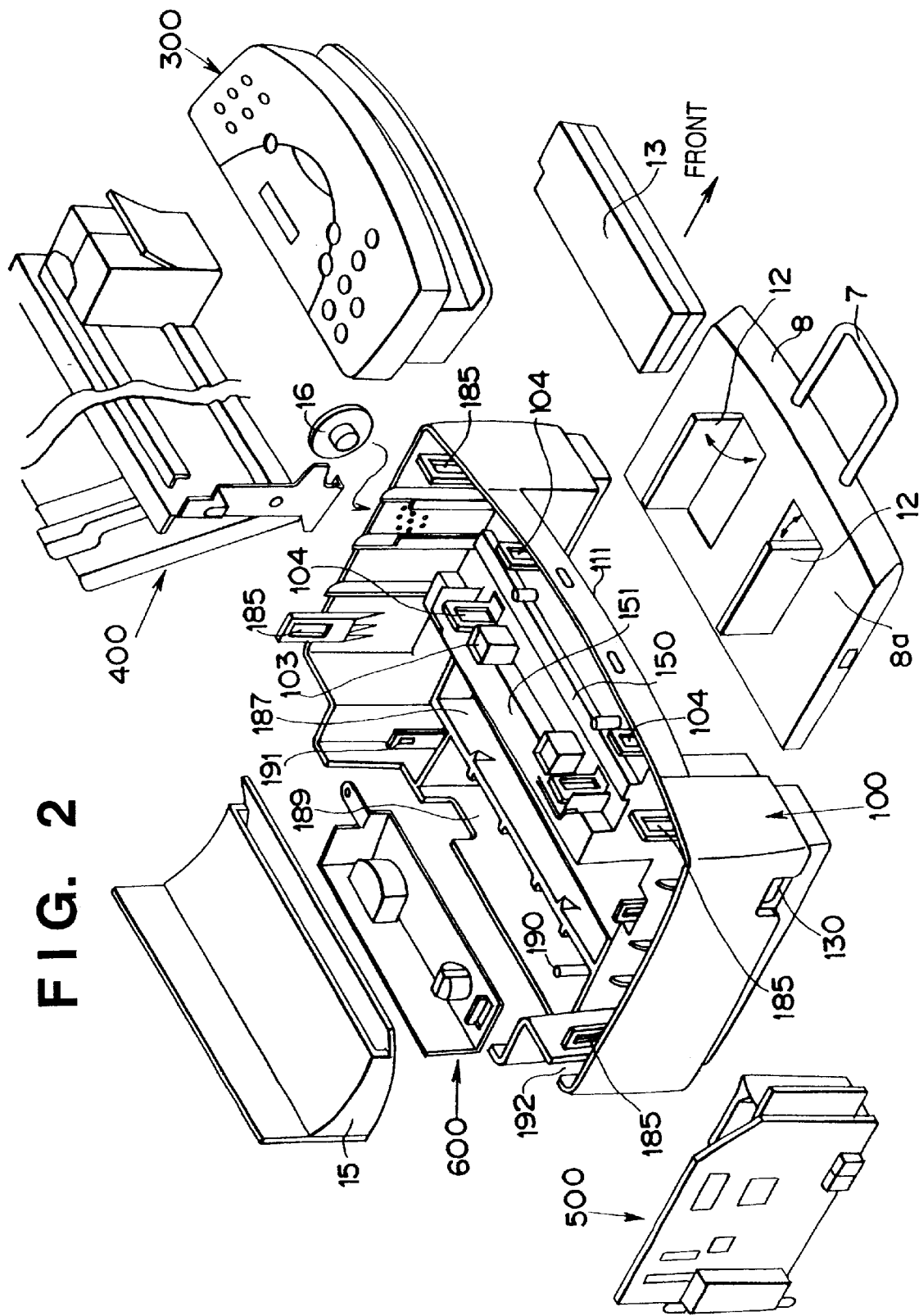
FIG. 2 is an exploded perspective view of an apparatus 1 shown in FIG. 1.

FIG. 2 is an exploded perspective view of the apparatus 1, from which the upper cover 200 is omitted.

In FIG. 2, the same reference numerals as above denote the parts already described, and a detailed description thereof will be omitted. The lower cover 100 obtained by integrally forming a base portion as the bottom surface, side walls as the outer surfaces, and an opening surrounded by these side walls incorporates the scanner unit 300, a printer unit 400, a control board unit 500, a power supply unit 600, an ink absorber 13, a rear cover 15, the printing sheet table 8, and a loudspeaker 16. The scanner unit 300 is an original convey type reading apparatus which reads an original while conveying it. The printer unit 400 is a serial printing type printing apparatus which performs serial printing while conveying a printing sheet. The control board unit 500 and the power supply unit 600 are connected to these components and perform predetermined control. The ink absorber 13 absorbs unnecessary ink after initial discharge. All of these components can be fixed to the lower cover 100 without using any tools.

This realizes a very simple manufacturing line when assembly is automated. That is, even an unskilled worker can perform assembly. Alternatively, assembly can be performed by a simple operation by which a robot apparatus holds each unit and moves the unit downward. Therefore, an initial investment including injection molds can be well compensated for by the simplified parts assembly steps.

The upper cover 200 can also be similarly fixed without using any tools. Referring back to FIG. 1, to remove the upper cover 200 from the lower cover 100, tool inserting holes 201 are formed in the cover joint surface in order to externally disengage engaging portions 185 which are female-male engaging portions. By inserting a tool into each hole 201, the engaging portion 185 is elastically deformed and disengaged.

A paper feed unit is connected to the printer unit 400. In the scanner unit 300, a scanner main body and a panel unit are so connected as to be openable about a hinge (not shown). The control board unit 500 collectively controls the printer unit 400 and the scanner unit 300. The power supply unit 600 supplies power to the printer unit 400, the scanner unit 300, and the control board unit 500.

These units are independently constituted as shown in FIG. 2, and each unit is fixed to the lower cover 100. The lower cover 100 and the upper cover 200 are separated substantially horizontally (as indicated by heights H1 and H2 in FIG. 6) in substantially the middle of the total height of the apparatus 1. The engaging portions 185 as female-male engaging portions in the four corners and pawls engage with each other to form the outer casing.

Figure 3:
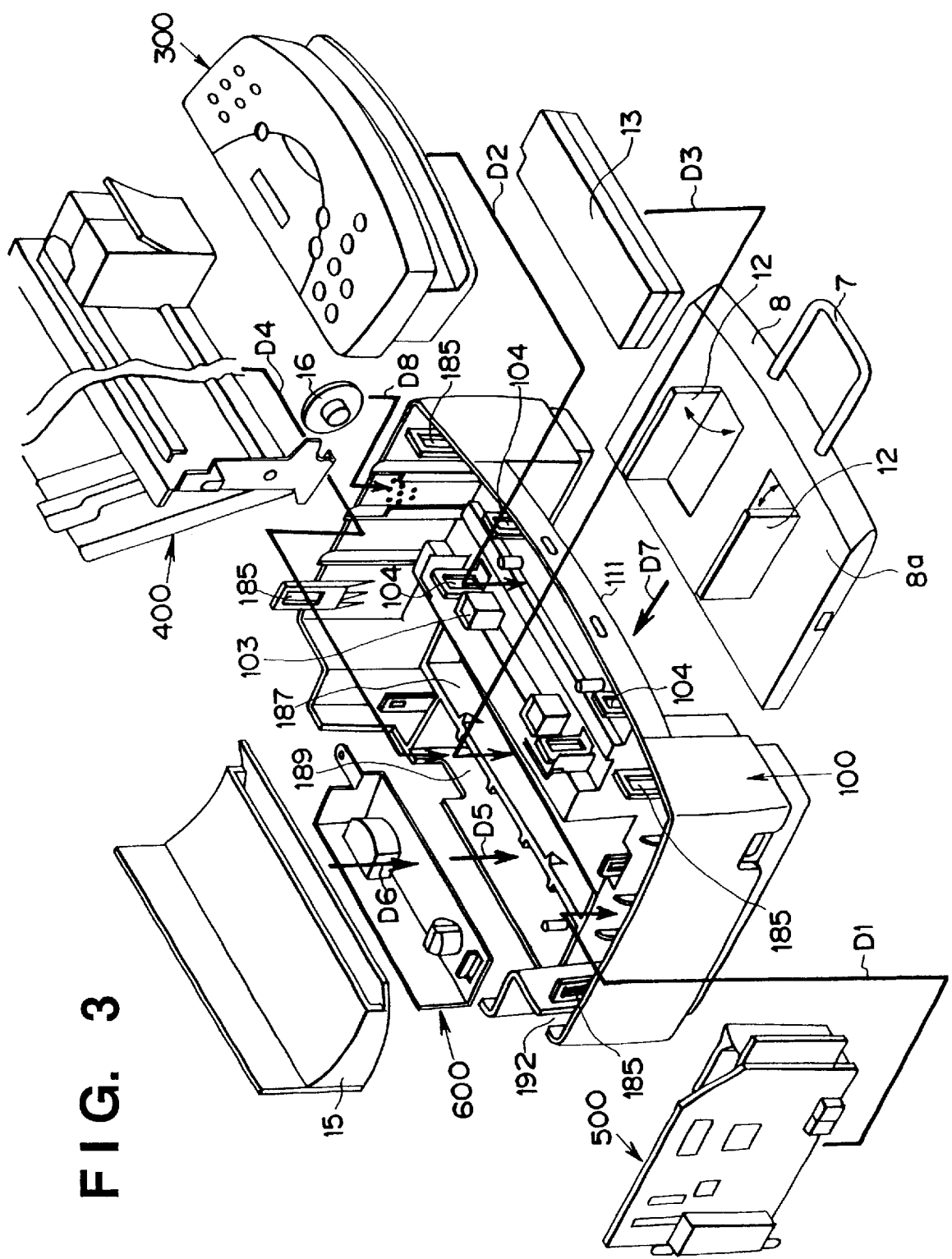
FIG. 3 is an exploded perspective view showing the way the apparatus 1 shown in FIG. 1 is assembled.

FIG. 3 is a perspective view of the outer appearance showing the way each unit shown in FIG. 2 is moved when the unit is fixed to the lower cover 100. A robot apparatus as described above can be used to move each unit.

Referring to FIG. 3, the control board unit 500 is moved in the direction of an arrow D1 and fixed to the lower cover 100. The scanner unit 300 is moved in the direction of an arrow D2 and fixed to the lower cover 100. The ink absorber 13 is moved in the direction of an arrow D3 and fixed to the lower cover 100. The printer unit 400 is moved in the direction of an arrow D4 and fixed to the lower cover 100. The power supply unit 600 is moved in the direction of an arrow D5 and fixed to the lower cover 100. The rear cover 15 is moved in the direction of an arrow D6 and fixed to the lower cover 100. The printing sheet table 8 is moved in the direction of an arrow D7 and fixed to the lower cover 100. A pair of thick-printing sheet support plates 12 are provided on a placement surface 8a of the printing sheet table 8. When printing is performed for a thick printing sheet, the thick-printing sheet support plates 12 are pivoted in the directions of arrows so as to prevent the edges of the sheet from hanging down, thereby holding the positions of these edges.

FIG. 4 is a perspective view of the outer appearance showing the way the upper cover 200 is fixed after each unit is fixed to the lower cover 100 as shown in FIG. 3. Referring to FIG. 4, the original table 2 is vertically opened and closed by fitting right and left projections 2a, in the directions of arrows D9, into holes 205 formed in the upper cover 200.

Also, pawls 202 indicated by the broken lines are formed on the inner surfaces of the side walls forming the side surfaces of the upper cover 200 in positions where these pawls 202 oppose the engaging portions 185.

The holes 201 are formed below the pawls 202 by partially notching an edge 203. This edge 203 is clamped between ribs (to be described later) of the lower cover 100 and the inner wall surfaces and does not deform even when an external force acts on it. The upper cover 200 with the above arrangement is moved in the direction of an arrow D10 and fixed to the lower cover 100 by engaging the four pawls 202 with the engaging portions 185.

Figure 5:
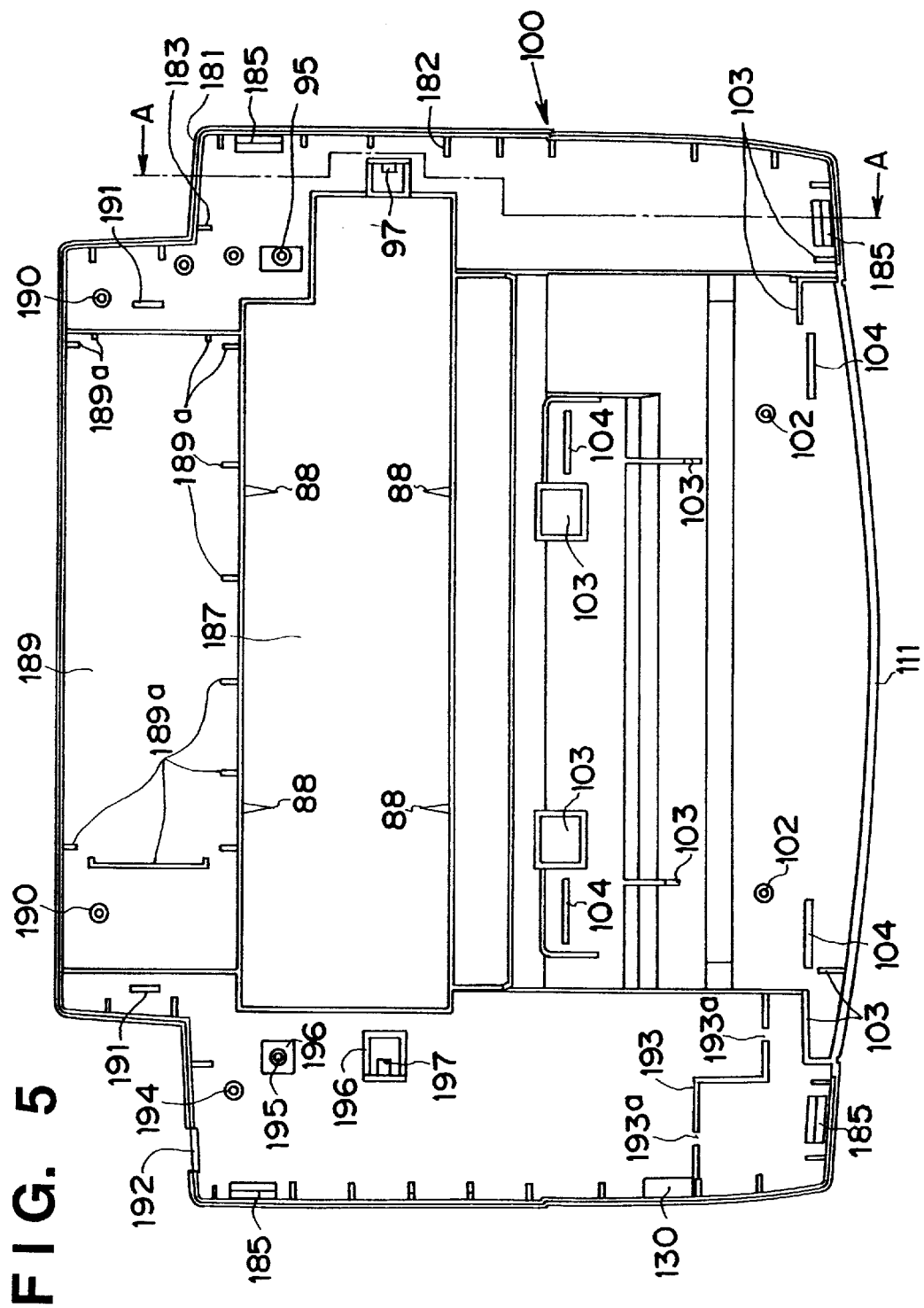
FIG. 5 is a plan view of the lower cover 100.
Figure 6:
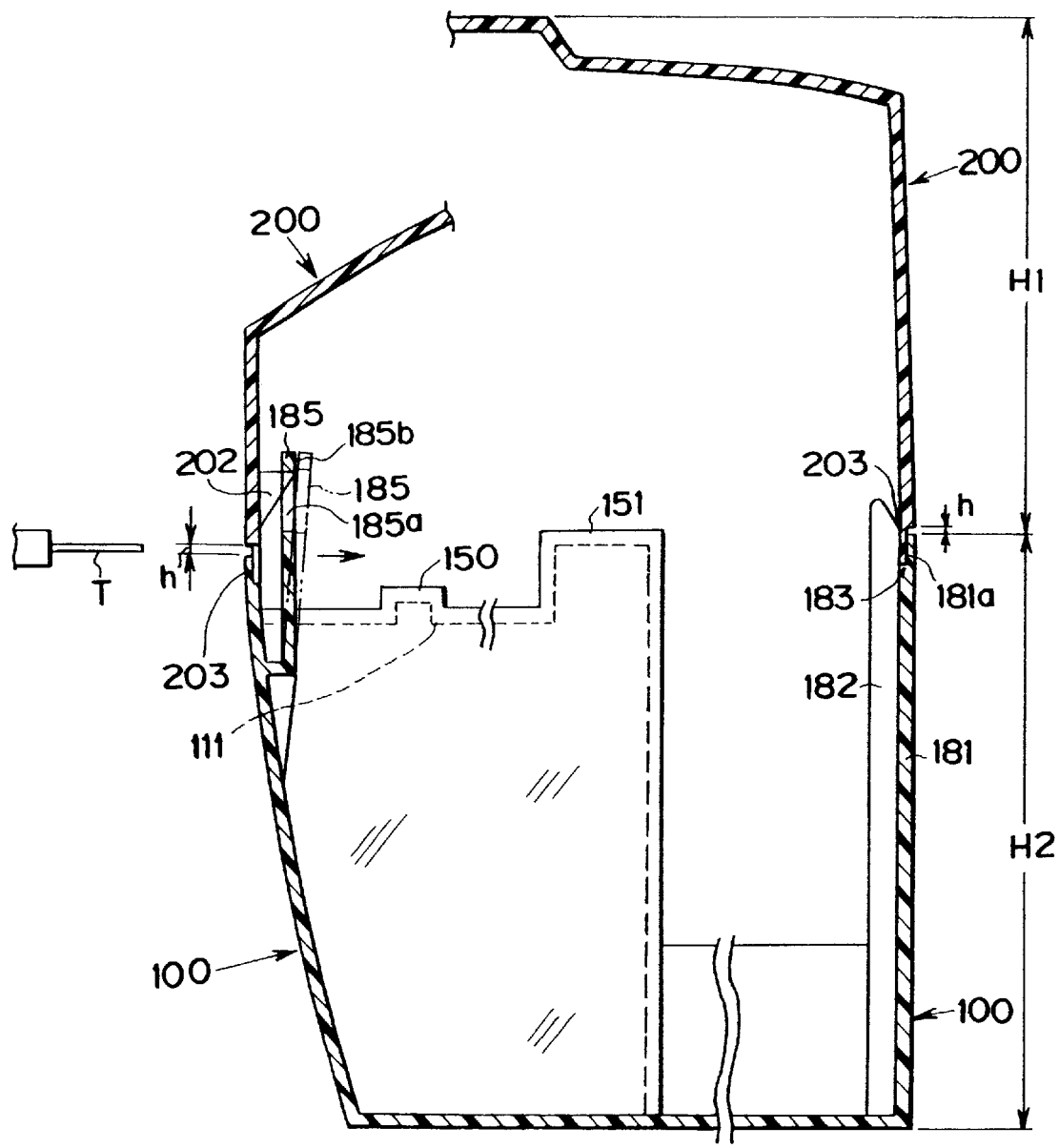
FIG. 6 is a sectional view taken along a line A—A in FIG. 5 after the upper cover is attached.

That is, in a plan view of the lower cover 100 in FIG. 5 and a sectional view of FIG. 6 taken along a line A—A in FIG. 5, the covers are divided into upper and lower portions in substantially the middle of the height of the product, and the outer circumferential portions of these covers are vertically fitted. More specifically, a thin-wall portion 181a is formed around the upper portion of an outer wall 181 of the lower cover 100, and a number of lower cover ribs 182 are so formed as to vertically extend from the outer wall.

On the other hand, the edge 203 serving as a thin-wall portion is formed around the outer wall of the upper cover 200. Therefore, the edge 203 of the upper cover thin-wall portion enters into a gap 183 defined between the lower cover thin-wall portion 181a and the lower cover ribs 182. Consequently, the outer walls of the upper and lower covers are fitted in each other to determine the front, rear, right, and left positions, thereby ensuring the rigidity.

The height of the edge 203 is made larger by a predetermined amount than the thin-wall portion 181 to form a gap h. That is, a slit is formed around the entire horizontal seam between the upper and lower covers to make the seam inconspicuous. Also, this slit achieves a designing effect by which the product looks low. The engaging portions 185 which are snap pawls which elastically deform are formed in four corners inside the outer walls of the lower cover, and holes 185a are formed in these engaging portions. Additionally, the triangular pawls 202 are formed on the upper cover in positions where they are fitted in these holes 185a.

Accordingly, when the upper cover 200 is moved down in the direction of the arrow D10 (FIG. 4) in engaging the upper and lower covers 100 and 200, the triangular pawls 202 extend the snap pawl engaging portions 185 to positions 185b (indicated by the alternate long and two dashed lines in FIG. 6). When the holes 185a come to portions above the pawls 202, the engaging portions 185 return to the original positions. As a consequence, even when the upper cover 200 is pulled up, the pawls 202 raise the engaging portions 185 to keep the upper and lower covers engaged with each other, so the upper and lower covers cannot be removed from each other.

On the other hand, notches serving as the holes 201 are formed in the thin-wall portion 203 of the upper cover 200. To remove the upper cover 200, a tool T is inserted from this notch 201 to elastically deform the snap pawl engaging portion 185 inward. Consequently, the lower and upper covers 100 and 200 can be disengaged.

As described above, the upper and lower covers are engaged by the outer circumferential walls, and the fixing pawls are formed near the outer circumference. This increases the outer casing strength. Additionally, since these covers are attached and detached by using the elastic deformation of the pawls, no screws need to be used to perform fixation. This improves the workability of attaching and detaching.

The lower cover 100 shown in FIG. 5 has several compartments to ensure predetermined strength, as also shown in FIG. 2. The power supply unit 600 is accommodated in a compartment 189. After a projection 189a regulates the outer circumference of the power supply unit so that the power supply unit does not move, the rear cover 15 is fixed.

The outer shape of a compartment 187 is so determined as to accommodate the ink absorber 13 in an immobile state. Additionally, projecting ribs 88 sink into portions of the absorber 13 to control changes in the shape caused by drying. The lower cover 100 has a compartment 87 having substantially the same shape and area as the absorber 13, and the vertical ribs 88 are formed in the compartment 87. The absorber 13 is placed in the compartment 87, and previously cut slits enter into the ribs 88 to prevent the removal of the absorber 13. The height of the compartment 87 is set to be larger than the height of the absorber 13 so that waste ink absorbed by the absorber 13 does not overflow.

Referring back to FIG. 2, four engaging portions 104 are formed above an opening 111 and engage with the pawls of the scanner unit 300. Also, portions of the scanner unit 300 are positioned on the engaging portions 104 to receive an external force. Studs 102 receive the bottom surface, and guides 103 roughly guide the scanner unit 300. When an impact force acts, these parts receive the external force.

When the control board unit is fitted in notches 193a formed in the wall 193, the control board unit is fixed in an upright position such that a connector 555 is positioned in a notch 192 behind the control board unit.

Holes to be engaged with right and left engaging portions 197 are formed in the main body of the printer unit 400. After being roughly guided by guides 195, the main body is fixed on a bottom surface 196. Through holes are formed below the engaging portions 197, so tools can also be inserted from the bottom surface.

The individual units are set in positions where they do not interfere with each other in the longitudinal and lateral directions. Therefore, these units can be fixed to the lower cover 100 in no special order. This improves the facility with which these units are assembled. Additionally, since only a necessary unit can be removed, the facility with which each unit is maintained can be improved.

Also, the upward movement of the power supply unit 600 can be regulated by a portion of the printer unit 400, and the upward movement of the control board unit 500 can be regulated by a portion of the scanner unit 300. If this is the case, the power supply unit 600 and the control board unit 500 can be easily fixed to the lower cover 200. This further improves the facility with which these units are assembled.

Figure 7:
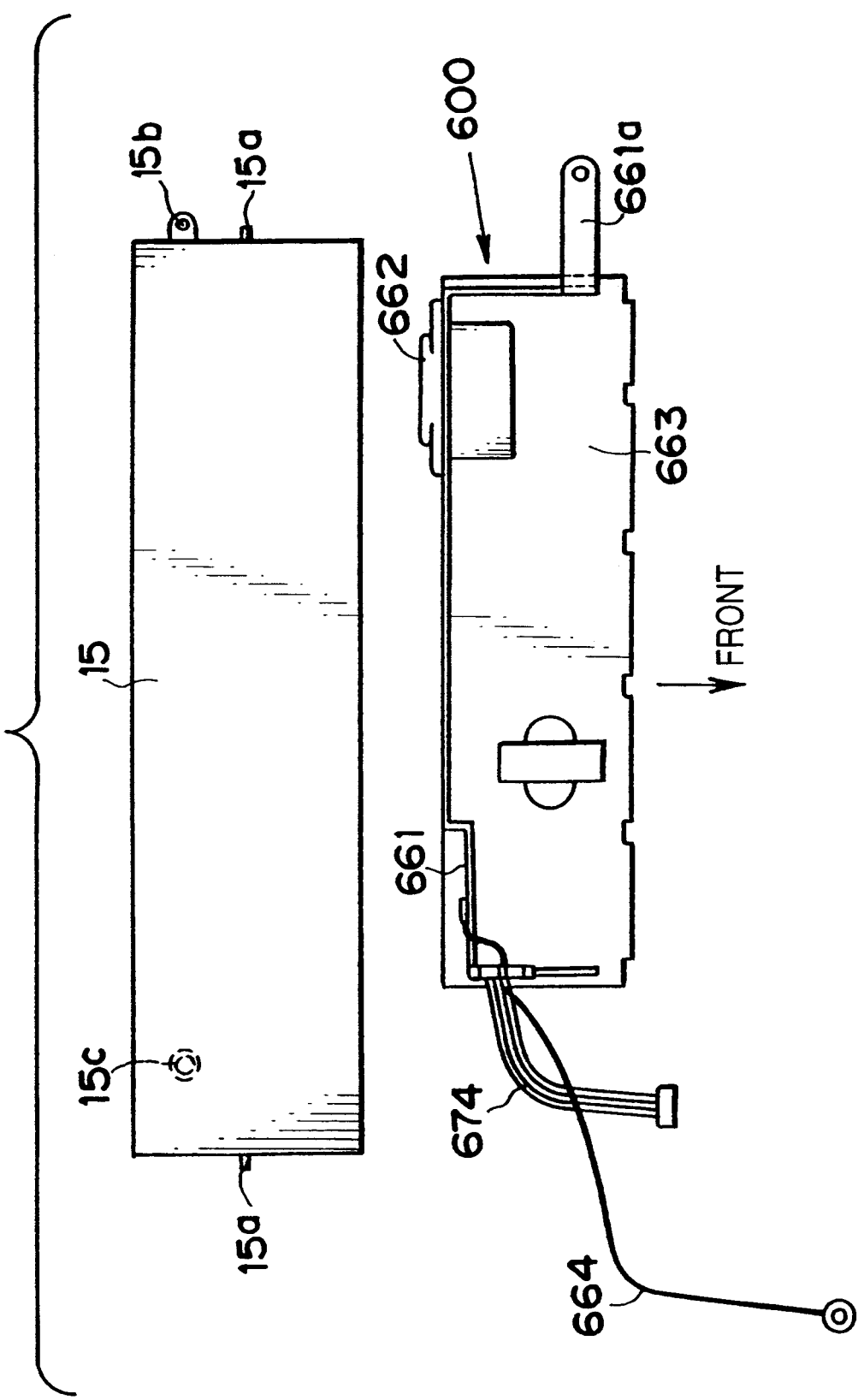
FIG. 7 is a plan view of a rear cover 15 and a power supply unit 600.

FIG. 7 is a plan view of the rear cover 15 and the power supply unit 600. Engaging pawls 15a and projections 15b are integrally formed on the rear cover. A ground line 664, a ground tab 661a, and cables 674 of the power supply unit 600 are fixed on a board 663. Reference numeral 662 denotes an AC plug socket.

Figure 8:
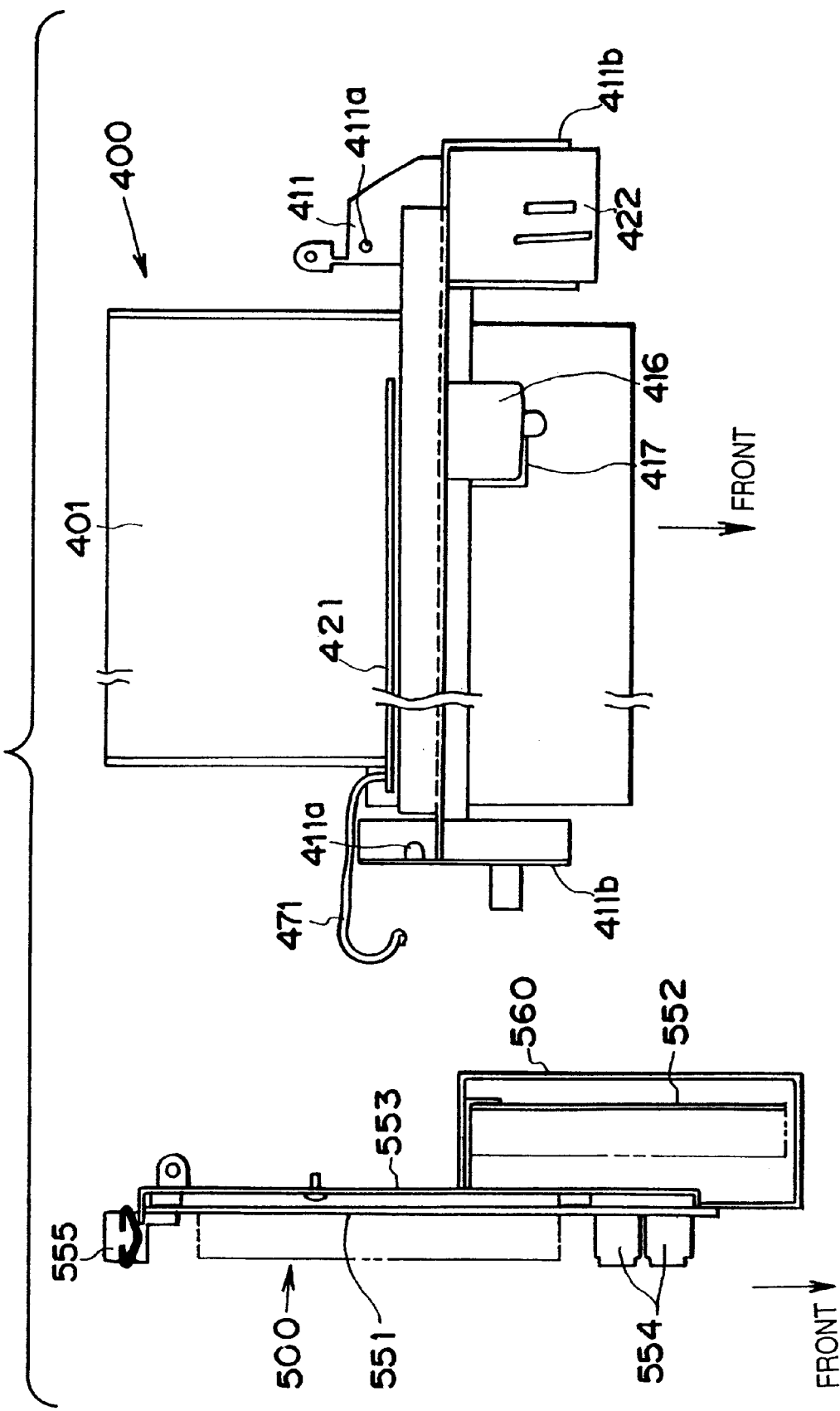
FIG. 8 is a plan view of a control board unit 500 and a printer unit 400.

FIG. 8 is a plan view of the control board unit 500 and the printer unit 400. A main board 551, a sub-board 552, and a board chassis 553 of the control board unit 500 are fixed as an integrated unit to the lower cover 100 by a method to be described later. The control board unit 500 is arranged in an upright position to the left of the lower cover, i.e., beside the printer unit 400 and the scanner unit 300. On the main board 551, therefore, a control circuit and a connector for the printer unit 400 can be provided on the rear side, and a control circuit and a connector for the scanner unit 300 can be provided on the front side. Consequently, it is possible to efficiently arrange the circuits, miniaturize the control board unit, and makes the control board unit strong against noise.

In the printer unit 400, a middle plate of a paper feed unit 401 is supported by a support point (not shown) and urged by a spring. The base 401 is fixed to the printer main body 400 by screws or the like. Printing sheets S are stacked on the middle plate. The lower surface of the printing sheet S is supported by a paper feed tray provided on the paper feed base so as to be freely extended and contracted. Side guides movably formed on the middle plate regulate the positions of the printing sheets S in the widthwise direction.

The printer main body 400 is a so-called ink-jet printing apparatus. A printer chassis 411 serving as a frame of the printer main body 400 is fixed to the lower cover 100 by being engaged with the engaging portions 197. A paper feed roller 412 is urged by a pinch roller 413 arranged to oppose the paper feed roller 412 and feeds the printing sheet S supplied from the paper feed unit toward a printing unit on the downstream side. A platen 414 supports the lower surface of the printing sheet in the printing unit. An image to be printed is formed on the upper surface of the printing sheet by an ink head 417 mounted on a carriage 416 which moves back and forth while being supported by a guide shaft 415.

The printing sheet S is then delivered from the printer unit 400 by a printing sheet delivery roller pair 418 and stacked on the printing sheet table 8 provided in the lower cover 100.

The printing sheet feeding and the printing operation by the printer unit 400 are performed by motors, sensors, and head driving circuits (none of them is shown), and the control board unit 500 controls these components. A board 421 is a printing relay board which relays signals from these motors, sensors, and head driving circuits and transfers these signals to the control board unit. The absorber 13 which absorbs and holds waste ink produced when an operation of preventing clogging of ink is performed in the printer unit 400 is attached to the lower cover 100 as described above.

Figure 9:
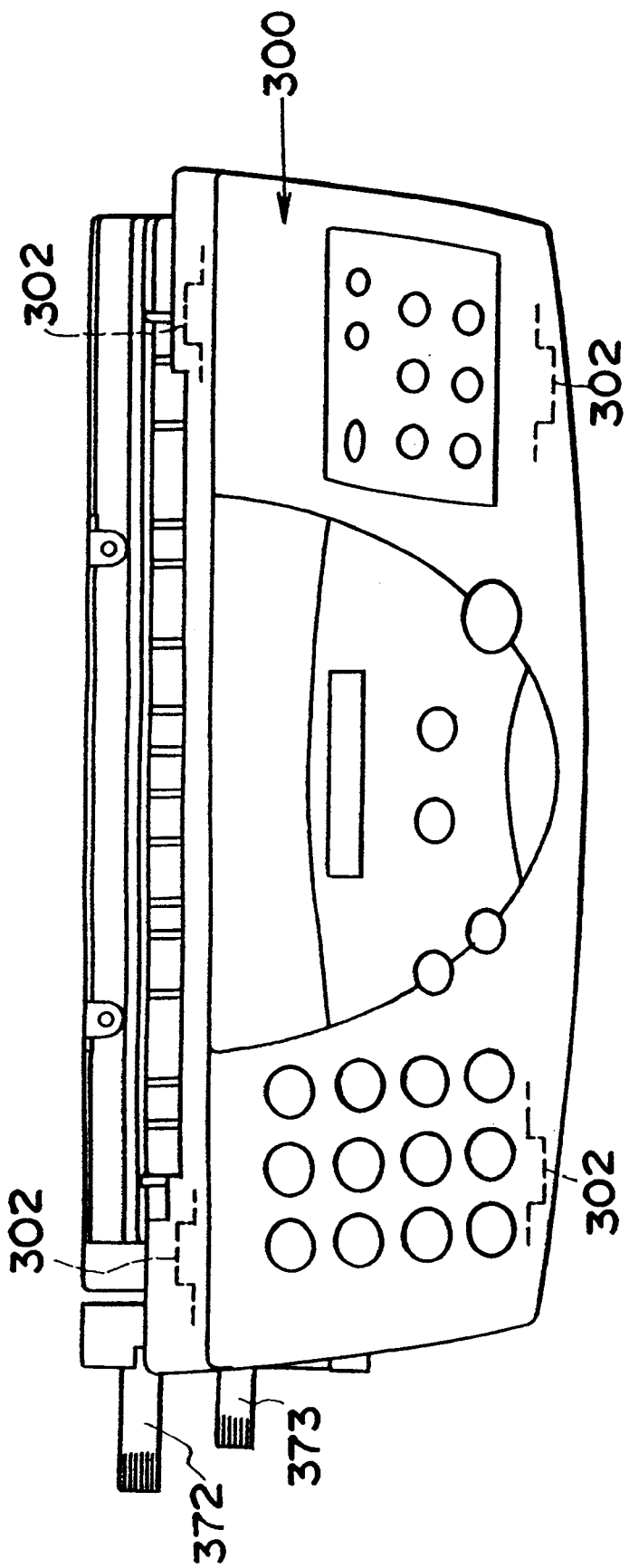
FIG. 9 is a plan view of a scanner unit 300.

The scanner unit 300 will be described below with reference to FIGS. 9 and 13.

The scanner unit 300 irradiates light onto the original G, converts the reflected light into an electrical signal, and transmits the signal to another apparatus or the printer unit 400 in accordance with an operation mode. The original G is placed on the original table 2.

In the scanner main body 300, a scanner base 334 functions as the frame of the scanner unit 300 and guides the lower side of the original G. This scanner base 334 includes a separation roller 335 for feeding the original, a contact sensor 336 for reading image information of the original, and a roller 337 opposed to and pushed against the contact sensor 336.

Also, the panel unit includes an upper original guide 338, a separation piece 339, and a panel frame 340. The upper original guide 338 is pivotally attached to the scanner base 334 by a support point (not shown) and guides the upper side of the original. The separation piece 339 is opposed to and pushed against the separation roller 335. The panel frame 340 forms a part of the outer casing and is attached to the upper original guide. The panel frame 340 includes operation keys 341, a display unit 342 such as an LCD, and a panel board 343 on which these parts are mounted.

An original delivery roller pair 344 stacks originals, fed by the separation roller 335 and the CS roller 337, on an original delivery table. The original feeding and the reading operation by the scanner unit 300 are performed by motors and sensor driving circuits (none of them is shown). The control board unit 500 controls these components and also controls display on a panel unit 3002.

Figure 11:
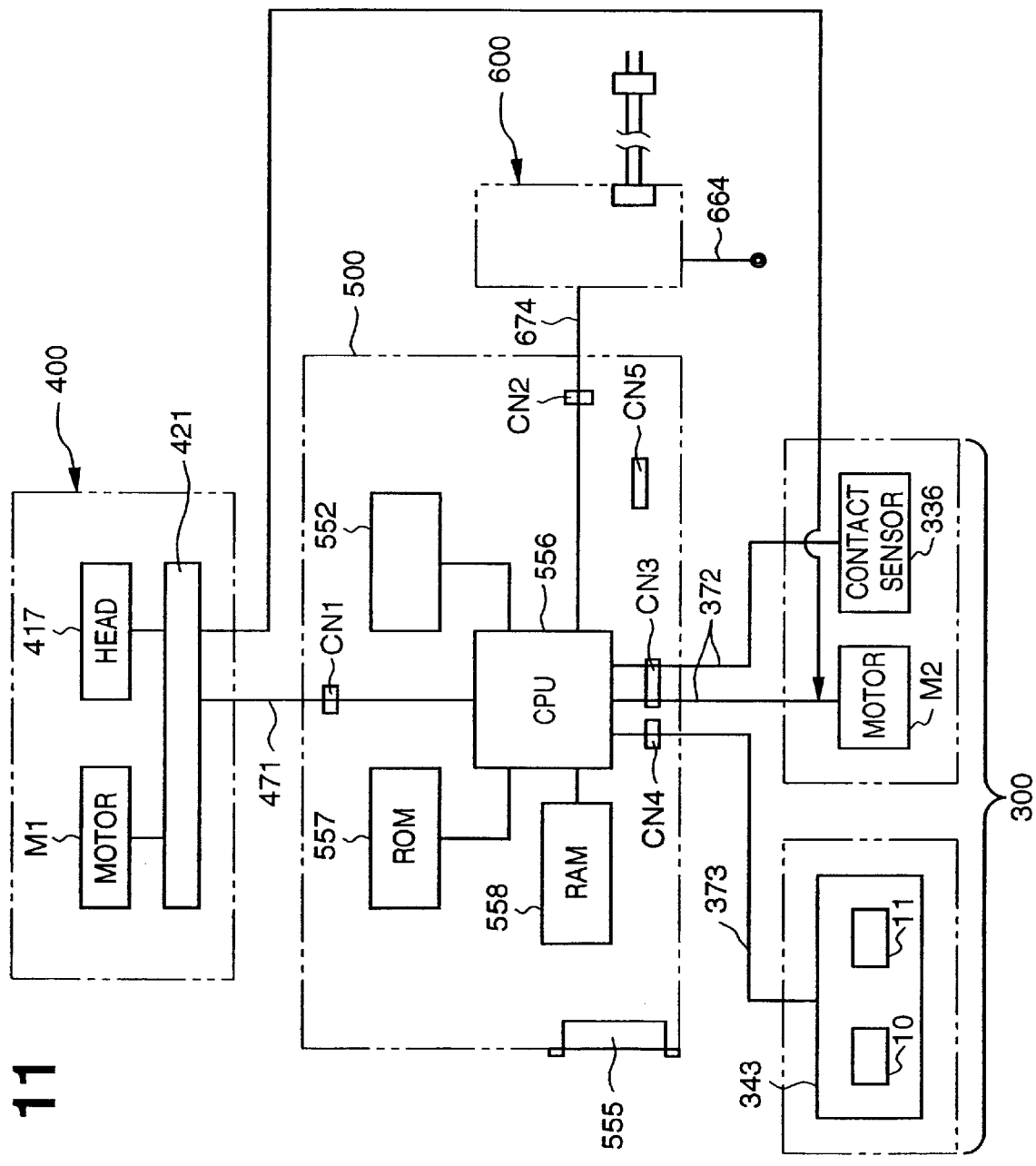
FIG. 11 is a block diagram showing the connections of the individual units.
Figure 12:
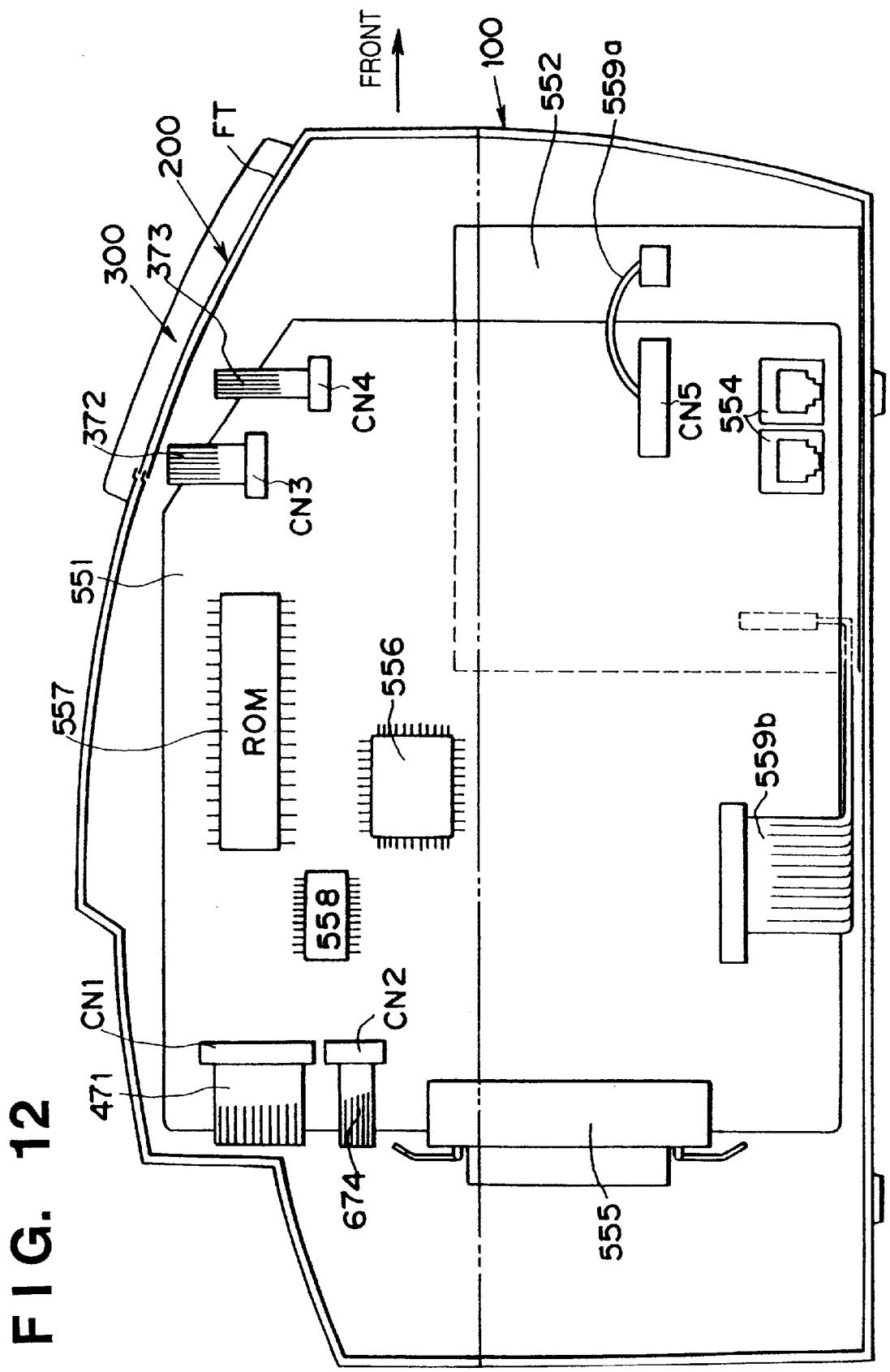
FIG. 12 is a front view of the control board unit.

The control board unit 500, the power supply unit 600, and the arrangement and electrical connection between these and other units will be described below with reference to FIGS. 10, 11, and 12.

The control board unit 500 is obtained by attaching the main board 551 and the sub-board 552 to the board chassis 553 made of a metal. On the main board 551, a modular jack 554, a Centronics connector 555, a CPU 556, a ROM 557, and a RAM 558 are mounted.

Figure 10:
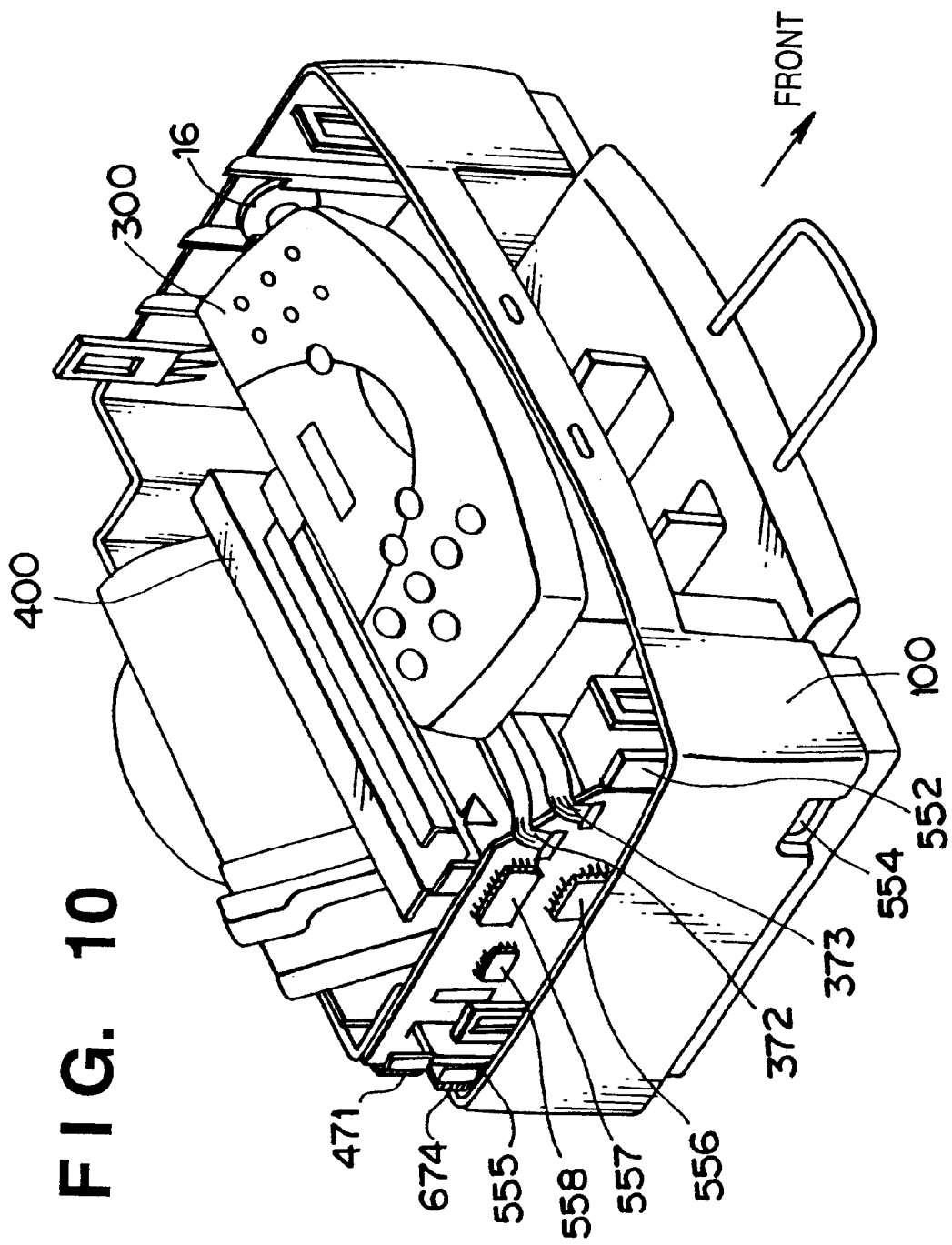
FIG. 10 is a perspective view showing the outer appearance in the state after individual units are fixed to the lower cover 100.

The CPU 556 and the ROM 557 which are frequently replaced are positioned above substantially the center of the main board 551 and exposed when the upper cover 200 is removed (FIG. 10). The main board 551 and the sub-board 552 are connected by cables 559a and 559b by using connectors in positions below substantially the center of the main board 551. The sub-board 552 is preferably a so-called NCU formed by gathering line control circuits. Therefore, a modification is readily possible by replacing the sub-board 552 (NCU) in accordance with each country as the destination without modifying the main board 551. A board cover 560 shields the sub-board 552 to protect the sub-board 552 from being damaged by the falling of machine screws or by tools when maintenance is performed by removing the upper cover 200, and prevent sticking of ink scattered from the printer unit 400. Especially when the sub-board 551 is an NCU, the accident preventing effect is high because a line high-voltage electric circuit is present.

When the width of the scanner unit 300 is made smaller than that of the printer unit 400 and the sub-board 552 is arranged beside the scanner unit, the space efficiency is increased, and the whole apparatus can be made compact. Furthermore, when a recovering unit 22 for cleaning the head is arranged in a direction opposite to the control board unit 500 (i.e., on the right side of the lower cover 100) in the waiting position of the ink head 417 in the printer unit 400, ink does not scatter to the board when a recovery operation is performed. Consequently, a board short circuit caused by ink wetting can be prevented.

In the power supply unit 600, a power supply unit chassis 661 is made of a metal and integrated with the power supply unit board 663 on which electric parts such as an inlet 662 are mounted. Also, a portion 661a of the power supply unit chassis 661 is connected to the printer chassis 411 by a screw and grounded. This portion 661a is also grounded to the printer chassis 411 and the board chassis 553 by a ground line 664. The power supply unit 600 is arranged behind the printer unit 400 in the lower cover.

The units 400, 300, 500, and 600 are assembled in their respective positions of the lower cover 100. The printer unit 400, the scanner main body 300, the panel unit 300, and the power supply unit 600 are electrically connected to the control board unit 500 by a printer cable 471, a scanner cable 372, a panel cable 373, and the cable 674, respectively.

As shown in FIG. 10, these cables 471, 372, and 373 are connected above substantially the center of the main board 551. Also, the upper cover 200 and the lower cover 100 are separated at substantially the half height. Therefore, the units 400, 300, and 500 are disconnected only by removing the upper cover 200, and this facilitates the maintenance work. Additionally, each cable is extracted from the control board unit side of each corresponding unit. This shortens each cable, decreases the cost, and makes each unit strong against noise.

A power cable 374 or the cable of the scanner unit 300 can also be partially extended via the printing relay board. If this is the case, the heat generated from the main board 551 can be reduced by concentrically arranging heat generating parts on the printing relay board. When this arrangement is used, it is desirable to provide motor drivers on the printing relay board.

A method of fixing the power supply unit 600 and the rear cover 15 serving as a manual feed guide to the lower cover 100 will be described below. Ribs 189a which ensure an area slightly larger than the outer dimensions of the power supply unit 600 and regulate the front, rear, right, and left positions are formed in the lower cover 100. These ribs 189a are set to be higher than the power supply unit 600. Accordingly, when the power supply unit 600 is placed in a predetermined space of the lower cover 100, the front, rear, right, left, and lower positions are determined. On the other hand, the rear cover 15 serving as a manual feed guide is so positioned as to cover the power supply unit 600. The position is determined when positioning bosses 190 of the lower cover and positioning holes of the manual feed guide are fitted. Triangular pawls are fitted in snap pawl engaging portions 191 having a shape similar to that of the engaging portions 185 to prevent upward removal. This simultaneously regulates the upward movement of the power supply unit 600. Also, the rear cover and the lower cover ribs together cover the power supply unit 600 to prevent scattered ink from the printer unit 400 from sticking to the power supply unit 600.

The rear cover 15 functions as a guide for manually inserting a printing sheet from below the paper feed unit to the printer main body 400.

A method of fixing the control board unit 500 to the lower cover 100 will be described below.

A notch 192 slightly wider than the centronics connector 555 is formed in the lower cover 100 and serves as a guide for sliding the control board unit 500 downward. An accurate position is determined by fitting a positioning boss 194 into a positioning hole (not shown) of the board chassis 553. Additionally, the main board 551 and the sub-board 552 are fitted in the notches 193a of the rib 193, and this regulates the movement of these boards. Upward removal can be prevented by engaging snap pawls (not shown) such as the snap pawls 185 with the board chassis 553, screwing the board chassis 553 to the printer chassis 411 sideways, or simply pushing the control board unit 500 downward by a portion of the scanner unit 300.

A method of fixing the printer unit 400 to the lower cover 100 will be described below.

The position is determined by fitting positioning bosses 195 formed on the lower cover into positioning holes 411a of the printer chassis 411. Since the tip of the positioning boss 195 has a conical shape, the position is determined only by sliding the printer unit 400 downward. Thereafter, the lower position is supported by receiving portions 196. Upward removal is prevented because elastically deformable snap triangular pawls 197 engage with printer chassis outer walls 411b.

A method of fixing the scanner unit 300 to the lower cover 100 will be described below.

A surface 101 of the lower cover for receiving the scanner unit 300 is higher than surfaces for receiving the other units. This surface is positioned in front of the printer unit 400 and above a delivered printing sheet. The section of the surface is roughened to increase the section modulus, thereby largely increasing the strength. With this shape, it is possible to set the rigidity by which the printer unit and the scanner unit can be supported by the same lower cover.

The position is determined by fitting positioning bosses 102 formed on the lower cover into positioning holes (not shown) of the scanner base 334. Since the tip of the positioning boss 102 has a conical shape, the position is determined only by sliding the scanner unit 300 downward. Thereafter, the lower position is supported by predetermined receiving portions (not shown) on the surface 101. The front, rear, right, and left positions are slightly separated from the outer shape of the scanner base 334 and regulated by the ribs 103 formed on the lower cover 100. Upward removal is prevented by engaging triangular pawls 334a of the scanner base 334 with snap pawls 104 of the lower cover as shown in FIG. 13.

As described above, to fix each unit to the lower cover 100, strong ribs and walls for receiving the front, rear, right, and left positions of each unit are formed on the lower cover 100. Since snap pawls are used only to prevent upward removal, elastically deformable snap pawls can be formed.

Also, since the base of each unit is the same lower cover 100, the rigidity of the product itself is increased. Additionally, each unit can be assembled by sliding it downward. This facilitates the assembly work and also facilitates the maintenance because the individual units can be independently removed.

In the above embodiment, after the paper feed unit is fixed to the printer main body 400, the printer main body 400 is fixed to the lower cover 100. However, the paper feed unit and the printer main body 400 can also be independently fixed as separate units to the lower cover 100. When the paper feed unit is fixed to the printer main body 400, the reference position of a sheet can be easily determined, and this increases the printing accuracy. When the paper feed unit is directly fixed to the lower cover 100, the weight of the printer unit 400 can be reduced, and this further facilitates the assembly work.

The original table 2 as a slider cover is connected to the upper cover 200, but the original table 2 can also be connected to any other unit such as the printer unit 400. When the original table 2 is connected to the upper cover 200, the unit maintenance work is facilitated because the slider cover is removed at the same time the upper cover 200 is removed. When the original table 2 is connected to the printer unit 400, the slider cover 2 is already connected to the lower cover 100 when the upper cover 200 is attached. Therefore, since the light upper cover alone can be attached, the assembly work is easy to perform.

The rear cover 15 as a manual feed cover is attached as a separate part to the lower cover 100, and this strengthens the fixation and shield of the power supply unit 600. However, the rear cover 15 can also be integrated with any of the lower cover 100, the upper cover 200, and the printer unit 400. If this is the case, the number of parts can be decreased. Especially when the rear cover 15 is integrated with the upper cover, the power supply unit 600 can be easily maintained simply by removing the upper cover.

Figure 13:
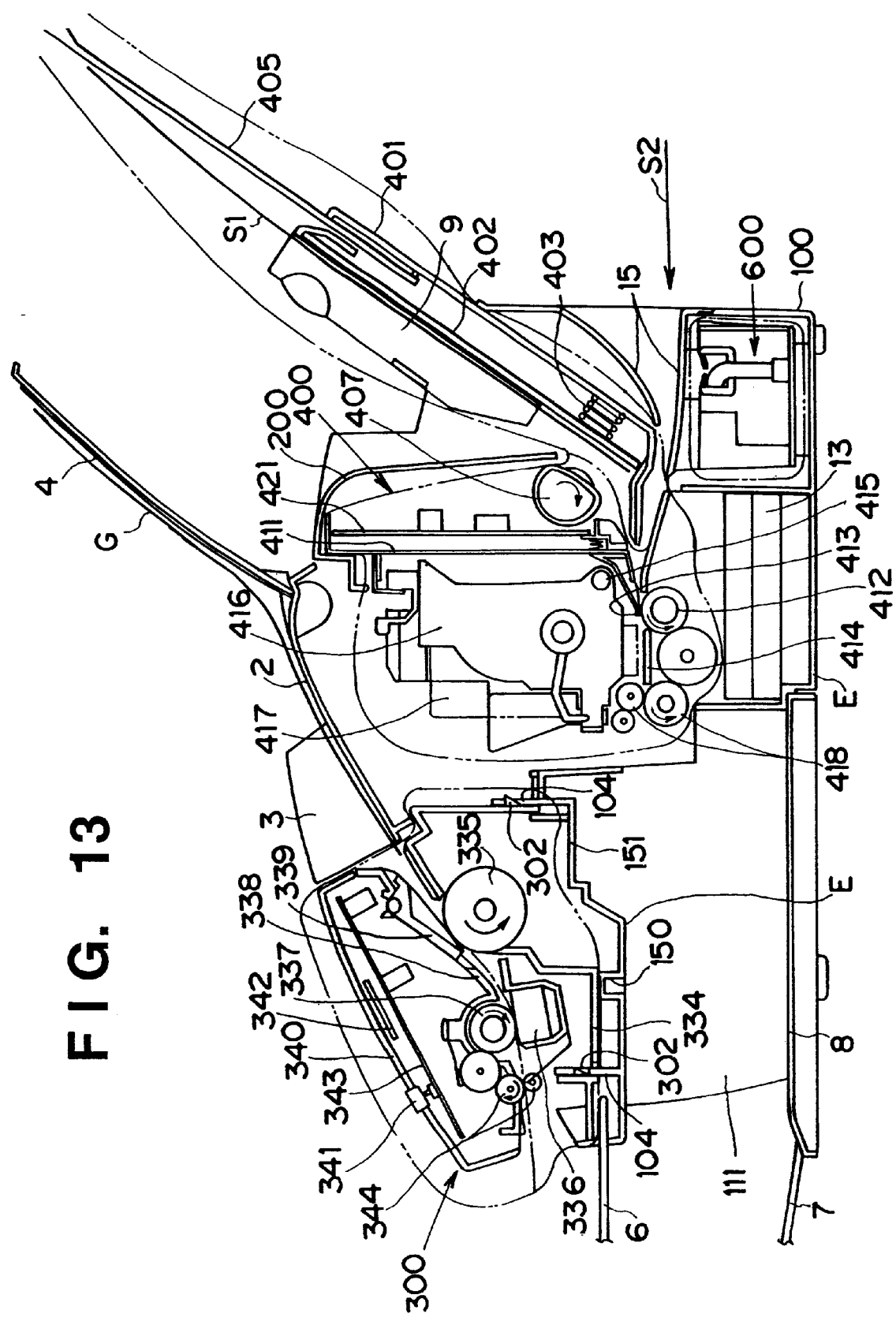
FIG. 13 is a cross-sectional view of the apparatus 1.
Figure 14:
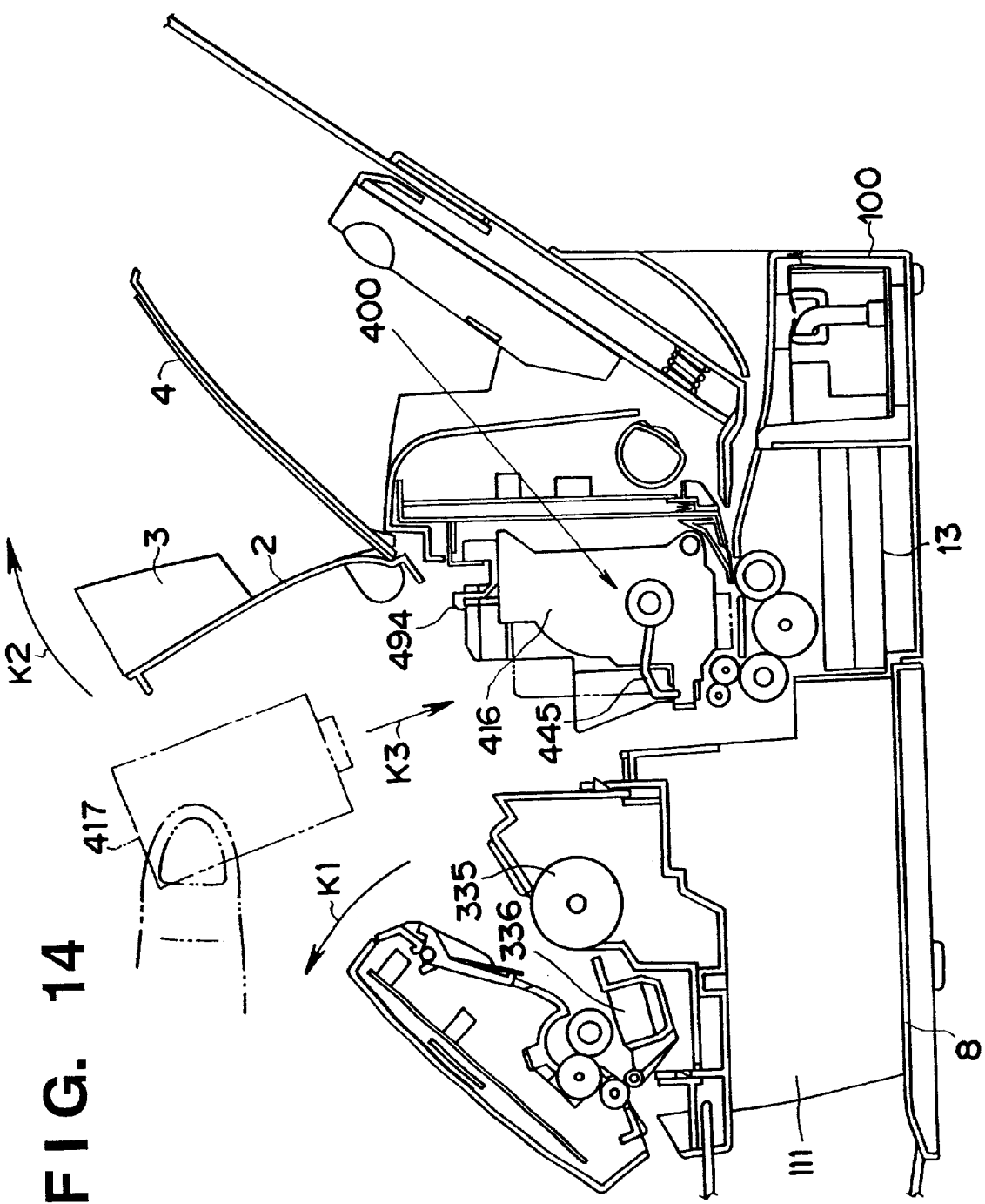
FIG. 14 is a cross-sectional view showing the way a printing head 417 of the printer unit 400 of the apparatus 1 is replaced.

FIG. 13 is a cross-sectional view of the finished apparatus 1. The same reference numerals as above denote the parts already described, and a detailed description thereof will be omitted. Referring to FIG. 13, the individual units are efficiently arranged. FIG. 14 is a cross-sectional view of the apparatus 1 showing the way the printing head 417 is replaced by opening the original table 2. As shown in FIG. 14, the printing head is replaced from above the printer unit 400.

Figure 15:
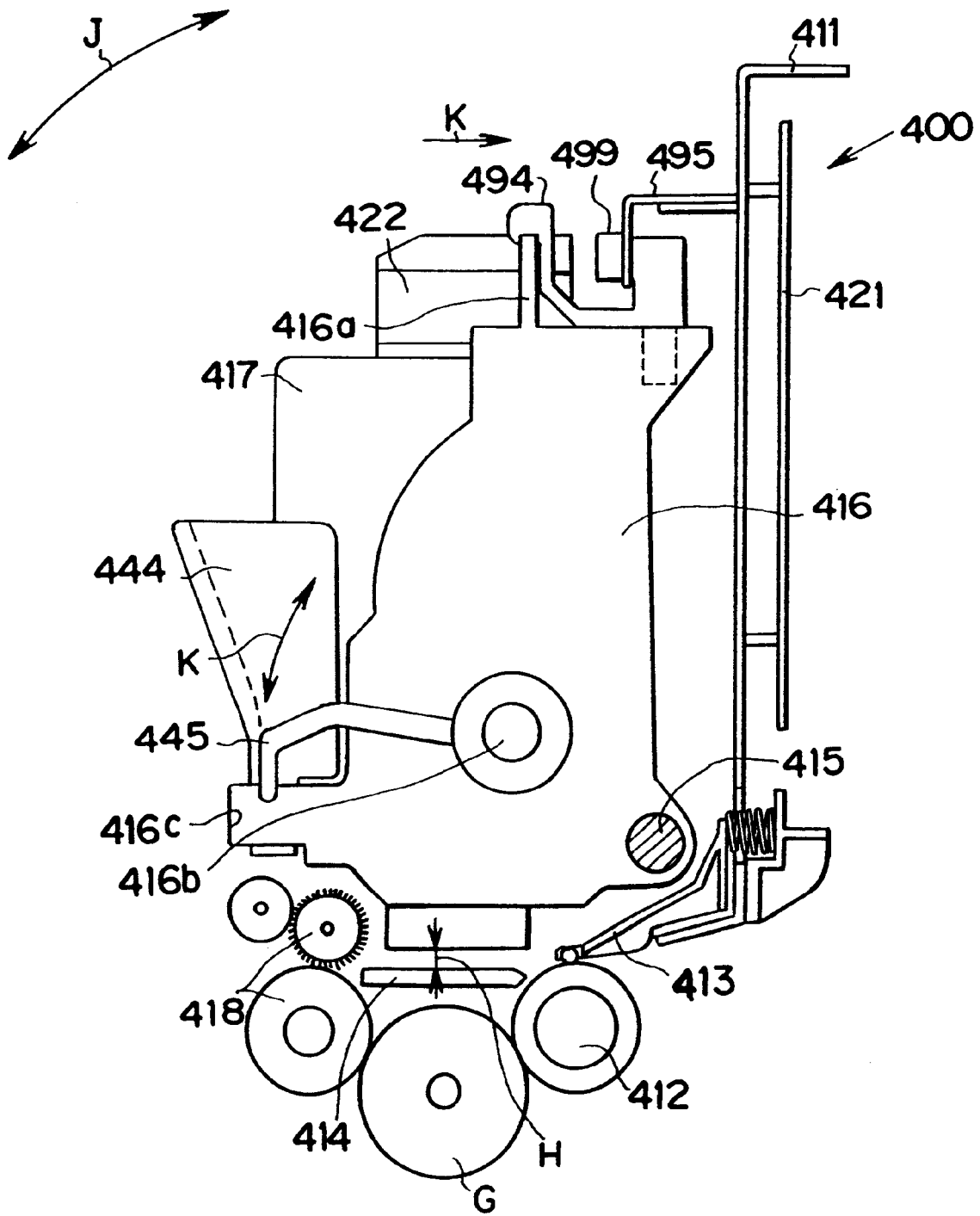
FIG. 15 is a cutaway side view showing the major components of the printer unit 400.
Figure 16A:
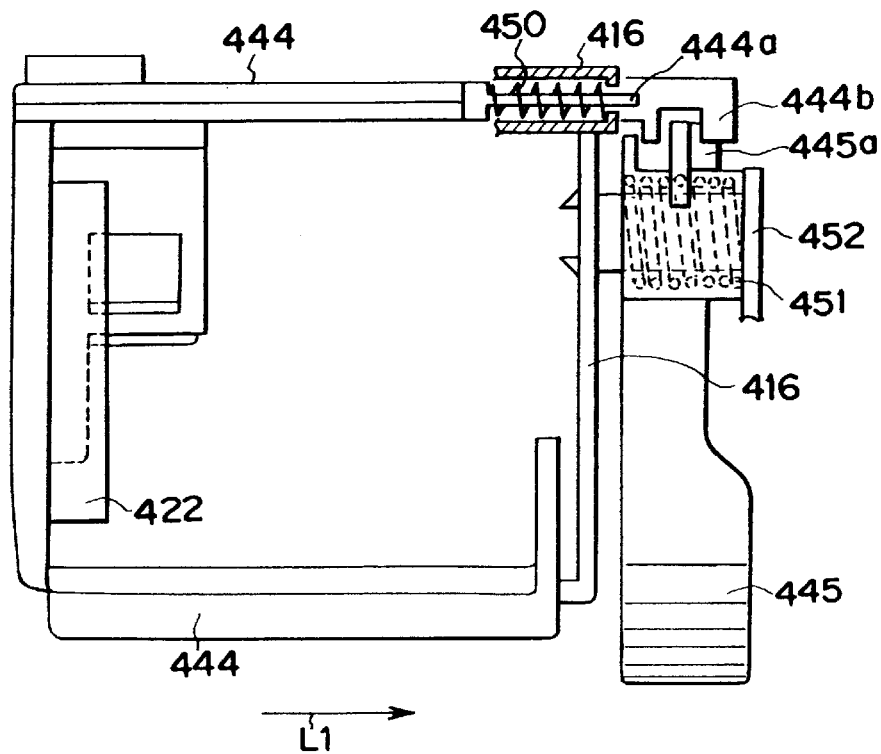
FIG. 16A is a plan view showing the operating position of a carriage.
Figure 16B:
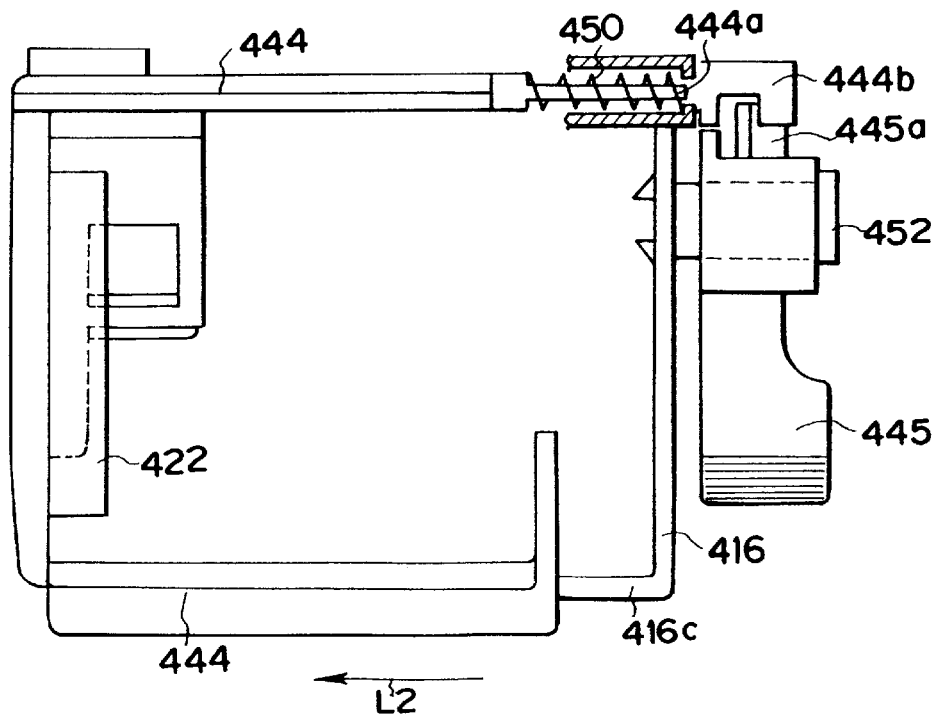
FIG. 16B is a plan view showing the printing head replacement position of the carriage.

To this end, a container box 444 as a printing head attaching/detaching mechanism is provided on the carriage 416 in order to attach and detach the printing head 417 of the printer 400 from above. The container box 444 can be moved between a printing operation position and an attachment/detachment position shown in FIGS. 16A and 16B, respectively, and includes a member 422 for obliquely accommodating the printing head 417 from above. An operating lever 445 incorporates a compression spring 451 for moving the container box 444 to the printing operation position (FIG. 6A) against an urging force by which a printing head contact portion for supplying power to the printing head 417 urges a carriage contact portion disposed on the carriage 416. By pivoting the operating lever 445 in the direction of an arrow K in FIG. 15, a cam 445a which engages with an engaging portion 444b of the container box 444 produces a press force to move the container box 444 in the direction of an arrow L1 against the biasing force of the box 444 biased to the left by a spring 450. Referring to FIG. 15, an adjusting mechanism is provided on the carriage so as to be able to adjust a distance H between the printing portion of the printing head 417 and the printing surface of a printing sheet from above. This adjusting mechanism includes a round rod 415, a plate member 495, and a holding member 494. The round rod 415 is disposed above the main body 411 to drive the carriage 416 back and forth along the longitudinal direction of the main body. The plate member 495 is disposed above the main body and has a sliding surface arranged parallel to the main body. The holding member 494 clamps the plate member 495 from the both sides to allow the carriage 416 to pivot on the round rod 415, thereby adjusting the distance H between the printing portion of the printing head 417 and the printing surface of a printing sheet. The holding member 494 also holds the pivoting position stepwise upon adjustment.

Figure 17:
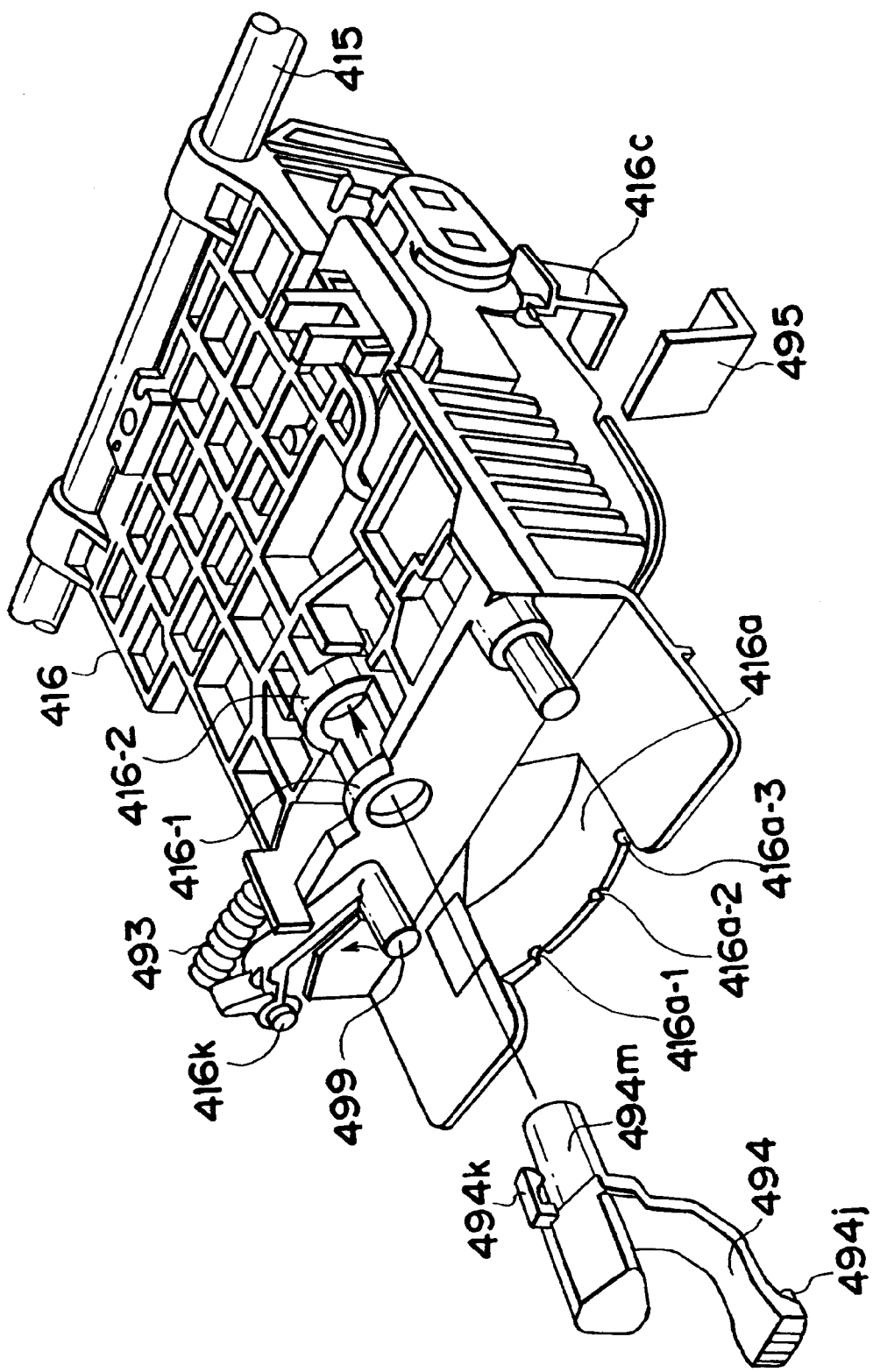
FIG. 17 is a perspective view showing the outer appearance of the carriage.
Figure 18:
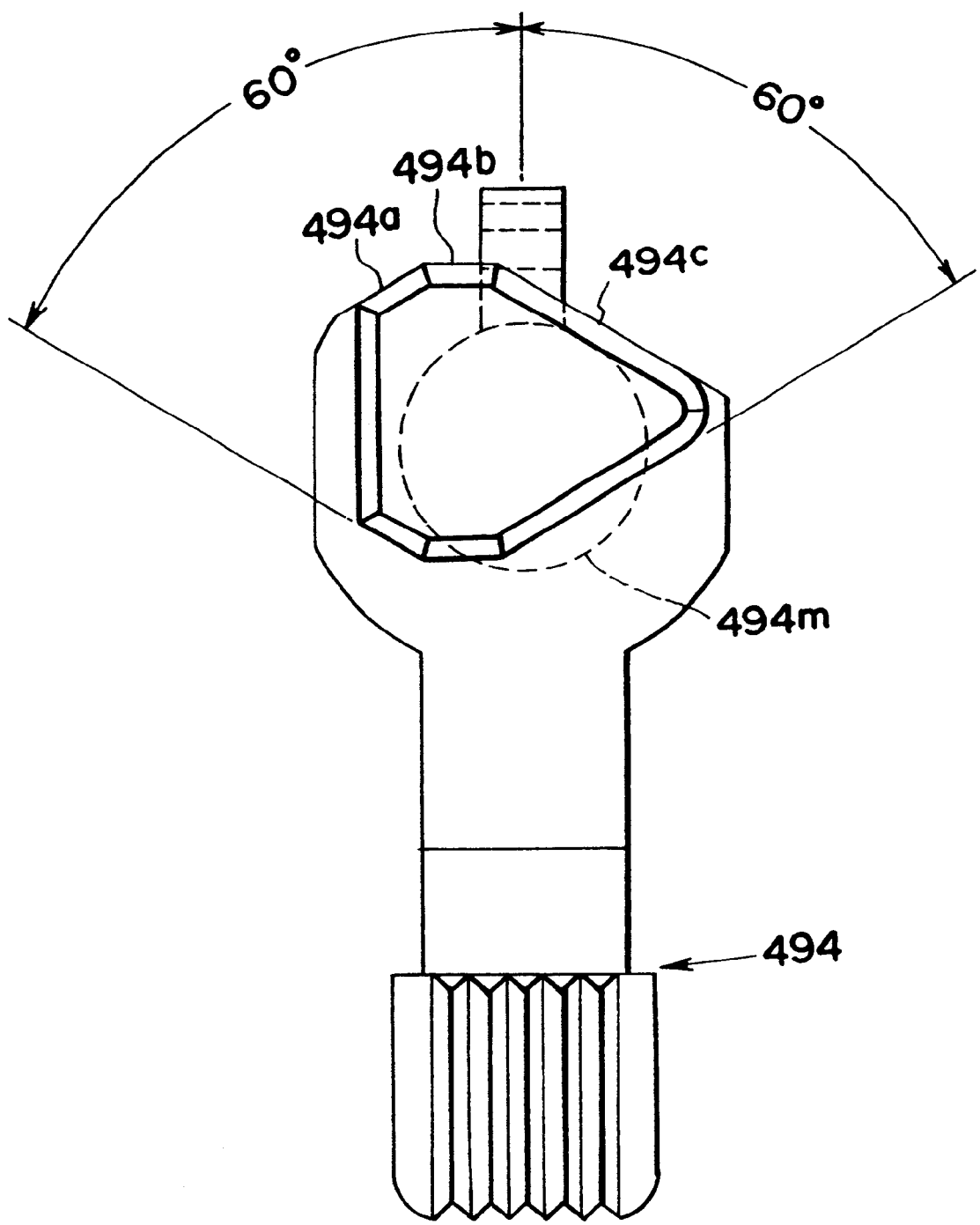
FIG. 18 is a plan view of a holding member 494.
Figure 19:
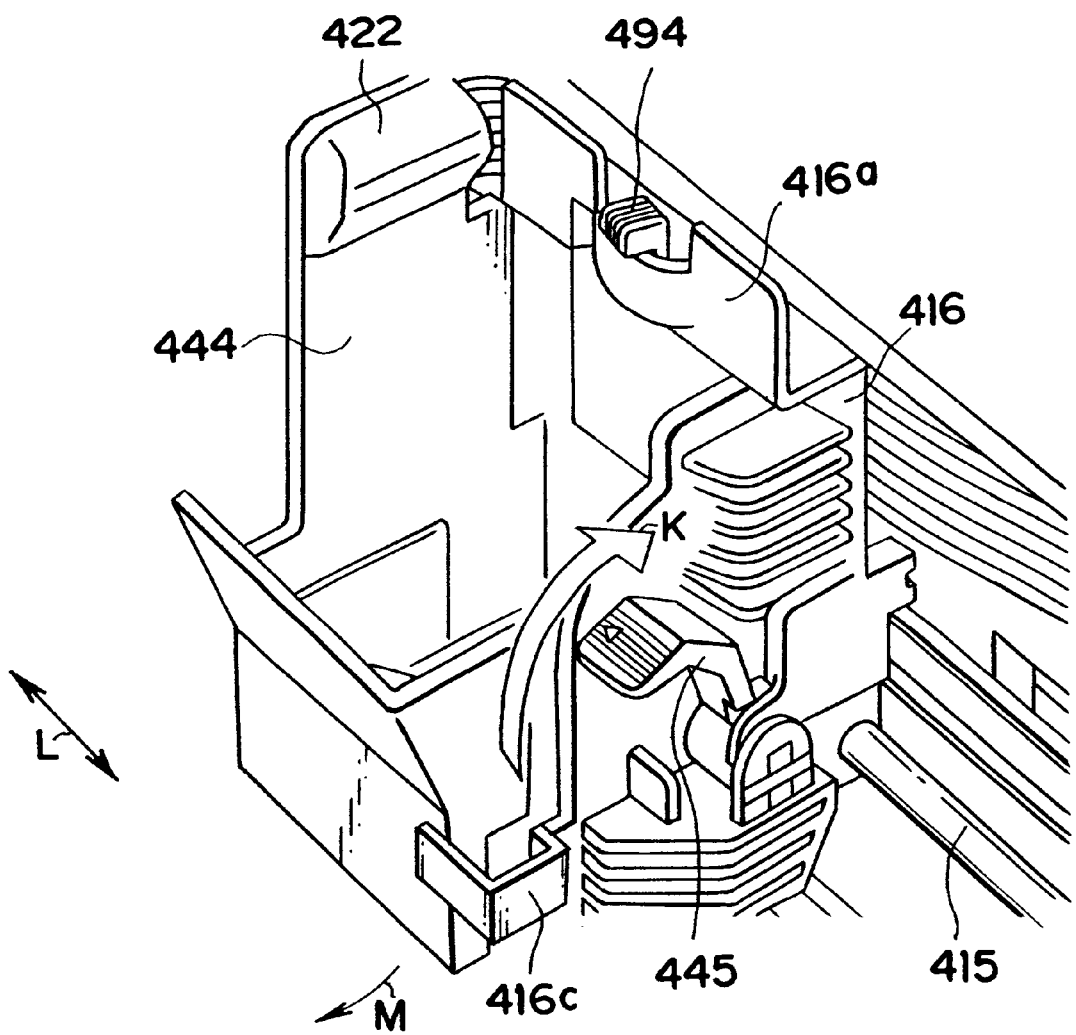
FIG. 19 is a perspective view showing the outer appearance to explain an operation of replacing the printing head.

For this purpose, a projecting portion 494j is formed on the holding member as shown in FIG. 17. This projecting member falls into locking grooves 416a-1, 416a-2, and 416a-3 of the carriage 416. Any of sliding surfaces 494a, 494b, and 494c clamps the rear surface of the plate member 495 together with a pushing member 499 and slides.

In the printer with the above construction, as shown in FIGS. 19, 20A, 20B, and 21 for explaining the operation, the operating lever 445 is first pivoted in the direction of an arrow K1 to move the container box 444 so that the container box 444 can contain the printing head. Additionally, the holding member 494 is set in a predetermined position from above.

Figure 20A:
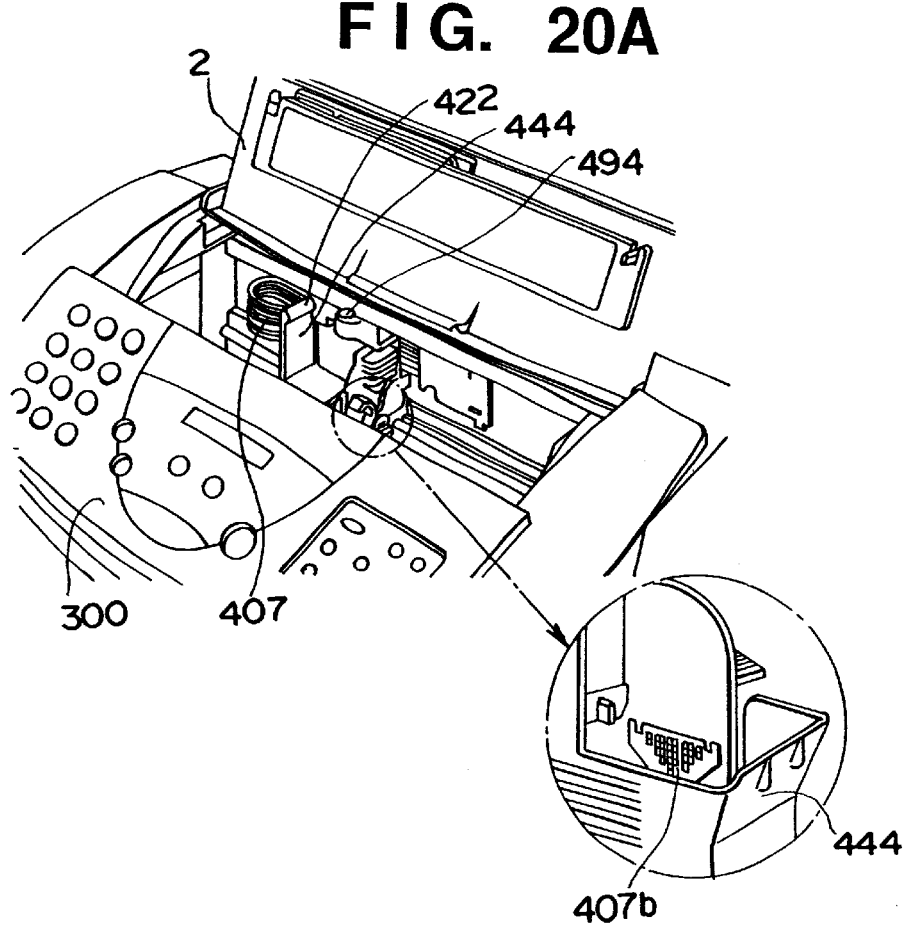
FIGS. 20A and 20B are perspective views showing the outer appearance to explain the operation of replacing the printing head.
Figure 20B:
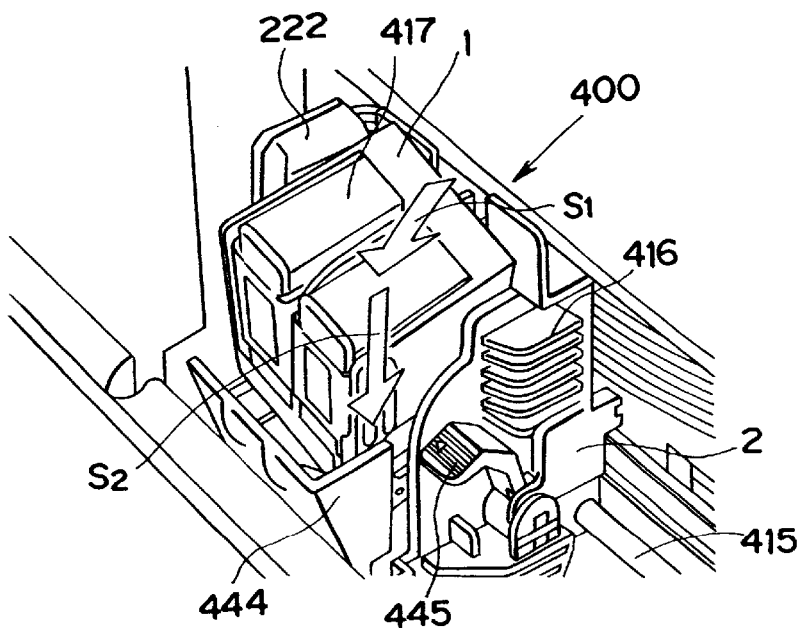

Next, as shown in FIGS. 20A and 20B, the printing head 417 is set by falling it with its own weight into the container box 444. More specifically, the printing head 417 abuts against a member 222 and is moved in the directions of arrows S1 and S2 before being set. Therefore, when the box 444 is moved sideways by pivoting the operating lever 445 downward, the printing head 417 can be moved substantially horizontally and brought into contact with a contact 407b. That is, if the member 222 is not formed, the contact 407b is damaged. The member 22 prevents this damage.

Figure 21:
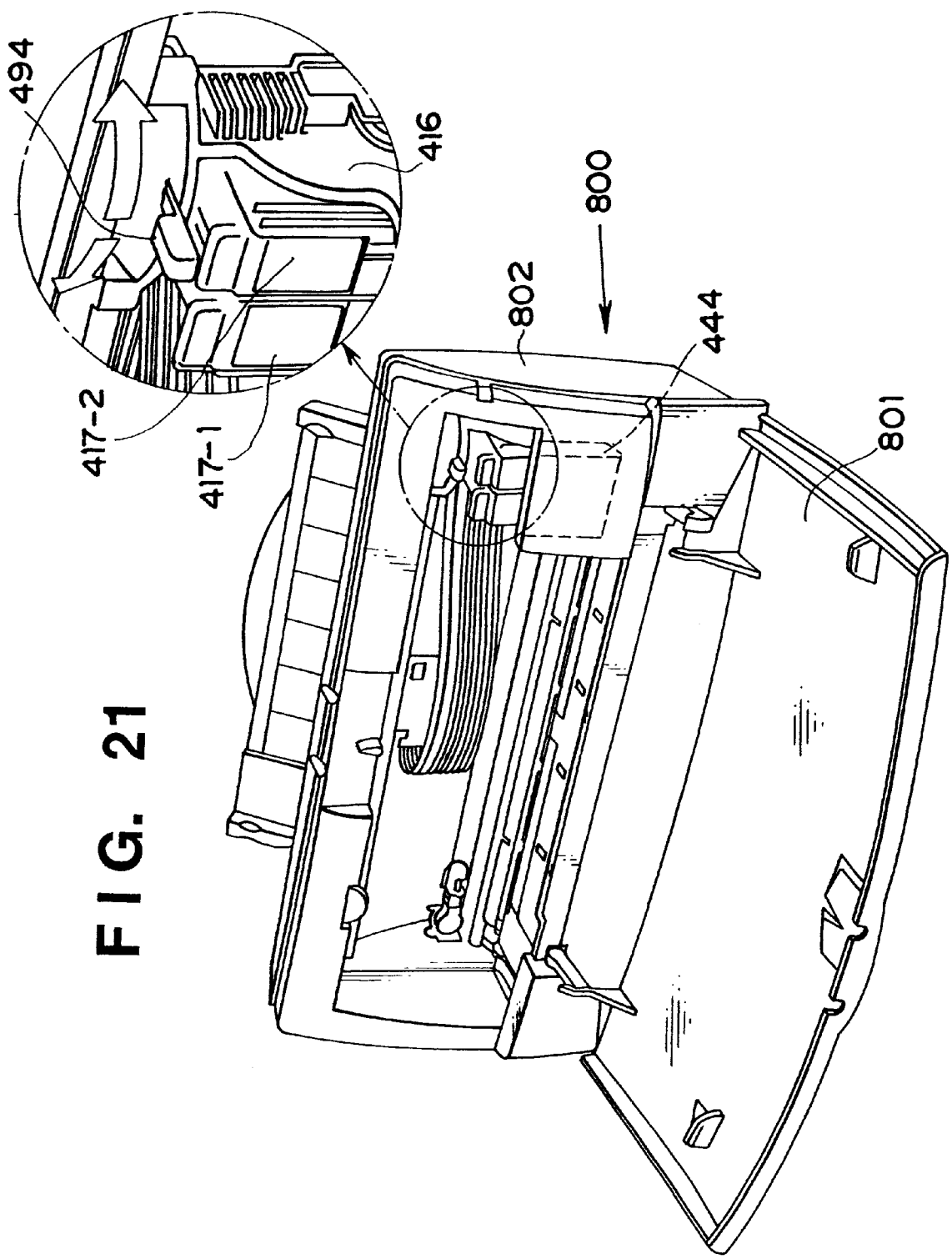
FIG. 21 is a perspective view showing the outer appearance of a printer apparatus.

FIG. 21 shows a housing dedicated to a printer. Since this printer is made operable from both above and the front, the degree of freedom of designing a cover 801 is increased as shown in FIG. 21.

As the printer unit 400, a printing apparatus which includes a means (e.g., an electrothermal converter or a laser beam) for generating thermal energy as energy used to discharge ink and changes the state of ink by this thermal energy has been described among other ink-jet printing systems. This system can increase the density and resolution of printing.

Representative arrangement and principle of the system are preferably basic principles disclosed in, e.g., U.S. Pat. Nos. 4,723,129 and 4,740,796. Although the system can be applied to both of so-called on-demand and continuous printers, an on-demand printer is particularly effective for the reason explained below. That is, in an on-demand printer, at least one drive signal which corresponds to printing information and causes a rapid temperature rise exceeding film boiling is applied to an electrothermal converter arranged in accordance with a sheet or a liquid passage holding a liquid (ink), thereby causing the electrothermal converter to generate thermal energy. This makes the thermal action surface of a printing head cause film boiling. As a consequence, a bubble can be formed in the liquid (ink) in a one-to-one correspondence with the drive signal. This bubble grows and contracts to discharge the liquid (ink) through a discharge hole, forming at least one droplet. The drive signal is more preferably a pulse signal because the bubble grows and contracts immediately and appropriately. Consequently, the liquid (ink) can be discharged in a short response time.

As this pulse drive signal, those described in U.S. Pat. Nos. 4,463,359 and 4,345,262 are suitable. Note that the printing can be performed better by using the conditions described in U.S. Pat. No. 4,313,124 of the invention related to the temperature rise rate on the thermal action surface.

As the arrangement of the printing head, in addition to the combination (a linear liquid passage or a right-angle liquid passage) of the discharge hole, the liquid passage, and the electrothermal converter as disclosed in the aforementioned specification, the present invention includes arrangements disclosed in U.S. Pat. Nos. 4,558,333 and 4,459,600 in which a thermal action surface is arranged in a bending region. Additionally, it is possible to use an arrangement based on Japanese Patent Laid-Open No. 59-123670 which discloses an arrangement in which a common slot is provided as a discharge portion for a plurality of electrothermal converters or Japanese Patent Laid-Open No. 59-138461 which discloses an arrangement in which a hole for absorbing a pressure wave of thermal energy is used as a discharge portion.

Furthermore, a full-line type printing head having a length corresponding to the width of the largest printing medium printable by the printing apparatus can be a combination of a plurality of printing heads as disclosed in the above references or a single integrally formed printing head.

It is also possible to use an interchangeable chip-type printing head, which can be electrically connected to the apparatus main body, and to which ink can be supplied from the apparatus main body, when the printing head is attached to the apparatus main body, or a cartridge-type printing head integrated with an ink tank. It is preferable to add a recovering means or an auxiliary means to the printing head as a part of the arrangement of the printing apparatus of the present invention, since the effect of the present invention can be made stabler. Practical examples are a capping means, a cleaning means, and a pressurizing or suction means for the printing head, and a pre-heating means which is an electrothermal converter, another heating device, or the combination of these. It is also effective to perform a preliminary discharge mode for performing discharge different from printing, in order to perform stable printing.

The printing mode of the printing apparatus is not limited to a printing mode using only a principal color such as black. That is, the apparatus can include at least one of a multicolor mode using different colors and a full-color mode using mixed colors by using an integrated printing head or combining a plurality of printing heads.

In the embodiment of the present invention described above, ink is used as a liquid. This ink can be one which solidifies at room temperature or lower or one which softens or liquefies at room temperature. In the ink-jet process, a general approach of temperature control is to adjust the temperature of ink itself to 30° C. to 70° C. to set the viscosity of the ink within a stable discharge range. Therefore, ink needs to be in a liquid form only when a printing signal used is applied.

Additionally, to positively use the temperature rise caused by thermal energy as the energy for changing ink from a solid state to a liquid state or to prevent evaporation of ink, it is possible to use ink which is a solid when left to stand and liquefies when heated. In either case, the present invention is applicable to an apparatus using ink which does not liquefy unless thermal energy is applied, e.g., ink which liquefies when thermal energy corresponding to a printing signal is applied and is discharged in the form of a liquid or ink which has already started solidifying when arriving at a printing medium. As described in Japanese Patent Laid-Open No. 54-56847 or 60-71260, ink of this sort can be held as a liquid or a solid in recesses or through holes of a porous sheet and opposed to an electrothermal converter. In the present invention, the most effective method for each of the aforementioned inks is to execute the film boiling described above.

Furthermore, in addition to the form of an integrated or separate apparatus as an image output terminal of an information processing equipment such as a computer, the printing apparatus according to the present invention can take the form of a copying apparatus combined with a reading apparatus or the like or the form of a facsimile apparatus having a transmitting/receiving function. In the reading/printing apparatus of the present invention as described above, the steps of fixing and connecting the individual units need not be performed in order. Therefore, it is possible to provide a reading/printing apparatus by which the facility with which each unit is assembled and maintained can be significantly improved.

It is also possible to provide a reading/printing apparatus by which the manufacturing cost can be decreased by simplifying the product manufacturing process by using no machine screws and the repair time can be shortened.

Additionally, it is possible to provide a reading/printing apparatus which obviates the need to prepare an enormous designing time and a manufacturing installation including metal molds for manufacturing a housing in manufacturing a derivative type of apparatus by slightly modifying some units and directly using other units constituting the apparatus.

Furthermore, it is possible to provide a reading/printing apparatus by which steps of connecting wires need not be performed in order and the wires from a control board unit can be shortened.

Figure 22:
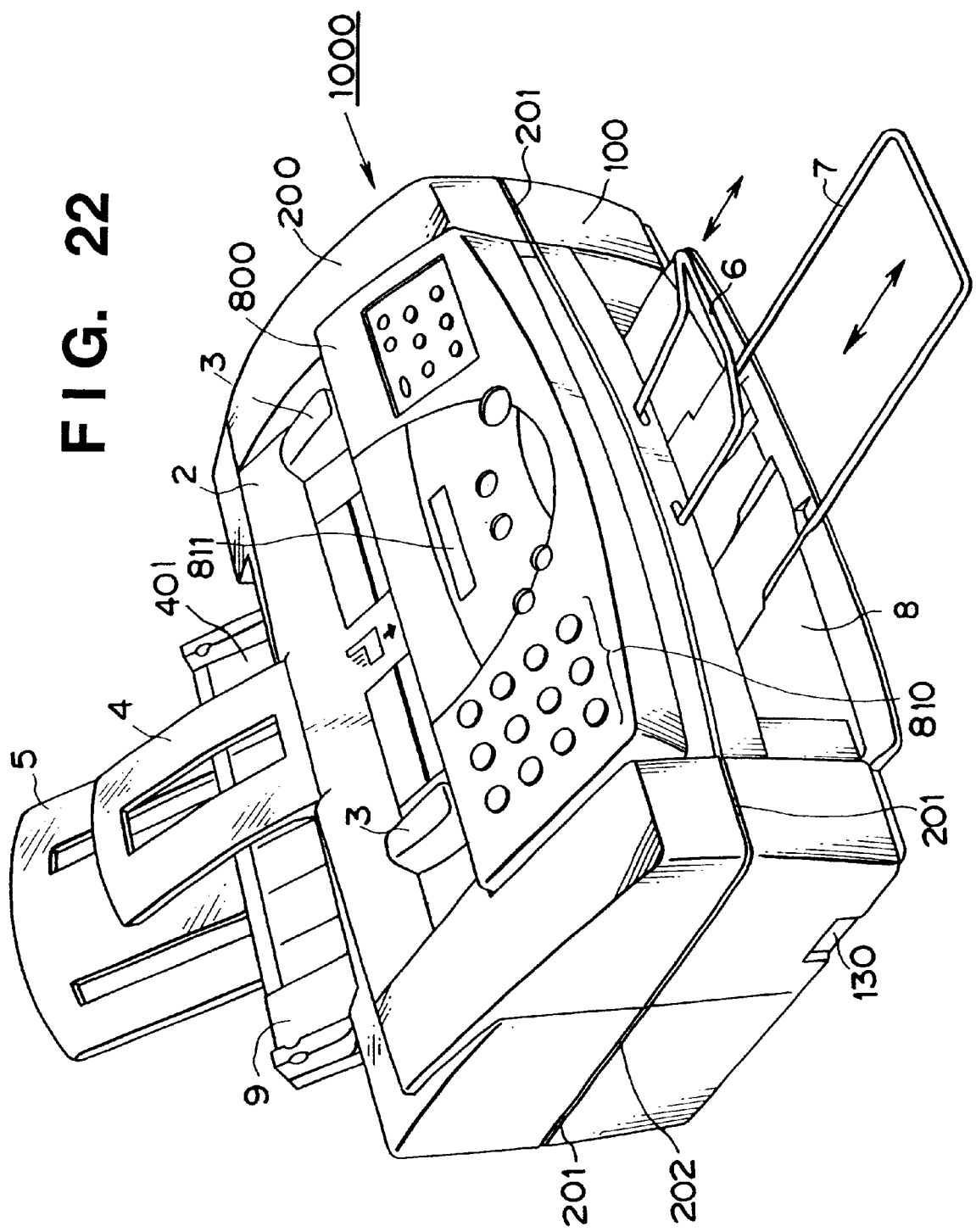
FIG. 22 is a perspective view showing the outer appearance of an apparatus 1000 of the present invention constituted as a color facsimile apparatus.

Another preferred embodiment of the present invention will be described in detail below with reference to the accompanying drawings. FIG. 22 is an external perspective view of a reading/printing apparatus constituted as a facsimile apparatus 1000. In addition to such a facsimile apparatus, this reading/printing apparatus shown in FIG. 22 is so designed as to be connected to, e.g., a personal computer to constitute a reading/printing apparatus as a so-called peripheral equipment obtained by simply uniting a document reading apparatus and a printing apparatus for separately or simultaneously performing an operation of reading an image of a sheet original and an operation of printing the image on a printing sheet.

As will be described later, therefore, individual components such as a printing apparatus, a reading apparatus, a control circuit board unit, and a power supply unit are separately arranged so as to be easily replaced and attached or detached.

Also, particularly a housing is so designed as to be integrally formed by an injection resin mold by using a predetermined resin material such as a high-impact polystyrene resin or an ABS resin. Since an enormous initial investment is necessary when a die set which is set in a molding apparatuses is included, the final shape of the housing is determined after the shape and the use state of the housing are well considered. Furthermore, minimizing fixation using machine screws often used in the manufacturing process of the apparatus greatly contributes to a reduction of the manufacturing cost. Therefore, no machine screws are used except for an electrical ground in principle.

In FIG. 1, the facsimile apparatus 1 for monochrome images as a reading/printing apparatus has a housing which forms the front, rear, right, and left walls. This housing incorporates the scanner unit 300 as an original convey type monochrome reading apparatus, a serial printing type printing unit as a printing apparatus, a monochrome control board unit, and a power supply unit.

Referring to FIG. 22, on the other hand, the facsimile apparatus 1000 for color images as a reading/printing apparatus has a housing which forms the front, rear, right, and left walls as in the apparatus 1 described above. This housing incorporates a scanner unit 800 as an original convey type color reading apparatus, a serial printing type printing unit as a printing apparatus, a color control board unit, and a power supply unit.

The housing is basically constituted by a lower cover 100 as a first housing on the lower side, an upper cover 200 as a second housing on the upper side, and a rear cover which is a third housing (to be described later) for guiding a printing sheet and covering the power supply unit.

An original table 2 having original width adjusting plates 3, whose width can be adjusted to guide an original in the widthwise direction, is pivotally supported by the upper cover 200. The original width adjusting plates 3 can be symmetrically moved with respect to their central position by moving only one of them. This pivotal original table 2 allows access to a printing head.

A detachable original support table 4 is provided behind the original table 2. When an A4-size original, for example, is conveyed forward in the direction of a monochrome scanner unit 300, the original support table 4 prevents the trailing edge from hanging down.

Also, an original conveyed forward with its original surface faced downward is conveyed from below the monochrome scanner unit 300 or the color scanner unit 800 to the front of the apparatus 1 or the apparatus 1000 and placed on an original support bar 6. This original support bar 6 can be moved back and forth with respect to the apparatus 1 or the apparatus 1000 as indicated by an arrow.

On the other hand, a printing sheet which is fed toward the printing apparatus is regulated in the widthwise direction by a width adjusting plate 9 provided on a printing sheet table 401 disposed on the back side of the apparatus 1 or the apparatus 1000. This printing sheet is subjected to serial printing in a printer unit (to be described later) and delivered to a printing sheet table 8 below the monochrome scanner unit 300 or the color scanner unit 800. When this printing sheet is fed along its longitudinal direction from the rear to the front of the apparatus, a printing sheet support table 5 on the rear side and a printing sheet support bar 7 on the front side prevent the edges of the sheet from handing down. The support table 5 is incorporated in the printing sheet table 401 and suitably pulled out to the position shown in FIG. 1. The printing sheet support bar 7 on the front side can be pulled forward and pushed backward like the original support bar described above.

As shown in FIG. 22, the upper cover 200 surrounds the monochrome scanner unit 300 or the color scanner unit 800. This upper cover 200 can be removed from the lower cover 100 along an edge 202 as will be described later. Consequently, the monochrome scanner unit 300 or the color scanner unit 300 can be left behind on the lower cover 100.

An operation unit including a liquid crystal display 11 or 811, dial keys 10 or 810, and the like is arranged on the monochrome scanner unit 300 or the color scanner unit 800 as shown in FIG. 22. When the apparatus 1 or the apparatus 1000 is used as an apparatus other than a facsimile apparatus, this operation unit is properly changed.

Figure 23:
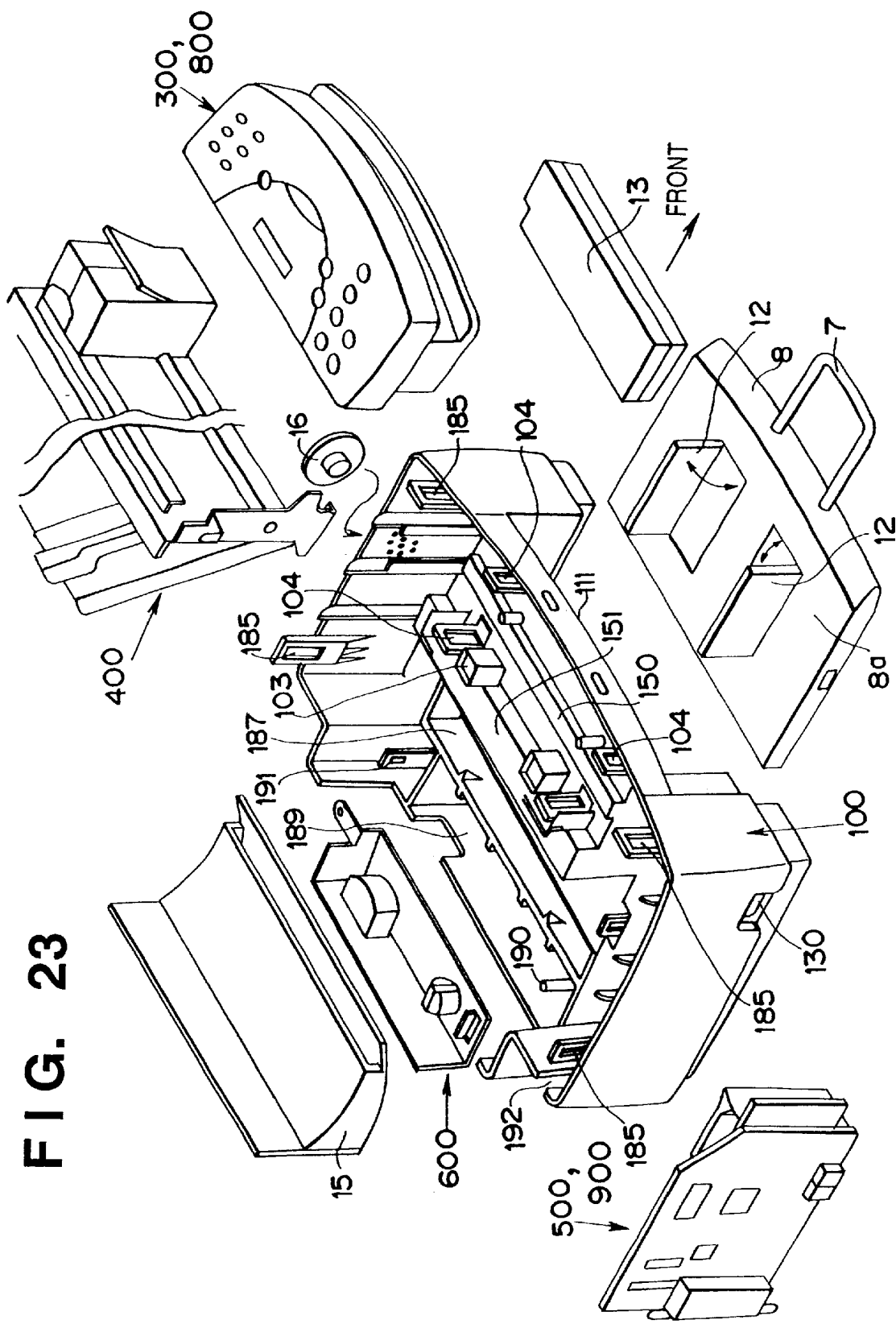
FIG. 23 is an exploded perspective view of the apparatus 1000 shown in FIG. 22.

FIG. 23 is an exploded perspective view of the apparatus 1 or the apparatus 1000, from which the upper cover 200 is omitted.

In FIG. 23, the same reference numerals as above denote the parts already described, and a detailed description thereof will be omitted. The lower cover 100 obtained by integrally forming a base portion as the bottom surface, side walls as the outer surfaces, and an opening surrounded by these side walls incorporates the monochrome scanner unit 300 or the color scanner unit 800, a printer unit 400, a monochrome control board unit 500, a color control board unit 900, a power supply unit 600, an ink absorber 13, a rear cover 15, the printing sheet table 8, and a loudspeaker 16. The monochrome scanner unit 300 or the color scanner unit 800 is an original convey type reading apparatus which reads an original while conveying it. The printer unit 400 is a serial printing type printing apparatus which performs serial printing while conveying a printing sheet. The monochrome control board unit 500, the color control board unit 800, and the power supply unit 600 are connected to these components and perform predetermined control. The ink absorber 13 absorbs unnecessary ink after initial discharge. All of these components can be fixed to the lower cover 100 without using any tools.

This realizes a very simple manufacturing line when assembly is automated. That is, even an unskilled worker can perform assembly. Alternatively, assembly can be performed by a simple operation by which a robot apparatus holds each unit and moves the unit downward. Therefore, an initial investment including injection molds can be well compensated for by the simplified parts assembly steps.

The upper cover 200 can also be similarly fixed without using any tools. Referring back to FIG. 1, to remove the upper cover 200 from the lower cover 100, tool inserting holes 201 are formed in the cover joint surface in order to externally disengage engaging portions 185 which are female-male engaging portions. By inserting a tool into each hole 201, the engaging portion 185 is elastically deformed and disengaged.

The monochrome scanner unit 300 and the color scanner unit 800 have substantially the same outer shape, and the shapes of their portions (to be described later) to be fixed to the lower cover 100 are also substantially the same. Additionally, the monochrome control board unit 500 and the color control board unit 900 have substantially the same outer shape, and the shapes of their portions (to be described later) to be fixed to the lower cover 100 are also substantially the same. Therefore, these units can be fixed without changing other units or the housing components such as the lower cover 100 and the upper cover 200.

Accordingly, two types of apparatuses can be constituted without changing other units and the housing.

A paper feed unit is connected to the printer unit 400. In the monochrome scanner unit 300 or the color scanner unit 800, a scanner main body and a panel unit are so connected as to be openable about a hinge (not shown). The monochrome control board unit 500 or the color control board unit 900 collectively controls the printer unit 400 and the monochrome scanner unit 300 or the color scanner unit 800. The power supply unit 600 supplies power to the printer unit 400, the monochrome scanner unit 300 or the color scanner unit 800, and the monochrome control board unit 500 or the color control board unit 900.

These units are independently constituted as shown in FIG. 23, and each unit is fixed to the lower cover 100. The lower cover 100 and the upper cover 200 are separated substantially horizontally (as indicated by heights H1 and H2 in FIG. 7) in substantially the middle of the total height of the apparatus 1. The engaging portions 185 as female-male engaging portions in the four corners and pawls engage with each other to form the outer casing.

Figure 24:
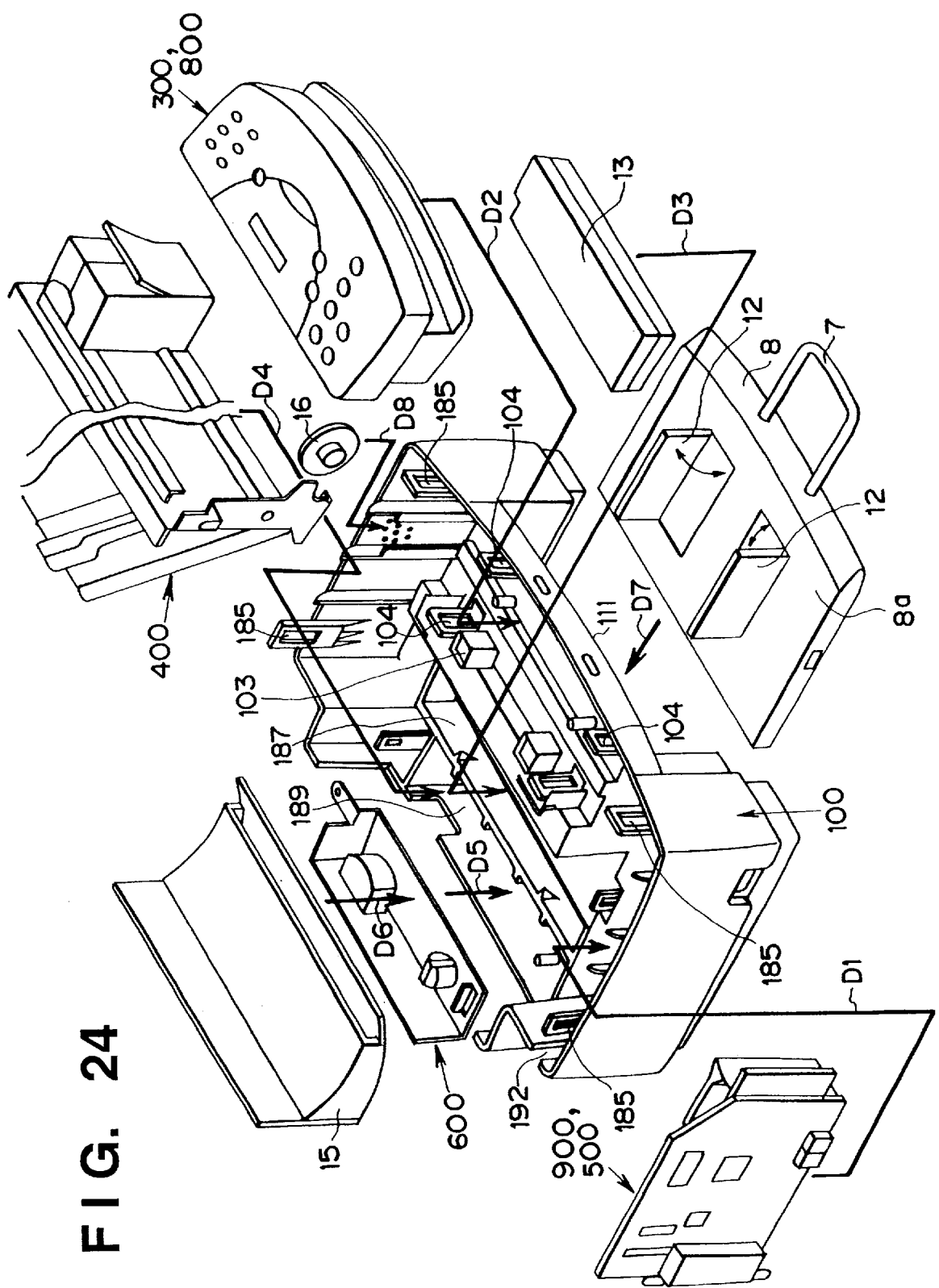
FIG. 24 is an exploded perspective view showing the way the apparatus shown in FIG. 22 is assembled.

FIG. 24 is a perspective view of the outer appearance showing the way each unit shown in FIG. 23 is moved when the unit is fixed to the lower cover 100. A robot apparatus as described above can be used to move each unit.

Referring to FIG. 24, the monochrome control board unit 500 or the color control board unit 900 is moved in the direction of an arrow D1 and fixed to the lower cover 100. The monochrome scanner unit 300 or the color scanner unit 800 is moved in the direction of an arrow D2 and fixed to the lower cover 100. The ink absorber 13 is moved in the direction of an arrow D3 and fixed to the lower cover 100. The printer unit 400 is moved in the direction of an arrow D4 and fixed to the lower cover 100. The power supply unit 600 is moved in the direction of an arrow D5 and fixed to the lower cover 100. The rear cover 15 is moved in the direction of an arrow D6 and fixed to the lower cover 100. The printing sheet table 8 is moved in the direction of an arrow D7 and fixed to the lower cover 100. A pair of thick-printing sheet support plates 12 are provided on a placement surface 8a of the printing sheet table 8. When printing is performed for a thick printing sheet, the thick-printing sheet support plates 12 are pivoted in the directions of arrows so as to prevent the edges of the sheet from hanging down, thereby holding the positions of these edges.

Figure 25:
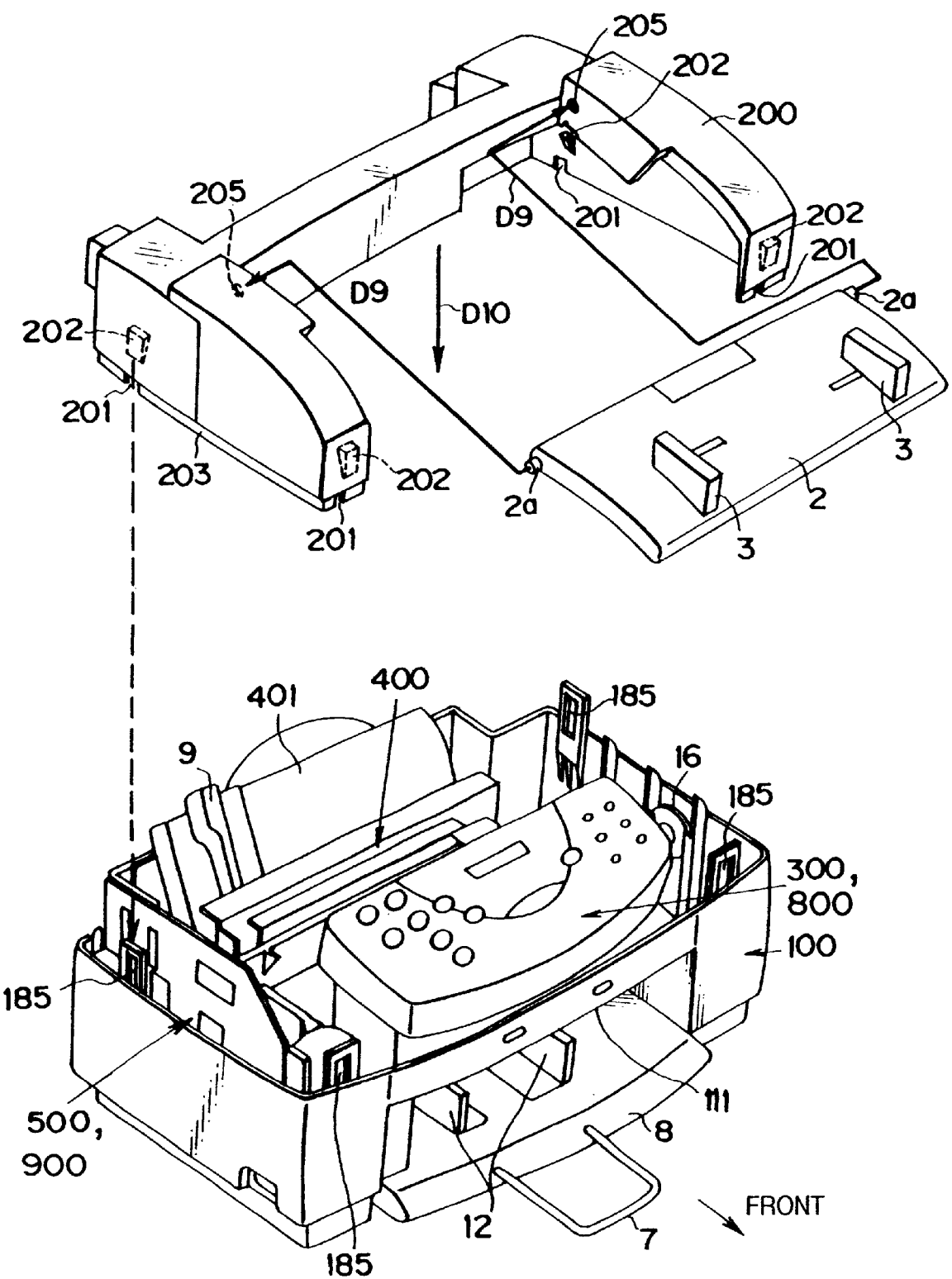
FIG. 25 is an exploded perspective view showing the way an upper cover 200 is fixed to a lower cover 100.

FIG. 25 is a perspective view of the outer appearance showing the way the upper cover 200 is fixed after each unit is fixed to the lower cover 100 as shown in FIG. 24. Referring to FIG. 25, the original table 2 is vertically opened and closed by fitting right and left projections 2a, in the directions of arrows D9, into holes 205 formed in the upper cover 200.

Also, pawls 202 indicated by the broken lines are formed on the inner surfaces of the side walls forming the side surfaces of the upper cover 200 in positions where these pawls 202 oppose the engaging portions 185.

The holes 201 are formed below the pawls 202 by partially notching an edge 203. This edge 203 is clamped between ribs (to be described later) of the lower cover 100 and the inner wall surfaces and does not deform even when an external force acts on it. The upper cover 200 with the above arrangement is moved in the direction of an arrow D10 and fixed to the lower cover 100 by engaging the four pawls 202 with the engaging portions 185.

Figure 26:
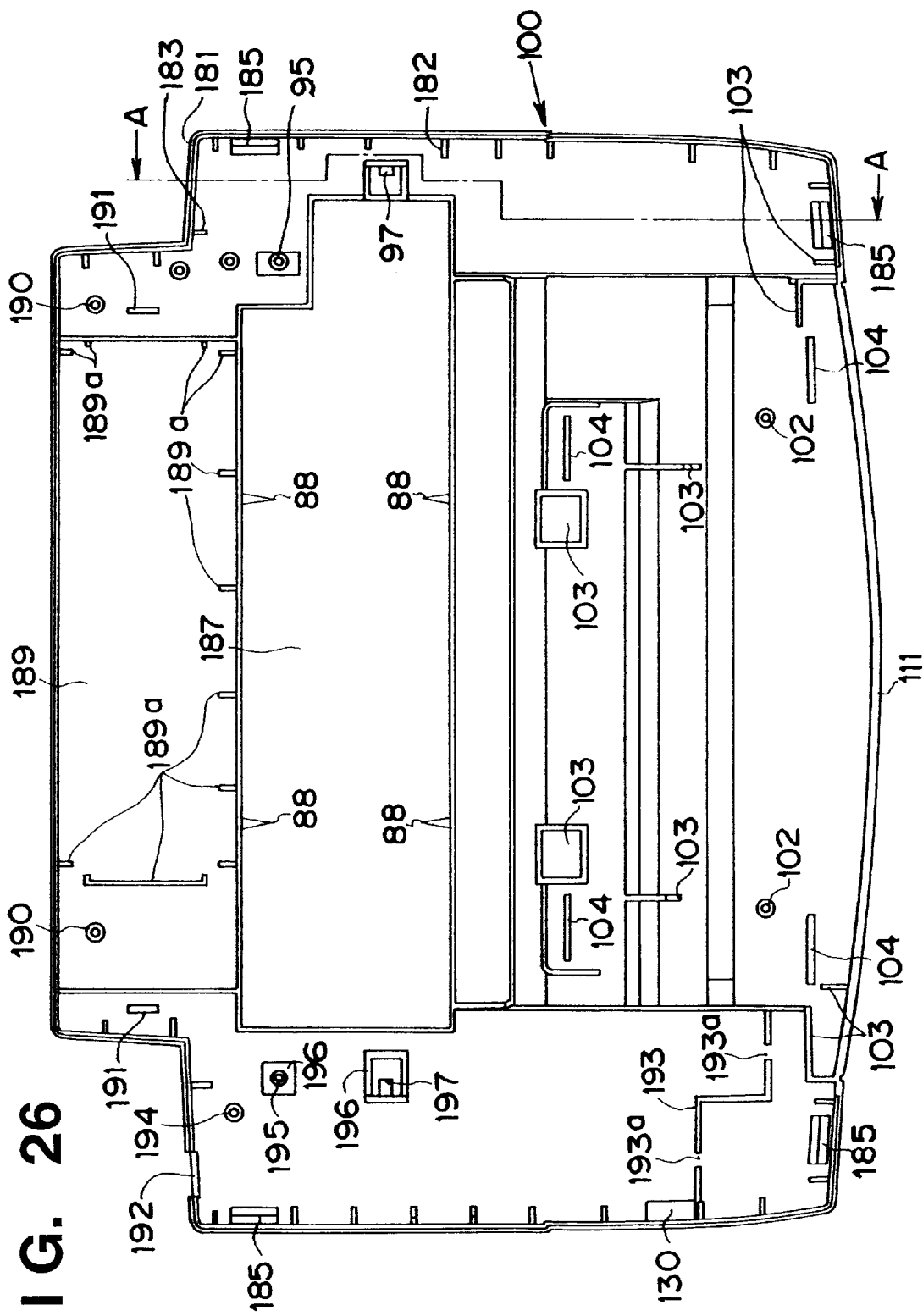
FIG. 26 is a plan view of the lower cover 100.
Figure 27:
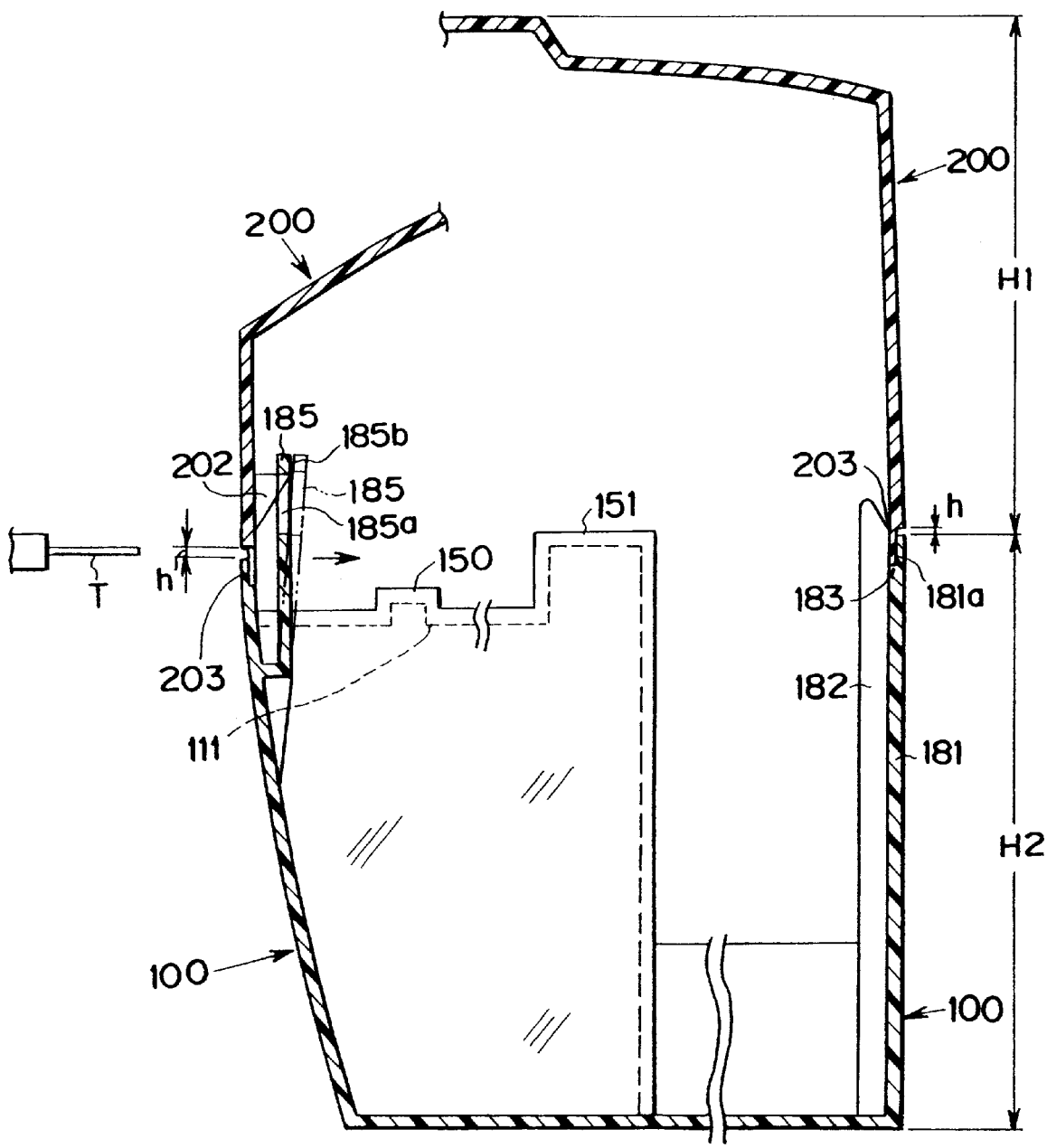
FIG. 27 is a sectional view taken along a line A—A in FIG. 26 after the upper cover is attached.

That is, in a plan view of the lower cover 100 in FIG. 26 and a sectional view of FIG. 27 taken along a line A—A in FIG. 26, the covers are divided into upper and lower portions in substantially the middle of the height of the product, and the outer circumferential portions of these covers are vertically fitted. More specifically, a thin-wall portion 181a is formed around the upper portion of an outer wall 181 of the lower cover 100, and a number of lower cover ribs 182 are so formed as to vertically extend from the outer wall.

On the other hand, the edge 203 serving as a thin-wall portion is formed around the outer wall of the upper cover 200. Therefore, the edge 203 of the upper cover thin-wall portion enters into a gap 183 defined between the lower cover thin-wall portion 181a and the lower cover ribs 182. Consequently, the outer walls of the upper and lower covers are fitted in each other to determine the front, rear, right, and left positions, thereby ensuring the rigidity.

The height of the edge 203 is made larger by a predetermined amount than the thin-wall portion 181 to form a gap h. That is, a slit is formed around the entire horizontal seam between the upper and lower covers to make the seam inconspicuous. Also, this slit achieves a designing effect by which the product looks low. The engaging portions 185 which are snap pawls which elastically deform are formed in four corners inside the outer walls of the lower cover, and holes 185a are formed in these engaging portions. Additionally, the triangular pawls 202 are formed on the upper cover in positions where they are fitted in these holes 185a.

Accordingly, when the upper cover 200 is moved down in the direction of the arrow D10 (FIG. 25) in engaging the upper and lower covers 100 and 200, the triangular pawls 202 extend the snap pawl engaging portions 185 to positions 185b (indicated by the alternate long and two dashed lines in FIG. 6). When the holes 185a come to portions above the pawls 202, the engaging portions 185 return to the original positions. As a consequence, even when the upper cover 200 is pulled up, the pawls 202 raise the engaging portions 185 to keep the upper and lower covers engaged with each other, so the upper and lower covers cannot be removed from each other.

On the other hand, notches serving as the holes 201 are formed in the thin-wall portion 203 of the upper cover 200. To remove the upper cover 200, a tool T is inserted from this notch 201 to elastically deform the snap pawl engaging portion 185 inward. Consequently, the lower and upper covers 100 and 200 can be disengaged.

As described above, the upper and lower covers are engaged by the outer circumferential walls, and the fixing pawls are formed near the outer circumference. This increases the outer casing strength. Additionally, since these covers are attached and detached by using the elastic deformation of the pawls, no screws need to be used to perform fixation. This improves the workability of attaching and detaching.

The lower cover 100 shown in FIG. 27 has several compartments to ensure predetermined strength, as also shown in FIG. 23. The power supply unit 600 is accommodated in a compartment 189. After a projection 189a regulates the outer circumference of the power supply unit so that the power supply unit does not move, the rear cover 15 is fixed.

The outer shape of a compartment 187 is so determined as to accommodate the ink absorber 13 in an immobile state. Additionally, projecting ribs 88 sink into portions of the absorber 13 to control changes in the shape caused by drying. The lower cover 100 has a compartment 87 having substantially the same shape and area as the absorber 13, and the vertical ribs 88 are formed in the compartment 87. The absorber 13 is placed in the compartment 87, and previously cut slits enter into the ribs 88 to prevent the removal of the absorber 13. The height of the compartment 87 is set to be larger than the height of the absorber 13 so that waste ink absorbed by the absorber 13 does not overflow.

Referring back to FIG. 23, four engaging portions 104 are formed above an opening 111 and engage with the pawls of the monochrome scanner unit 300 or the color scanner unit 800. Also, portions of the monochrome scanner unit 300 or the color scanner unit 800 are positioned on the engaging portions 104 to receive an external force. Studs 102 receive the bottom surface, and guides 103 roughly guide the monochrome scanner unit 300 or the color scanner unit 800. When an impact force acts, these parts receive the external force.

When the control board unit is fitted in notches 193a formed in the wall 193, the control board unit is fixed in an upright position such that a connector 555 is positioned in a notch 192 behind the control board unit.

Holes to be engaged with right and left engaging portions 197 are formed in the main body of the printer unit 400. After being roughly guided by guides 195, the main body is fixed on a bottom surface 196. Through holes are formed below the engaging portions 197, so tools can also be inserted from the bottom surface.

The individual units are set in positions where they do not interfere with each other in the longitudinal and lateral directions. Therefore, these units can be fixed to the lower cover 100 in no special order. This improves the facility with which these units are assembled. Additionally, since only a necessary unit can be removed, the facility with which each unit is maintained can be improved.

Also, the upward movement of the power supply unit 600 can be regulated by a portion of the printer unit 400, and the upward movement of the monochrome control board unit 500 or the color control board unit 900 can be regulated by a portion of the monochrome scanner unit 300 or the color scanner unit 800. If this is the case, the power supply unit 600 and the monochrome control board unit 500 or the color control board unit 900 can be easily fixed to the lower cover 200. This further improves the facility with which these units are assembled.

Figure 28:
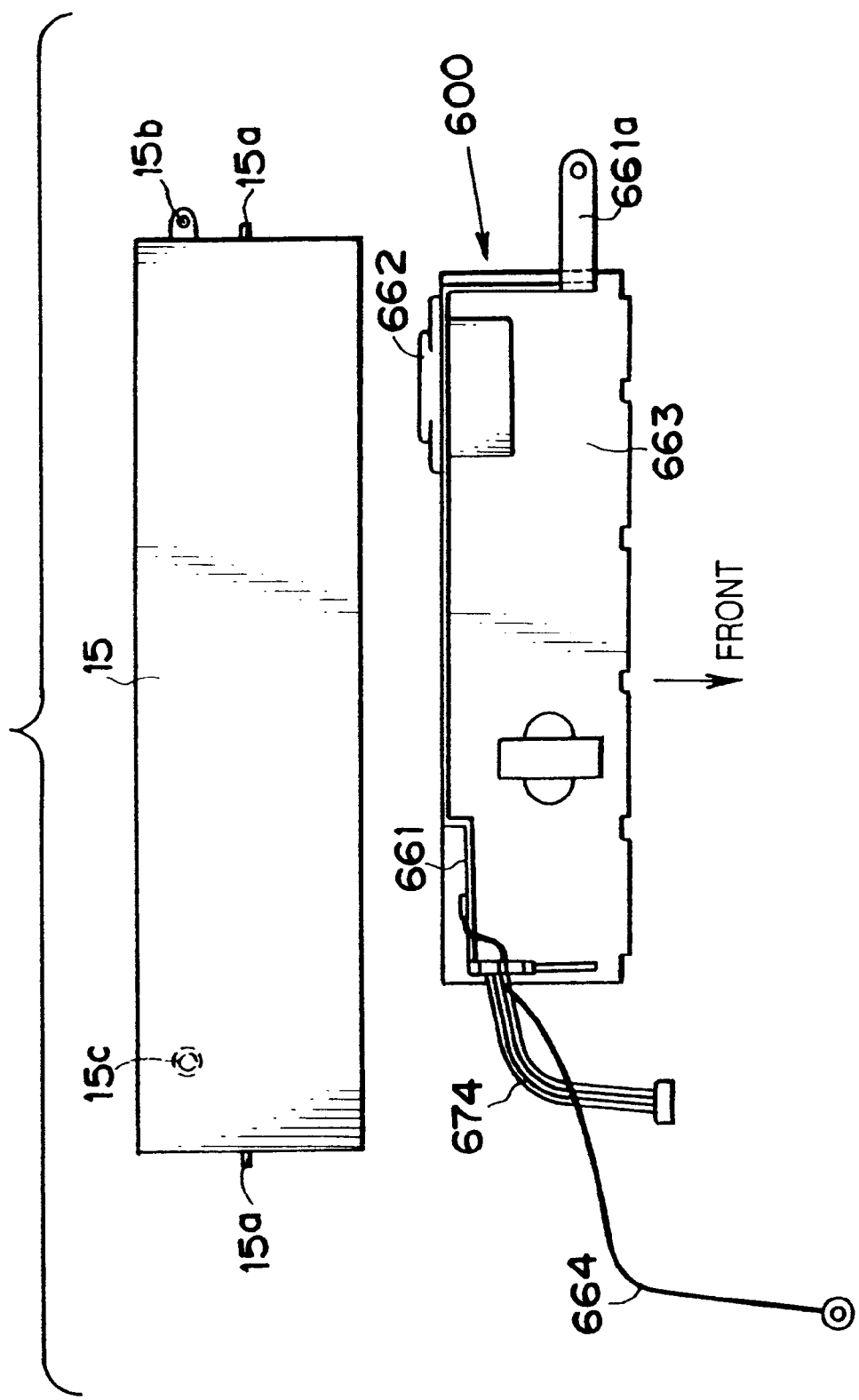
FIG. 28 is a plan view of a rear cover 15 and a power supply unit 600.
Figure 29:
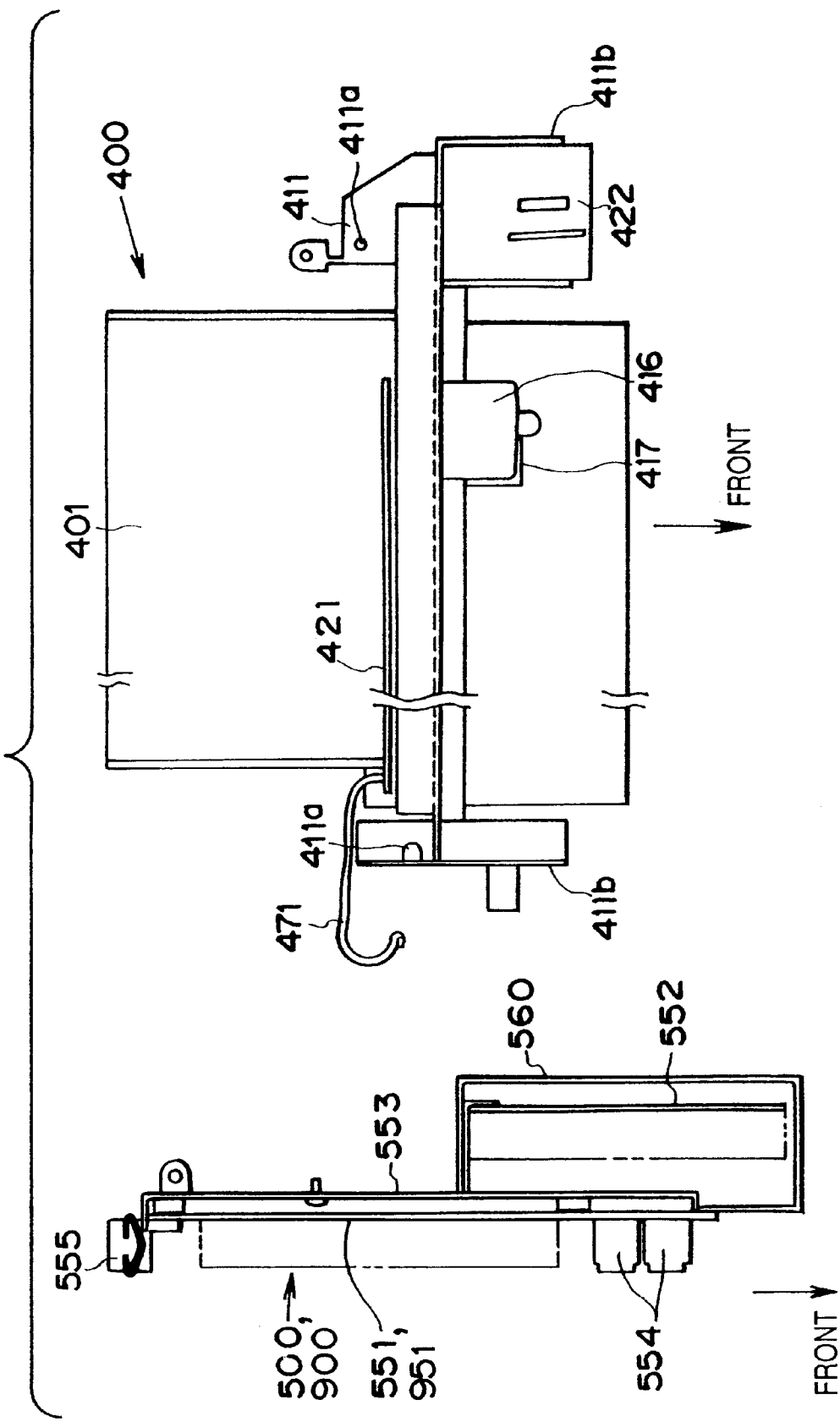
FIG. 29 is a plan view of control board units 500 and 900 and a printer unit 400.

FIG. 28 is a plan view of the rear cover 15 and the power supply unit 600. Engaging pawls 15a and projections 15b are integrally formed on the rear cover. A ground line 664, a ground tab 661a, and cables 674 of the power supply unit 600 are fixed on a board 663. Reference numeral 662 denotes an AC plug socket. FIG. 29 is a plan view of the monochrome control board unit 500 or the color control board unit 900 and the printer unit 400. A monochrome main board 551 or a color main board 951, a sub-board 552, and a board chassis 553 of the monochrome control board unit 500 or the color control board unit 900 are fixed as an integrated unit to the lower cover 100 by a method to be described later. The monochrome control board unit 500 or the color control board unit 900 is arranged in an upright position to the left of the lower cover, i.e., beside the printer unit 400 and the monochrome scanner unit 300 or the color scanner unit 800. On the monochrome main board 551 or the color main board 951, therefore, a control circuit and a connector for the printer unit 400 can be provided on the rear side, and a control circuit and a connector for the monochrome scanner unit 300 or the color scanner unit 800 can be provided on the front side. Consequently, it is possible to efficiently arrange the circuits, miniaturize the control board unit, and makes the control board unit strong against noise.

In the printer unit 400, a middle plate of a paper feed unit 401 is supported by a support point (not shown) and urged by a spring. The base 401 is fixed to the printer main body 400 by screws or the like. Printing sheets S are stacked on the middle plate. The lower surface of the printing sheet S is supported by a paper feed tray provided on the paper feed base so as to be freely extended and contracted. Side guides movably formed on the middle plate regulate the positions of the printing sheets S in the widthwise direction.

The printer main body 400 is a so-called ink-jet printing apparatus. A printer chassis 411 serving as a frame of the printer main body 400 is fixed to the lower cover 100 by being engaged with the engaging portions 197. A paper feed roller 412 is urged by a pinch roller 413 arranged to oppose the paper feed roller 412 and feeds the printing sheet S supplied from the paper feed unit toward a printing unit on the downstream side. A platen 414 supports the lower surface of the printing sheet in the printing unit. An image to be printed is formed on the upper surface of the printing sheet by an ink head 417 mounted on a carriage 416 which moves back and forth while being supported by a guide shaft 415.

The printing sheet S is then delivered from the printer unit 400 by a printing sheet delivery roller pair 418 and stacked on the printing sheet table 8 provided in the lower cover 100.

The printing sheet feeding and the printing operation by the printer unit 400 are performed by motors, sensors, and head driving circuits (none of them is shown), and the monochrome control board unit 500 or the color control board unit 900 controls these components. A board 421 is a printing relay board which relays signals from these motors, sensors, and head driving circuits and transfers these signals to the control board unit. The absorber 13 which absorbs and holds waste ink produced when an operation of preventing clogging of ink is performed in the printer unit 400 is attached to the lower cover 100 as described above.

Figure 30:
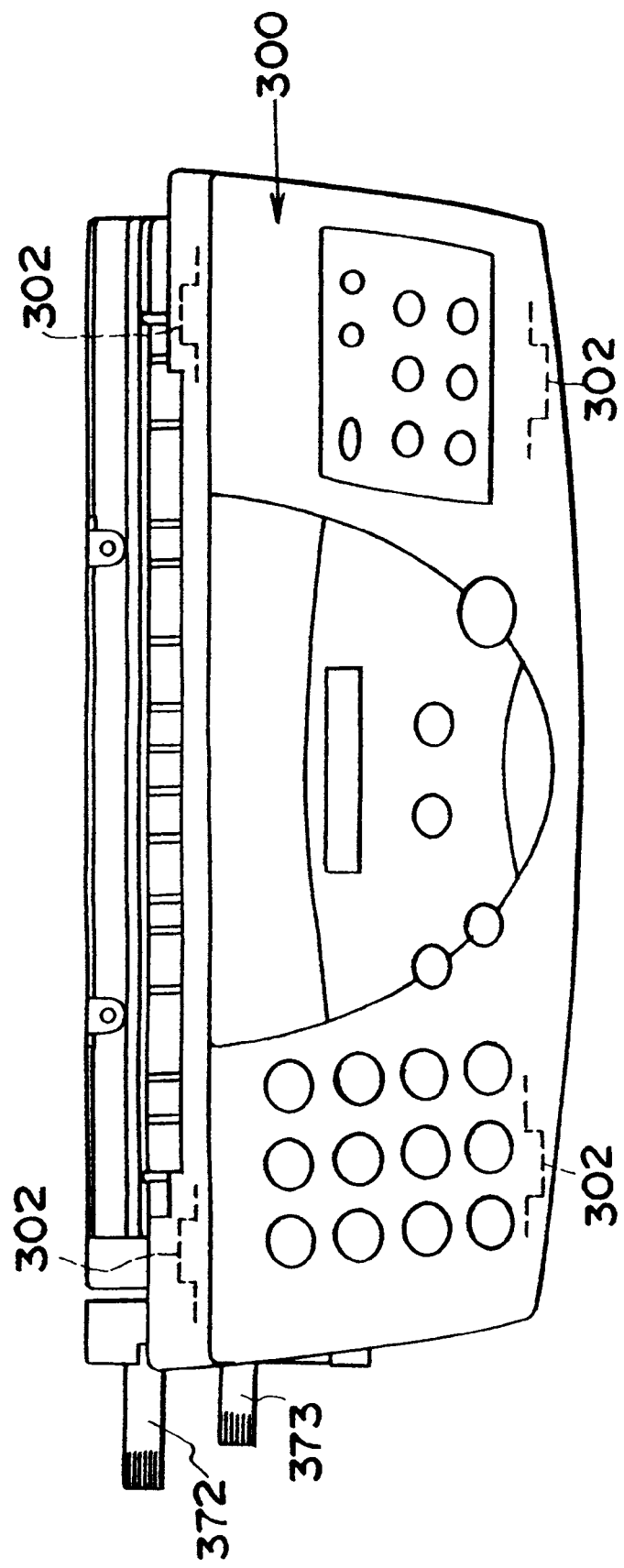
FIG. 30 is a plan view of a scanner unit 300.

The monochrome scanner unit 300 will be described below with reference to FIGS. 30 and 31. The monochrome scanner unit 300 irradiates light onto the original G, converts the reflected light into an electrical signal, and transmits the signal to another apparatus or the printer unit 400 in accordance with an operation mode. The original G is placed on the original table 2.

In the scanner main body 300, a scanner base 334 functions as the frame of the monochrome scanner unit 300 and guides the lower side of the original G. This scanner base 334 includes a separation roller 335 for feeding the original, a monochrome contact sensor 336 for reading image information of the original, and a roller 337 opposed to and pushed against the contact sensor 336.

Also, the panel unit includes an upper original guide 338, a separation piece 339, and a panel frame 340. The upper original guide 338 is pivotally attached to the scanner base 334 by a support point (not shown) and guides the upper side of the original. The separation piece 339 is opposed to and pushed against the separation roller 335. The panel frame 340 forms a part of the outer casing and is attached to the upper original guide. The panel frame 340 includes operation keys 341, a display unit 342 such as an LCD, and a panel board 343 on which these parts are mounted.

An original delivery roller pair 344 stacks originals, fed by the separation roller 335 and the CS roller 337, on an original delivery table.

The original feeding and the reading operation by the monochrome scanner unit 300 are performed by motors and sensor driving circuits (none of them is shown). The monochrome control board unit 500 controls these components and also controls display on a panel unit 3002.

The monochrome control board unit 500, the power supply unit 600, and the arrangement and electrical connection between these and other units will be described below with reference to FIGS. 32, 33, and 34.

The monochrome control board unit 500 is obtained by attaching the monochrome main board 551 and the sub-board 552 to the board chassis 553 made of a metal. On the main board 551, a modular jack 554, a Centronics connector 555, a CPU 556, a ROM 557, a RAM 558, and a monochrome image processing chip 559 are mounted.

Figure 32:
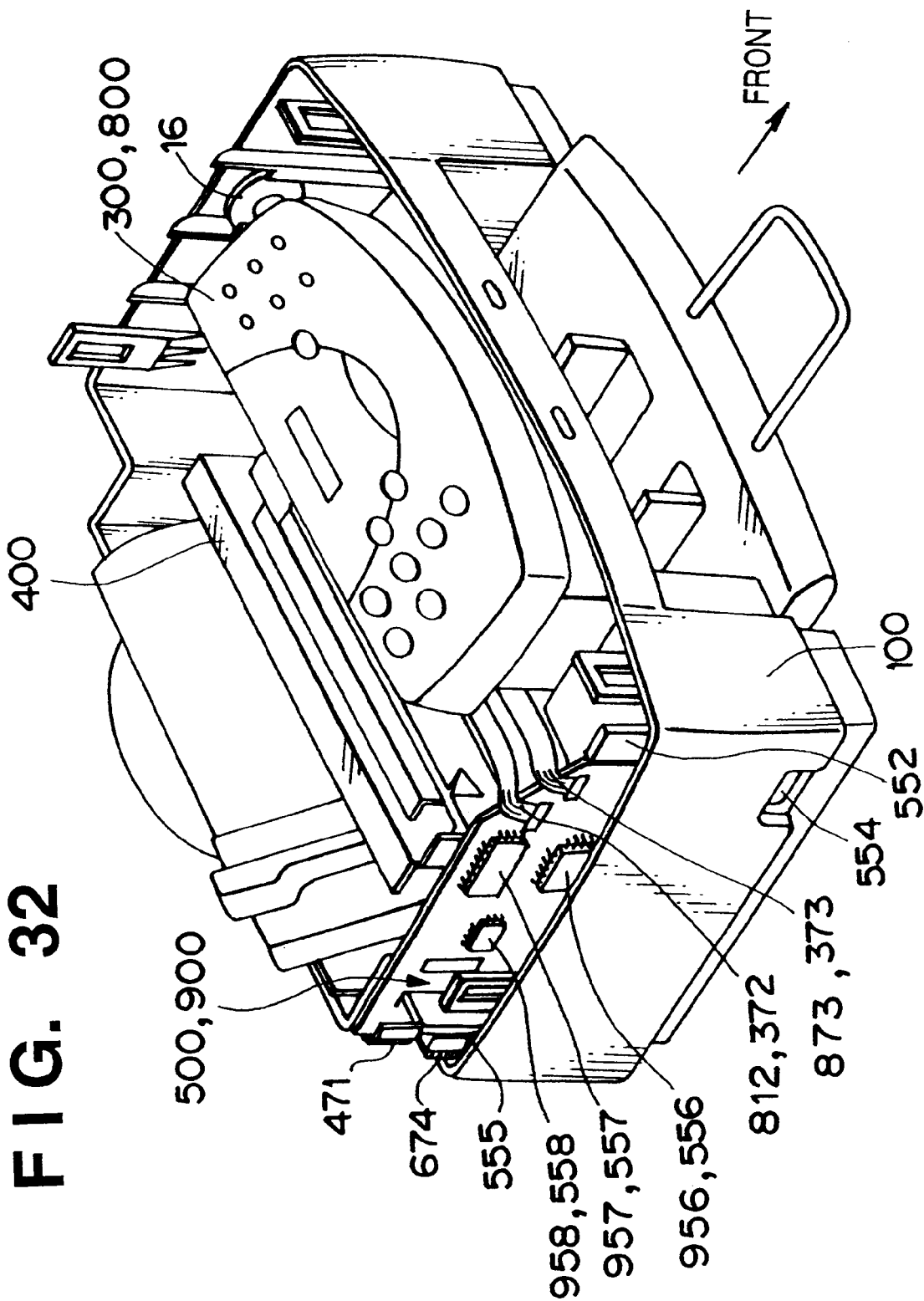
FIG. 32 is a perspective view showing the outer appearance in the state after individual units are fixed to the lower cover 100, in which the connections of the individual units are illustrated.
Figure 33:
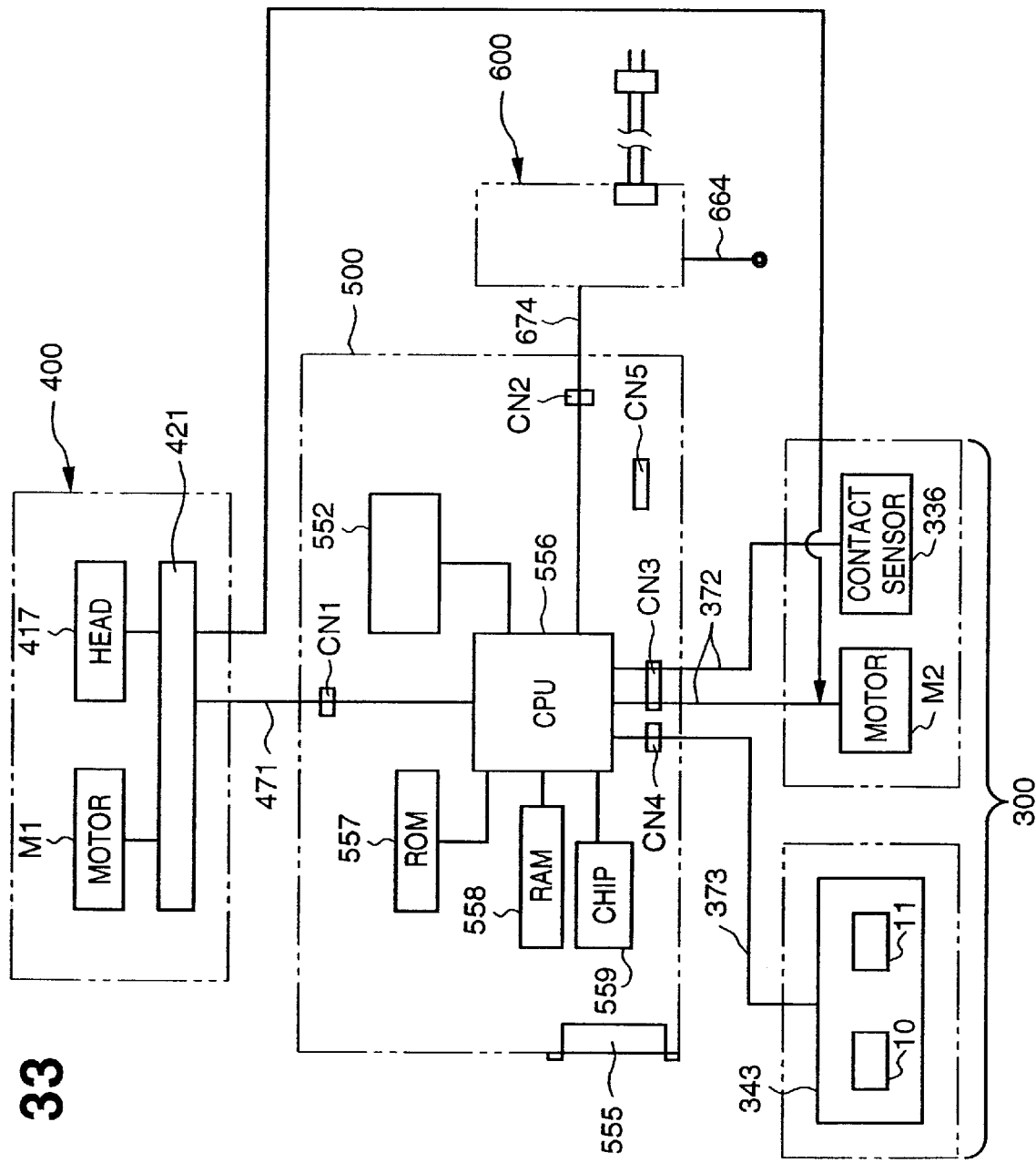
FIG. 33 is a block diagram of the control board unit.

The CPU 556 and the ROM 557 which are frequently replaced are positioned above substantially the center of the monochrome main board 551 and exposed when the upper cover 200 is removed (FIG. 32). The monochrome main board 551 and the sub-board 552 are connected by cables 559a and 559b by using connectors in positions below substantially the center of the monochrome main board 551.

The sub-board 552 is preferably a so-called NCU formed by gathering line control circuits. Therefore, a modification is readily possible by replacing the sub-board 552 (NCU) in accordance with each country as the destination without modifying the monochrome main board 551. A board cover 560 shields the sub-board 552 to protect the sub-board 552 from being damaged by the falling of machine screws or by tools when maintenance is performed by removing the upper cover 200, and prevent sticking of ink scattered from the printer unit 400. Especially when the sub-board 551 is an NCU, the accident preventing effect is high because a line high-voltage electric circuit is present.

When the width of the monochrome scanner unit 300 is made smaller than that of the printer unit 400 and the sub-board 552 is arranged beside the scanner unit, the space efficiency is increased, and the whole apparatus can be made compact. Furthermore, when a recovering unit 22 for cleaning the head is arranged in a direction opposite to the monochrome control board unit 500 or the color control board unit 900 (i.e., on the right side of the lower cover 100) in the waiting position of the ink head 417 in the printer unit 400, ink does not scatter to the board when a recovery operation is performed. Consequently, a board short circuit caused by ink wetting can be prevented.

In the power supply unit 600, a power supply unit chassis 661 is made of a metal and integrated with the power supply unit board 663 on which electric parts such as an inlet 662 are mounted. Also, a portion 661*a* of the power supply unit chassis 661 is connected to the printer chassis 411 by a screw and grounded. This portion 661*a* is also grounded to the printer chassis 411 and the board chassis 553 by a ground line 664. The power supply unit 600 is arranged behind the printer unit 400 in the lower cover.

The units 400, 300, 500, and 600 are assembled in their respective positions of the lower cover 100. The printer unit 400, the mono-color scanner main body 300 having the panel unit or the color scanner unit 800 having the panel unit, and the power supply unit 600 are electrically connected to the monochrome control board unit 500 by a printer cable 471, a scanner cable 372, a panel cable 373, and the cable 674, respectively.

As shown in the external perspective view of FIG. 32, these cables 471, 372, and 373 are connected above substantially the center of the monochrome main board 551. Also, the upper cover 200 and the lower cover 100 are separated at substantially the half height. Therefore, the units 400, 300, and 500 are disconnected only by removing the upper cover 200, and this facilitates the maintenance work. Additionally, each cable is extracted from the control board unit side of each corresponding unit. This shortens each cable, decreases the cost, and makes each unit strong against noise.

A power cable 374 or the cable of the monochrome scanner unit 300 can also be partially extended via the printing relay board. If this is the case, the heat generated from the monochrome main board 551 can be reduced by concentrically arranging heat generating parts on the printing relay board. When this arrangement is used, it is desirable to provide motor drivers on the printing relay board.

The differences of the color reading facsimile apparatus 1000 shown in FIG. 23 from the monochrome reading facsimile apparatus 1 shown in FIG. 1 will be described below.

First, the color scanner unit 800 will be described below with reference to FIGS. 35 and 36.

The color scanner unit 800 irradiates light onto the original G, converts the reflected light into an electrical signal, and transmits the signal to another apparatus or the printer unit 400 in accordance with an operation mode. The color original G is placed on the original table 2.

In the color scanner main body 800, a scanner base 831 functions as the frame of the color scanner unit 800 and guides the lower side of the original G. This scanner base 831 includes a separation roller 832 for feeding the original, a feed roller 833 for feeding the original, a roller 834 for delivering the original onto the original delivery table, and a color contact sensor 835 for reading image information of the original.

Also, the panel unit includes an upper original guide 836, a separation piece 837, a feed roller 838, a paper delivery roller 839, a reading white base 840, and a release lever 841. The upper original guide 836 is pivotally attached to the scanner base 831 by a support point (not shown) and guides the upper side of the original. The separation piece 837 is opposed to and pushed against the separation roller 832. The feed roller 838 and the paper delivery roller 839 are opposed to and pushed against the feed roller 833 and the paper delivery roller 834. The reading white base 840 is opposed to and pushed against the color contact sensor 835 and serves as a reading white reference. The release lever 841 releases the push by the separation piece 837 to feed a thick original.

A panel frame 842 forms a part of the outer casing and is attached to the upper original guide. The panel frame 842 includes operation keys 843, a display unit 844 such as an LCD, and a panel board 845 on which these parts are mounted.

The shapes of, e.g., the scanner base 831, the upper original guide 836, and the panel frame 842 forming the outer shape of the color scanner unit 800 having the above arrangement are so set that the color scanner unit 800 has substantially the same outer shape as the monochrome scanner unit 300.

The original feeding and the reading operation by the color scanner unit 800 are performed by motors and sensor driving circuits (none of them is shown). The color control board unit 900 controls these components and also controls display on a panel unit 801.

Figure 37:
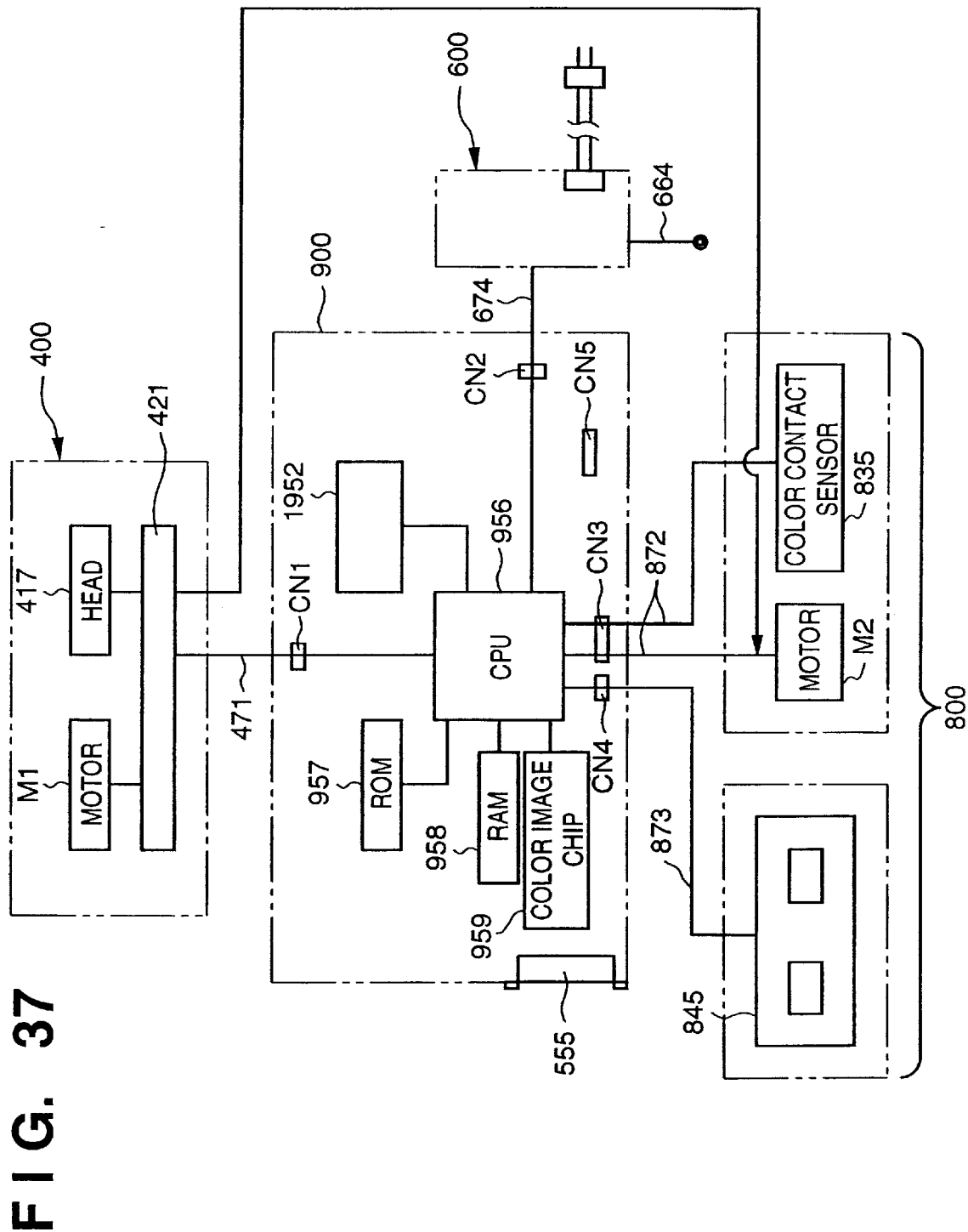
FIG. 37 is a block diagram showing the connections of the individual units of the apparatus 1000.
Figure 38:
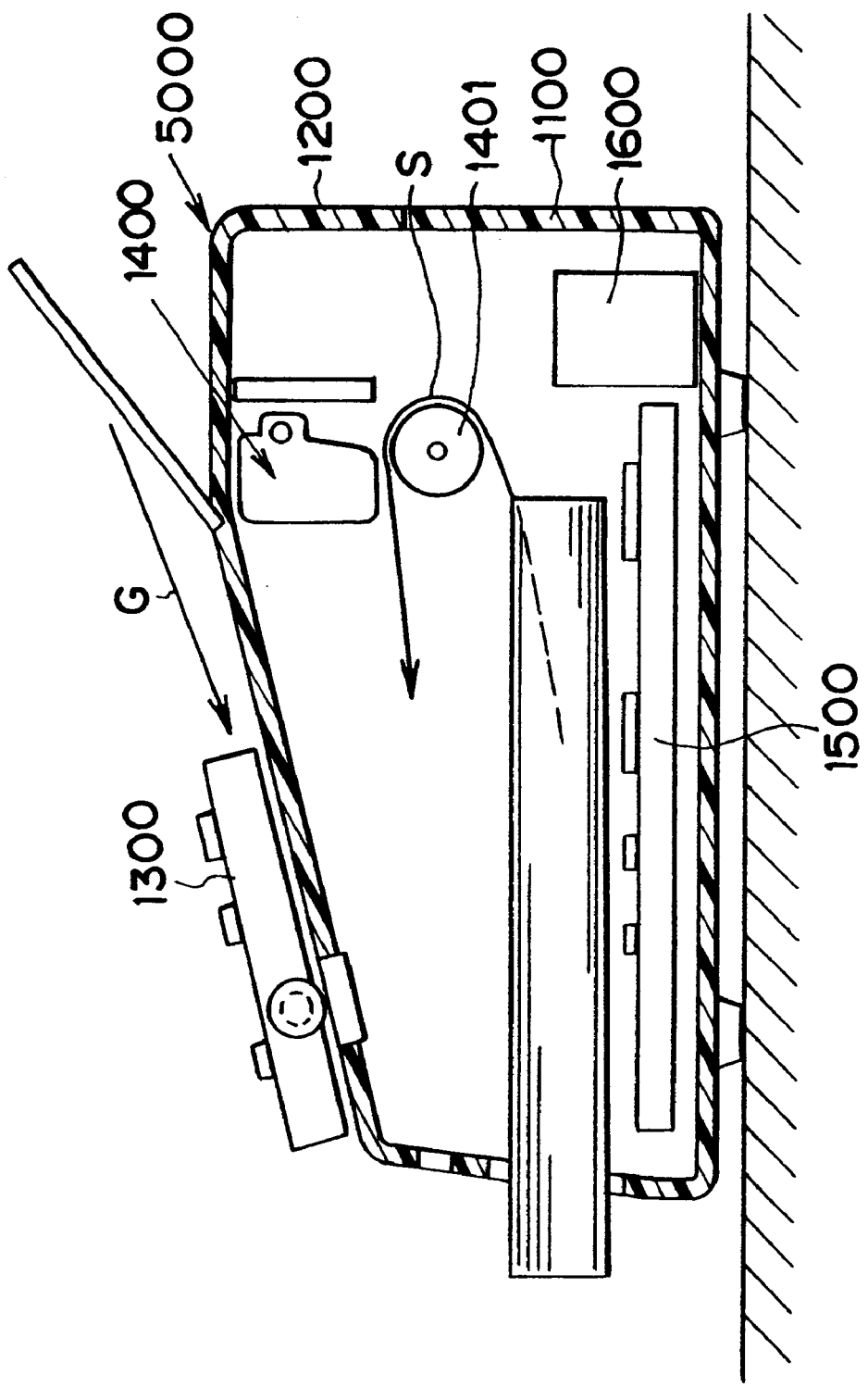
FIG. 38 is a cross-sectional view of a conventional facsimile apparatus.

The color control board unit 900 will be described below with reference to FIG. 37.

The color control board unit 900 is obtained by attaching the color main board 951 and the sub-board 552 to the board chassis 553 made of a metal. On the color main board 951, a modular jack 554, a Centronics connector 555, a CPU 956, a ROM 957, a RAM 958, and a color image processing chip 959 are mounted. The color main board 951 has substantially the same outer shape as the monochrome main board 551.

As in the monochrome control board unit, the CPU 956 and the ROM 957 are positioned above substantially the center of the color main board, and the connection to the sub-board 552 is also the same.

Furthermore, the arrangement and electrical connection of the units are substantially the same as in the monochrome reading facsimile apparatus 1. As in the monochrome apparatus, the units 400, 800, 900, and 600 are assembled in their respective positions of the lower cover 100. The printer unit 400, the color scanner unit 800, and the power supply unit 600 are electrically connected to the color control board unit 900 by a printer cable 471, a scanner cable 872, a panel cable 873, and the cable 674, respectively.

Figure 34:
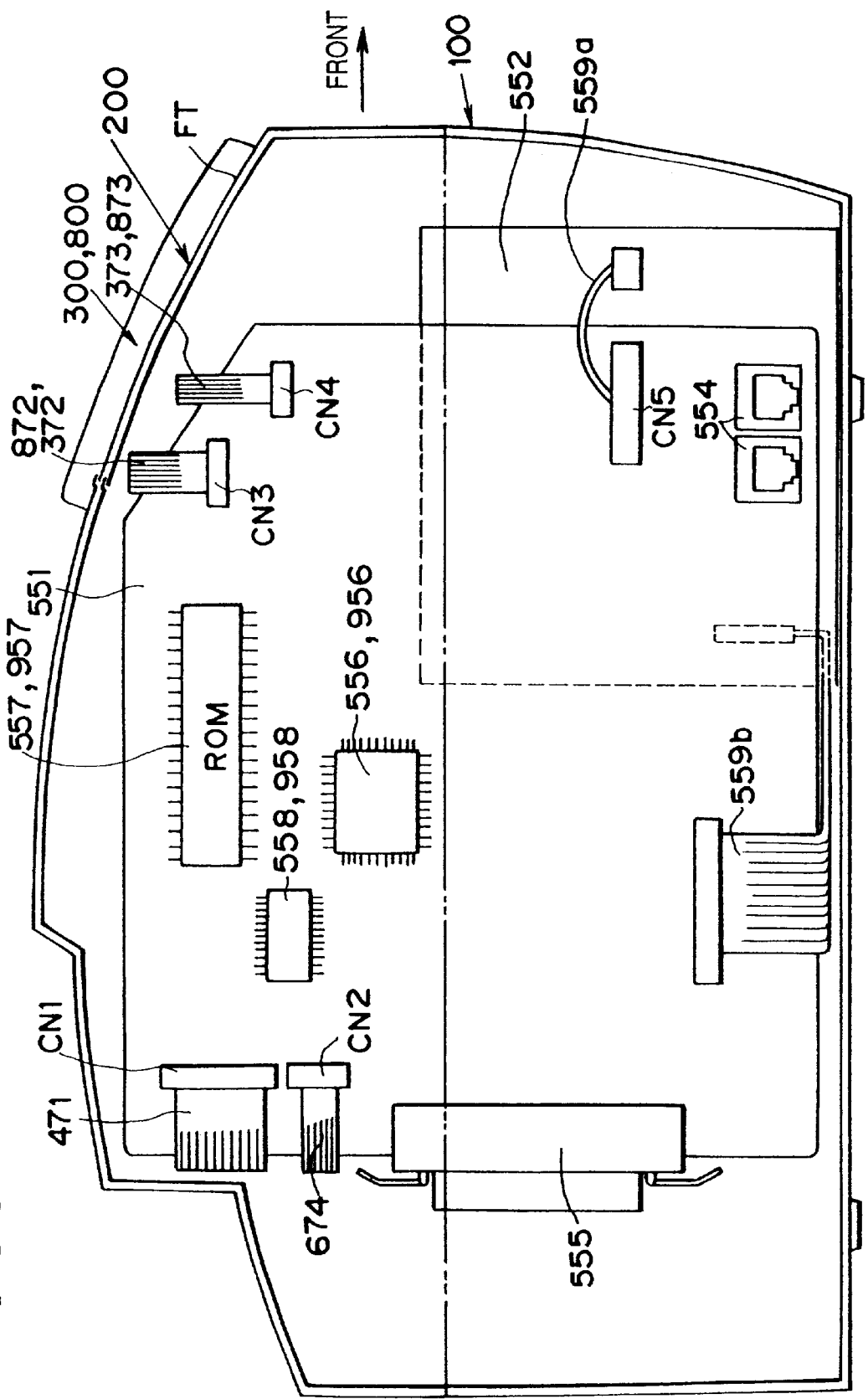
FIG. 34 is a front view of the control board unit.
Figure 35:
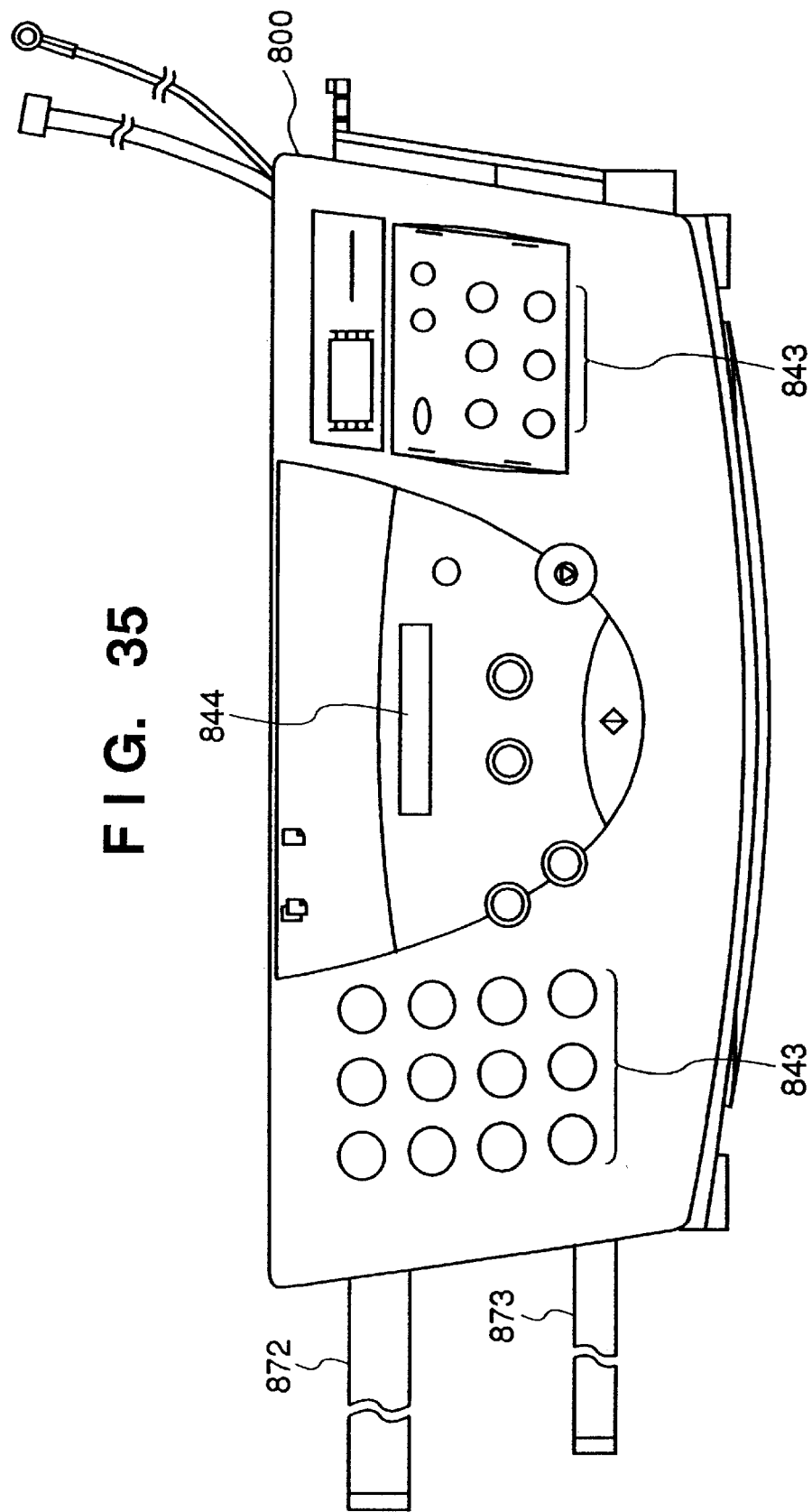
FIG. 35 is a plan view of the scanner unit 300.

As shown in FIGS. 34 and 35, as in the monochrome apparatus, these cables 471, 872, and 873 are connected above substantially the center of the main board 951. Also, the upper cover 200 and the lower cover 100 are separated at substantially the half height. Therefore, the units 400, 800, and 900 are disconnected only by removing the upper cover 200, and this facilitates the maintenance work.

A method of fixing the power supply unit 600 and the rear cover 15 serving as a manual feed guide to the lower cover 100 will be described below. Ribs 189*a* which ensure an area slightly larger than the outer dimensions of the power supply unit 600 and regulate the front, rear, right, and left positions are formed in the lower cover 100. These ribs 189*a* are set to be higher than the power supply unit 600. Accordingly, when the power supply unit 600 is placed in a predetermined space of the lower cover 100, the front, rear, right, left, and lower positions are determined. On the other hand, the rear cover 15 serving as a manual feed guide is so positioned as to cover the power supply unit 600. The position is determined when positioning bosses 190 of the lower cover and positioning holes of the manual feed guide are fitted. Triangular pawls are fitted in snap pawl engaging portions 191 having a shape similar to that of the engaging portions 185 to prevent upward removal. This simultaneously regulates the upward movement of the power supply unit 600. Also, the rear cover and the lower cover ribs together cover the power supply unit 600 to prevent scattered ink from the printer unit 400 from sticking to the power supply unit 600.

The rear cover 15 functions as a guide for manually inserting a printing sheet from below the paper feed unit to the printer main body 400.

A method of fixing the monochrome control board unit 500 or the color control board unit 900 to the lower cover 100 will be described below.

A notch 192 slightly wider than the centronics connector 555 is formed in the lower cover 100 and serves as a guide for sliding the monochrome control board unit 500 or the color control board unit 900 downward. An accurate position is determined by fitting a positioning boss 194 into a positioning hole (not shown) of the board chassis 553. Additionally, the monochrome main board 551 or the color main board 951 and the sub-board 552 are fitted in the notches 193a of the rib 193, and this regulates the movement of these boards. Upward removal can be prevented by engaging snap pawls (not shown) such as the snap pawls 185 with the board chassis 553, screwing the board chassis 553 to the printer chassis 411 sideways, or simply pushing the monochrome control board unit 500 or the color control board unit 900 downward by a portion of the monochrome scanner unit 300 or the color scanner unit 800.

A method of fixing the printer unit 400 to the lower cover 100 will be described below.

The position is determined by fitting positioning bosses 195 formed on the lower cover into positioning holes 411a of the printer chassis 411. Since the tip of the positioning boss 195 has a conical shape, the position is determined only by sliding the printer unit 400 downward. Thereafter, the lower position is supported by receiving portions 196. Upward removal is prevented because elastically deformable snap triangular pawls 197 engage with printer chassis outer walls 411b.

A method of fixing the monochrome scanner unit 300 or the color scanner unit 800 to the lower cover 100 will be described below.

A surface 101 of the lower cover for receiving the scanner unit 300 or 800 is higher than surfaces for receiving other units. This surface is positioned in front of the printer unit 400 and above a delivered printing sheet. The section of the surface is roughened to increase the section modulus, thereby largely increasing the strength. With this shape, it is possible to set the rigidity by which the printer unit and the scanner unit can be supported by the same lower cover.

The position is determined by fitting positioning bosses 102 formed on the lower cover into positioning holes (not shown) of the scanner base 334 or 831. Since the tip of the positioning boss 102 has a conical shape, the position is determined only by sliding the scanner unit 300 or 800 downward. Thereafter, the lower position is supported by predetermined receiving portions (not shown) on the surface 101. The front, rear, right, and left positions are slightly separated from the outer shape of the scanner base 334 or 831 and regulated by the ribs 103 formed on the lower cover 100. Upward removal is prevented by engaging triangular pawls 334a or 831a of the scanner base 334 or 831 with snap pawls 104 of the lower cover as shown in FIG. 31.

As described above, to fix each unit to the lower cover 100, strong ribs and walls for receiving the front, rear, right, and left positions of each unit are formed on the lower cover 100. Since snap pawls are used only to prevent upward removal, elastically deformable snap pawls can be formed.

Also, since the base of each unit is the same lower cover 100, the rigidity of the product itself is increased. Additionally, each unit can be assembled by sliding it downward. This facilitates the assembly work and also facilitates the maintenance because the individual units can be independently removed.

In the above embodiment, after the paper feed unit is fixed to the printer main body 400, the printer main body 400 is fixed to the lower cover 100. However, the paper feed unit and the printer main body 400 can also be independently fixed as separate units to the lower cover 100. When the paper feed unit is fixed to the printer main body 400, the reference position of a sheet can be easily determined, and this increases the printing accuracy. When the paper feed unit is directly fixed to the lower cover 100, the weight of the printer unit 400 can be reduced, and this further facilitates the assembly work.

The original table 2 as a slider cover is connected to the upper cover 200, but the original table 2 can also be connected to any other unit such as the printer unit 400. When the original table 2 is connected to the upper cover 200, the unit maintenance work is facilitated because the slider cover is removed at the same time the upper cover 200 is removed. When the original table 2 is connected to the printer unit 400, the slider cover 2 is already connected to the lower cover 100 when the upper cover 200 is attached. Therefore, since the light upper cover alone can be attached, the assembly work is easy to perform.

The rear cover 15 as a manual feed cover is attached as a separate part to the lower cover 100, and this strengthens the fixation and shield of the power supply unit 600. However, the rear cover 15 can also be integrated with any of the lower cover 100, the upper cover 200, and the printer unit 400. If this is the case, the number of parts can be decreased. Especially when the rear cover 15 is integrated with the upper cover, the power supply unit 600 can be easily maintained simply by removing the upper cover.

Figure 31:
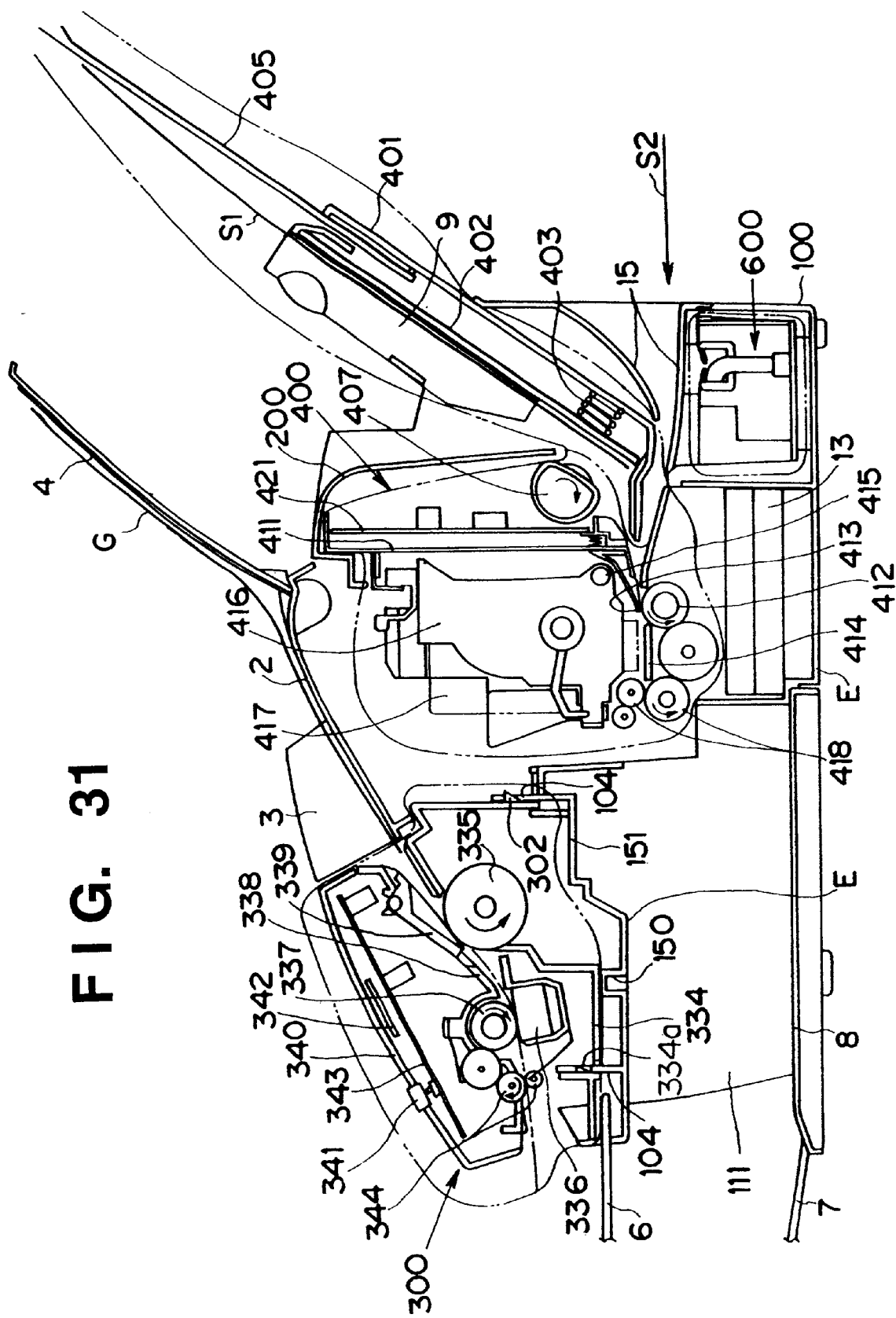
FIG. 31 is a cross-sectional view of the apparatus.
Figure 36:
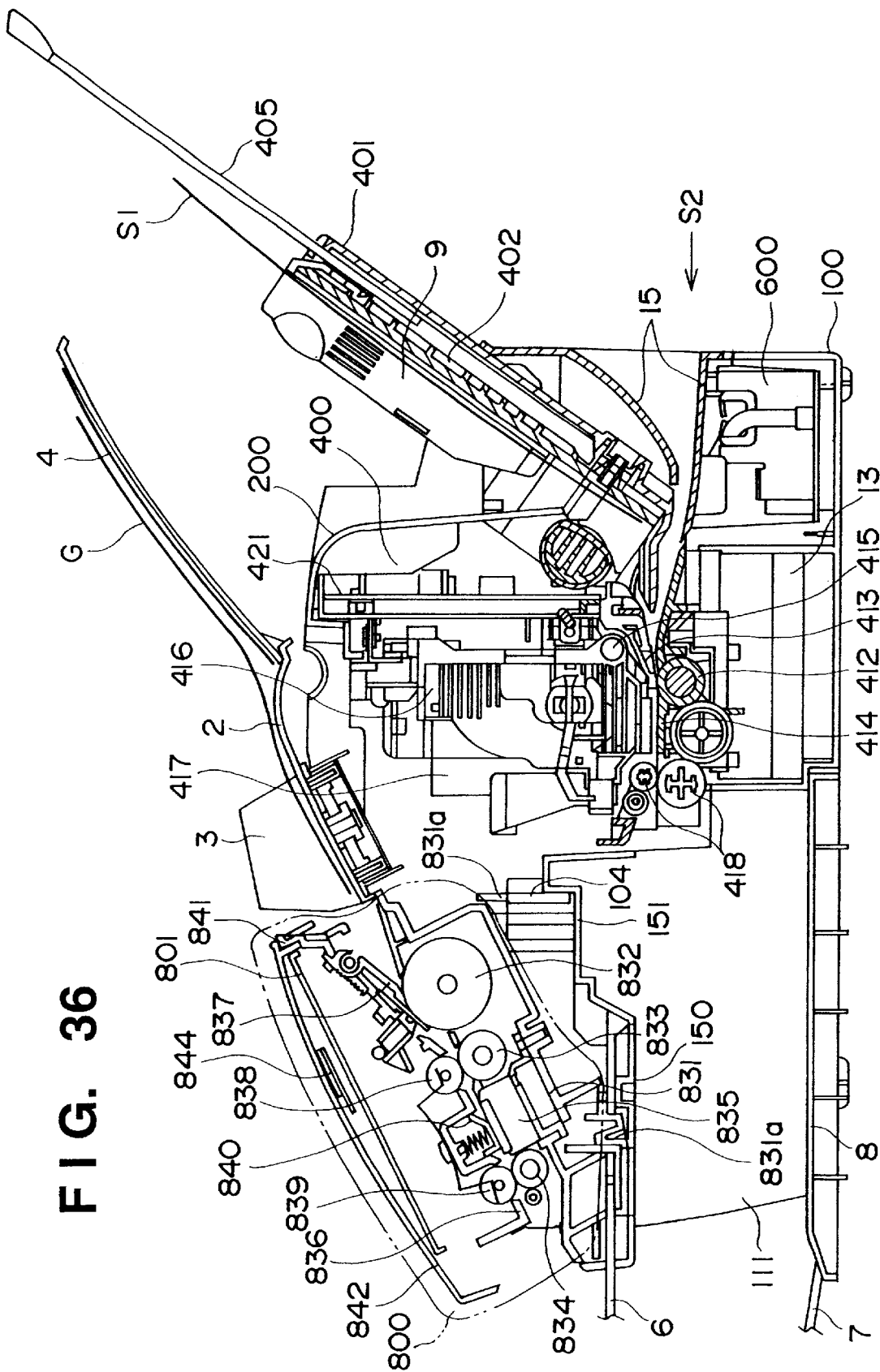
FIG. 36 is a cross-sectional view of the apparatus 1000.

FIG. 31 is a cross-sectional view of the finished apparatus 1, and FIG. 36 is a cross-sectional view of the finished apparatus 1000. The same reference numerals as above denote the parts already described, and a detailed description thereof will be omitted. As shown in FIGS. 31 and 36, the individual units are efficiently arranged.

Also, in addition to the form of an integrated or separate apparatus as an image output terminal of an information processing equipment such as a computer, the printing apparatus according to the present invention can take the form of a copying apparatus combined with a reading apparatus or the like or the form of a facsimile apparatus having a transmitting/receiving function. Furthermore, the apparatus according to the present invention can take the form of two types of apparatuses by using a common control board unit and interchanging scanners (e.g., 20-original ADF and a 30-original ADF, 200 dpi and 300 dpi) having different arrangements of reading apparatuses. Additionally, the apparatus according to the present invention can be constituted without any printing apparatus or by using another printing apparatus.

In the reading/printing apparatus of the present invention as described above, the steps of fixing and connecting the individual units need not be performed in order. Therefore, it is possible to provide a reading/printing apparatus by which the facility with which each unit is assembled and maintained can be significantly improved. The present invention can also provide a reading apparatus and a reading/printing apparatus which obviate the need to prepare an enormous designing time and a manufacturing installation including metal molds for manufacturing a housing in manufacturing a derivative type of apparatus by slightly modifying some units and directly using other units constituting the apparatus.

As many apparently widely different embodiments of the present invention can be made without departing from the spirit and scope thereof, it is to be understood that the invention is not limited to the specific embodiments thereof except as defined in the appended claims.

What is claimed is:

1. A reading/printing apparatus in which a reading apparatus, a printing apparatus, and a control board are disposed in a housing, characterized in that said reading apparatus, said printing apparatus, and said control board are discretely constituted, said reading apparatus is so disposed that one side surface of said reading apparatus is substantially parallel with one opposing side surface of said housing, said printing apparatus is so disposed that one side surface of said printing apparatus is substantially parallel with another opposing side surface of said housing, and said control board is disposed in an upright position on a side surface connecting the one side surface and another side surface of said housing.

2. The apparatus according to claim 1, characterized in that said control board is so disposed as to be detachable from said housing without interfering with said reading apparatus and said printing apparatus.

3. The apparatus according to claim 1, characterized in that in order to dispose a plurality of control boards in an upright position, said control boards are disposed in a space secured by making a dimension in a longitudinal direction of said reading apparatus smaller than a dimension in a longitudinal direction of said printing apparatus.

4. The apparatus according to claim 1, characterized in that a length of wires for electrically connecting said reading apparatus, said printing apparatus, and said control board is substantially minimized by extending said wires from said reading apparatus and said printing apparatus toward said control board.

5. The apparatus according to claim 1, characterized in that in order to dispose a plurality of control boards in an upright state, said control boards are discretely constituted by fixing said control boards to a common support member.

6. The apparatus according to claim 5, characterized in that at least one of said control boards is detachably disposed to meet a change of specifications in each country.

7. The apparatus according to claim 6, characterized in that said board is disposed in a lower portion, and a protecting cover for covering said board is further provided.

8. The apparatus according to claim 1, characterized in that said housing comprises:

a first housing integrally forming a base portion and lower side walls to integrally form an opening; and a second housing covering said opening and integrally forming upper side walls, said first housing is formed to have enough strength to separately fix said reading apparatus, said printing apparatus, and said control board, said second housing is detachably fixed so as to cover said opening in said first housing, and said first housing integrally forms a wall surface having a height which allows said wire of said control board to be attached and detached, when said second housing is removed from said first housing.

9. The apparatus according to claim 1, characterized in that said printing apparatus integrally comprises a driving circuit board for performing a predetermined printing operation, and said driving circuit board supplies an electrical driving signal for allowing said reading apparatus to perform a predetermined reading operation.

10. A reading/printing apparatus in which a reading apparatus, a printing apparatus, and a control board are disposed in a housing, characterized in that said reading apparatus, said printing apparatus, and said control board are discretely constituted, said reading apparatus is so disposed that a longitudinal direction of said reading apparatus is substantially parallel with a front surface of said housing, said printing apparatus is so disposed that a longitudinal direction of said printing apparatus is substantially parallel with a rear surface of said housing, and said control board is disposed in an upright position so as to be substantially parallel with a right or left side surface of said housing.

11. A reading/printing apparatus in which an original convey type reading apparatus for reading an original while moving the original, a serial printing type printing apparatus for performing printing by scanning a printing head in a main scan direction while scanning a printing sheet in a sub-scan direction, and a control board are disposed in a housing, characterized in that said original convey type reading apparatus, said serial printing type printing apparatus, and said control board are discretely constituted, said original convey type reading apparatus is so disposed that one side surface of said original convey type reading apparatus is substantially parallel with one opposing side surface of said housing, said serial printing type printing apparatus is so disposed that one side surface of said serial printing type printing apparatus is substantially parallel with another opposing side surface of said housing, and said control board is disposed in an upright position on a side surface connecting the one side surface and another side surface of said housing.

12. The apparatus according to claim 11, characterized in that said control board is so disposed as to be detachable from said housing without interfering with said original convey type reading apparatus and said serial printing type printing apparatus.

13. The apparatus according to claim 11, characterized in that in order to dispose a plurality of control boards in an upright position, said control boards are disposed in a space secured by making a dimension in a longitudinal direction of said original convey type reading apparatus smaller than a dimension in a longitudinal direction of said serial printing type printing apparatus.

14. The apparatus according to claim 13, characterized in that said housing comprises:

a first housing integrally forming a base portion and lower side walls to integrally form an opening; and a second housing covering said opening and integrally forming upper side walls, said first housing is formed to have enough strength to separately fix said original convey type reading apparatus, said serial printing type printing apparatus, and said control board, said second housing is detachably fixed so as to cover said opening in said first housing, and said first housing integrally forms a wall surface having a height which allows said wire of said control board to be attached and detached, when said second housing is removed from said first housing.

15. The apparatus according to claim 11, characterized in that a length of wires for electrically connecting said original convey type reading apparatus, said serial printing type printing apparatus, and said control board is substantially minimized by extending said wires from said original convey type reading apparatus and said serial printing type printing apparatus toward said control board.

16. The apparatus according to claim 11, characterized in that in order to dispose a plurality of control boards in an upright state, said control boards are discretely constituted by fixing said control boards to a common support member.

17. The apparatus according to claim 16, characterized in that at least one of said control boards is detachably disposed to meet a change of specifications in each country.

18. The apparatus according to claim 17, characterized in that said board is disposed in a lower portion, and a protecting cover for covering said board is further provided.

19. A reading/printing apparatus in which an original convey type reading apparatus for reading an original while conveying the original, a serial printing type printing apparatus for performing printing by scanning a printing head in a main scan direction while scanning a printing sheet in a sub-scan direction, and a control board are disposed in a housing, characterized in that said original convey type reading apparatus, said serial printing type printing apparatus, and said control board are discretely constituted, said original convey type reading apparatus is so disposed that a longitudinal direction of said original convey type reading apparatus is substantially parallel with a front surface of said housing, said serial printing type printing apparatus is so disposed that a longitudinal direction of said serial printing type printing apparatus is substantially parallel with a rear surface of said housing, and said control board is disposed in an upright position so as to be substantially parallel with a right or left side surface of said housing.

20. The apparatus according to claim 19, characterized in that said serial printing type printing apparatus integrally comprises a driving circuit board for performing a predetermined printing operation, and said driving circuit board supplies an electrical driving signal for allowing said original convey type reading apparatus to perform a predetermined reading operation.

21. The apparatus according to claim 19, characterized in that said serial printing type printing apparatus comprises an ink-jet printing head for performing printing by discharging ink while being scanned in the main scan direction with respect to the printing sheet.

22. The apparatus according to claim 21, characterized in that said printing head discharges ink by using thermal energy and comprises a thermal energy converter for generating thermal energy to be applied to ink.

23. The apparatus according to claim 21, characterized in that said control board is disposed in a position away from an ink discharge recovery unit for recovering initial discharge by said ink-jet printing head.

* * * * *